(12) United States Patent
Downey et al.

(10) Patent No.: US 11,222,062 B2
(45) Date of Patent: Jan. 11, 2022

(54) UNIVERSALLY INTERACTIVE REQUEST FOR INFORMATION

(71) Applicant: INVIDI TECHNOLOGIES CORPORATION, Princeton, NJ (US)

(72) Inventors: David Downey, Sherman, CT (US); Patrick M. Sheehan, Jamison, PA (US); Bruce J. Anderson, Chesterfield, NJ (US); Daniel C. Wilson, Edmonton (CA)

(73) Assignee: INVIDI TECHNOLOGIES CORPORATION, Princeton, NJ (US)

( * ) Notice: Subject to any disclaimer, the term of this patent is extended or adjusted under 35 U.S.C. 154(b) by 221 days.

(21) Appl. No.: 15/683,023

(22) Filed: Aug. 22, 2017

(65) Prior Publication Data

US 2018/0189285 A1 Jul. 5, 2018

Related U.S. Application Data

(63) Continuation of application No. 13/191,370, filed on Jul. 26, 2011, now abandoned.

(60) Provisional application No. 61/409,002, filed on Nov. 1, 2010, provisional application No. 61/367,588, filed on Jul. 26, 2010.

(51) Int. Cl.
  *G06F 16/48* (2019.01)
  *H04N 21/4722* (2011.01)
  *H04N 21/81* (2011.01)

(52) U.S. Cl.
  CPC ......... *G06F 16/48* (2019.01); *H04N 21/4722* (2013.01); *H04N 21/812* (2013.01)

(58) Field of Classification Search
  CPC ... G06F 16/48; H04N 21/4722; H04N 21/812
  See application file for complete search history.

(56) References Cited

U.S. PATENT DOCUMENTS

| | | |
|---|---|---|
| 6,510,434 B1 | 1/2003 | Anderson et al. |
| 6,708,208 B1 | 3/2004 | Philyaw |
| 7,546,288 B2 | 6/2009 | Springer, Jr. et al. |
| 2005/0160014 A1 | 7/2005 | Moss et al. |
| 2006/0059277 A1 | 3/2006 | Zito et al. |

(Continued)

*Primary Examiner* — Kris E Mackes
(74) *Attorney, Agent, or Firm* — Davis Graham & Stubbs LLP

(57) ABSTRACT

A request for information (RFI) system is provided for use in communications networks including broadcast networks and the Internet. In one implementation, a code identifying an item of media content of interest (e.g. television, newspaper, magazines, billboards, radio) is captured and input to an RFI system that includes stored media tags and a search tool for matching inputs to the stored media tags. Upon receipt of the captured code, the RFI system matches the captured code with the stored media tags and provides a response to the user based on the match. The response may include or relate to follow-on or premium information relating to the content of interest. Using this information, an RFI data center or an RFI platform may credit value to a rewards account established for the network user based on the user's verified consumption of assets and/or data requests. Further, the RFI data center or RFI platform may be used to collect consumer behavior information, including purchasing decisions made by the user after consumption of assets, and correlate the consumer behavior information with the user's verified asset consumption.

24 Claims, 55 Drawing Sheets

(56) References Cited

U.S. PATENT DOCUMENTS

| | | |
|---|---|---|
| 2008/0188209 A1 | 8/2008 | Dorogusker |
| 2008/0195664 A1 | 8/2008 | Maharajh et al. |
| 2008/0201321 A1 | 8/2008 | Fitzpatrick et al. |
| 2009/0019039 A1 | 1/2009 | Brindley et al. |
| 2009/0089690 A1 | 4/2009 | Chi et al. |

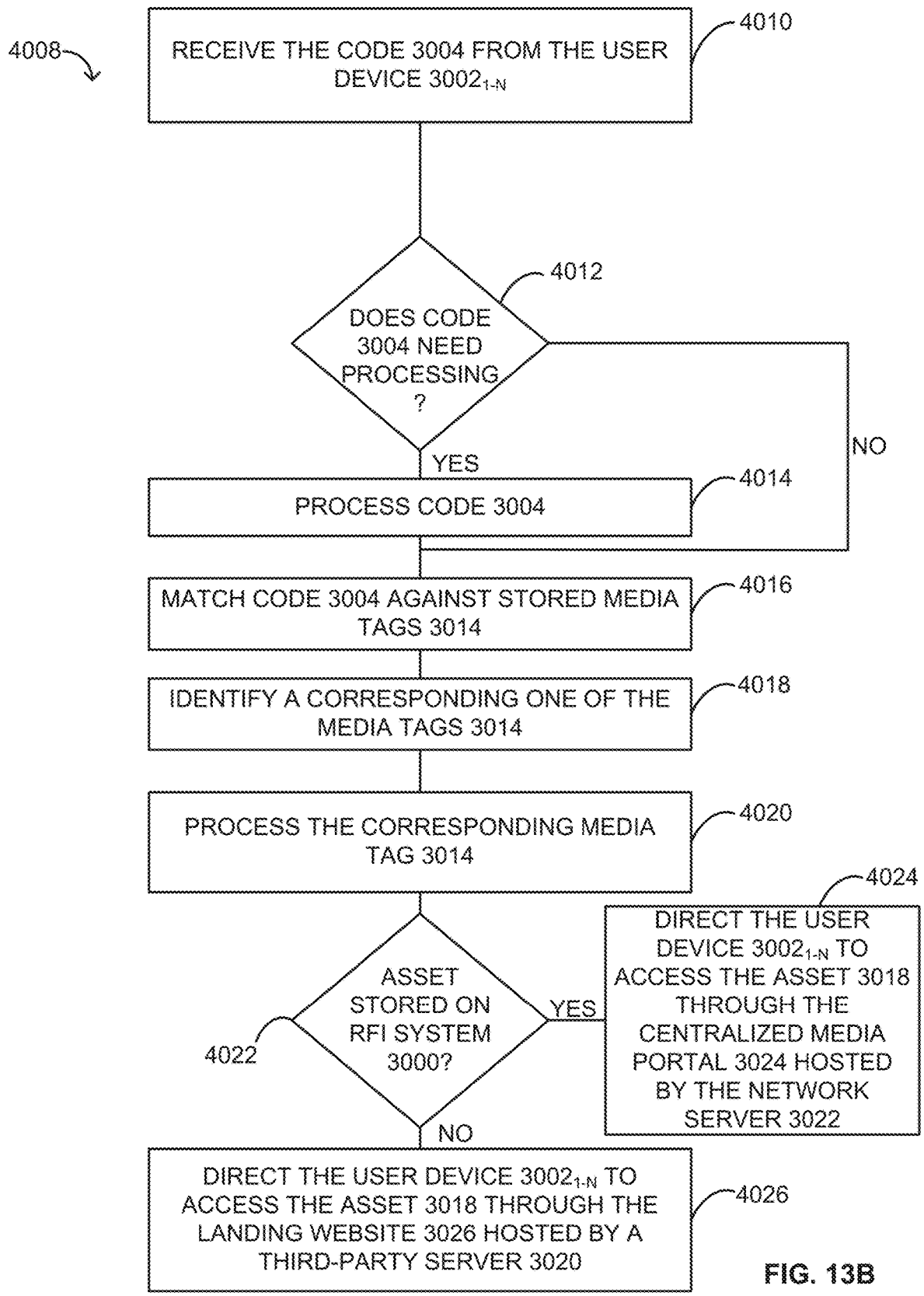

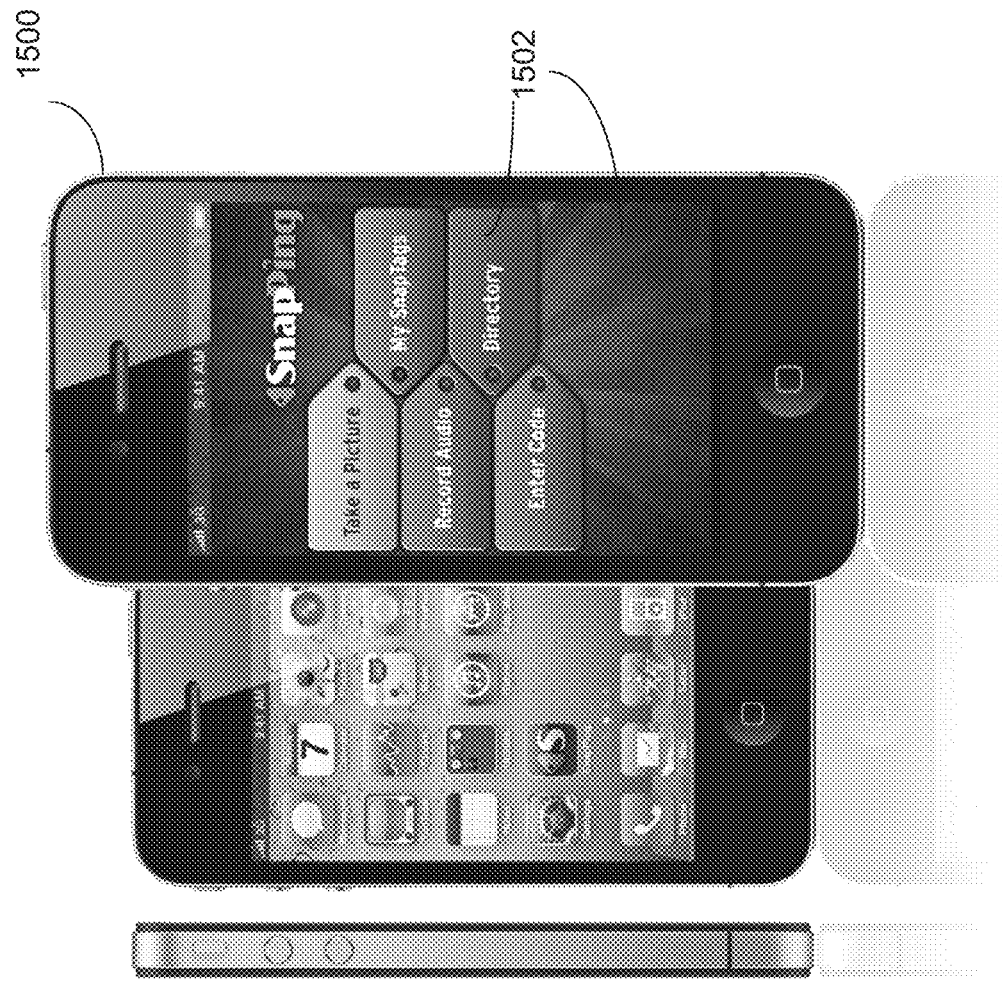

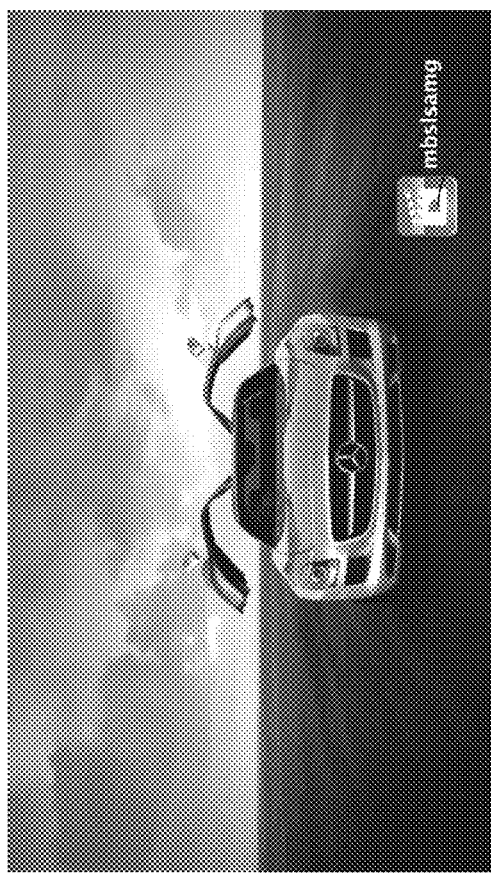
FIG. 17E
FIG. 17F

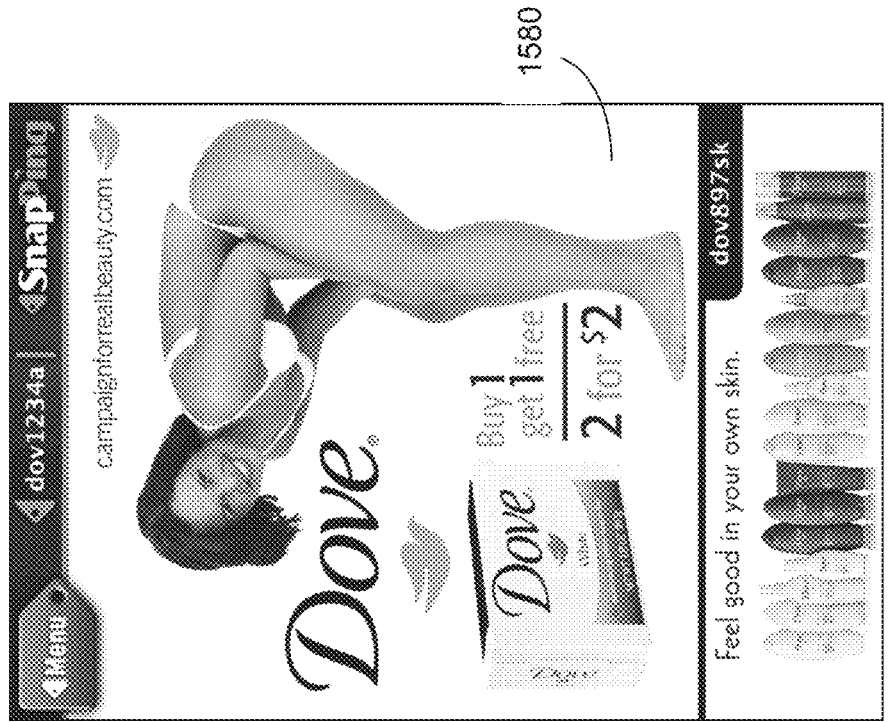
FIGURE 20B
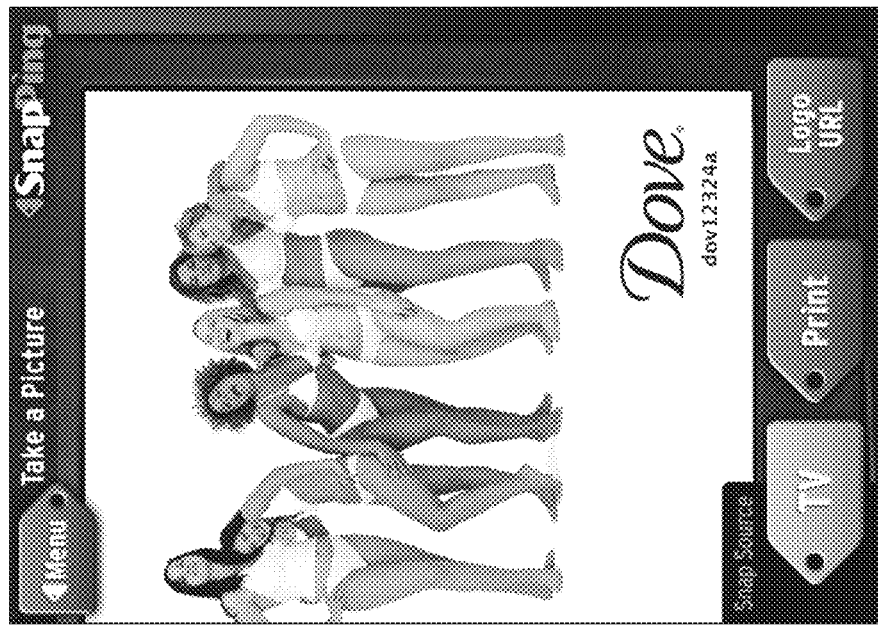

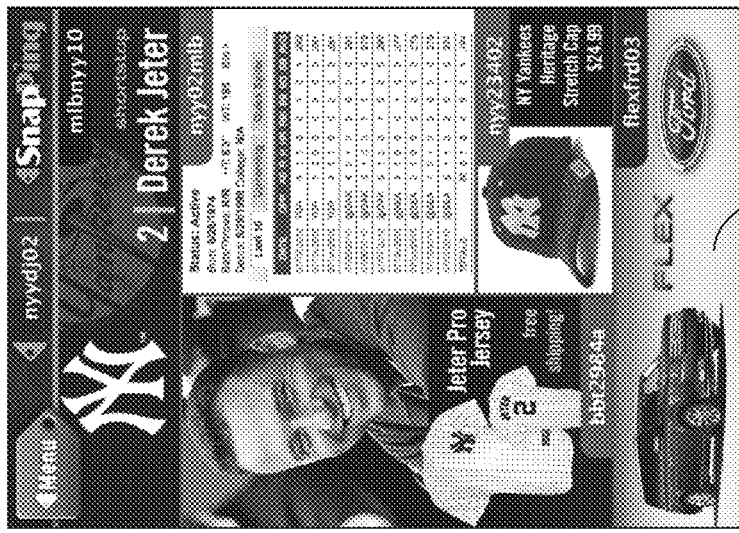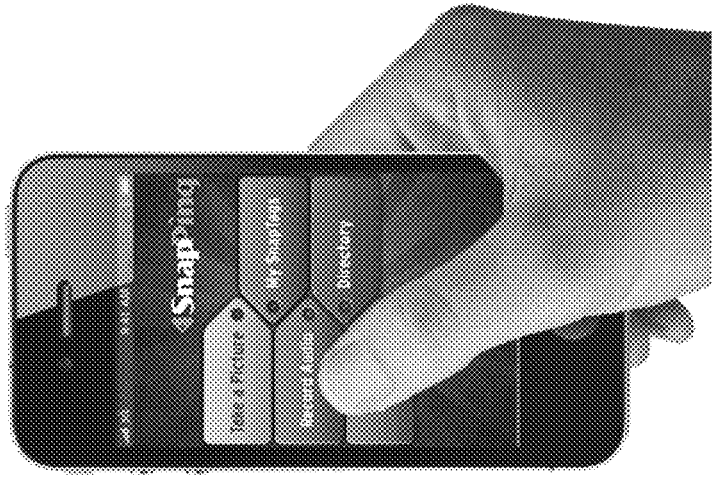
FIG. 20C

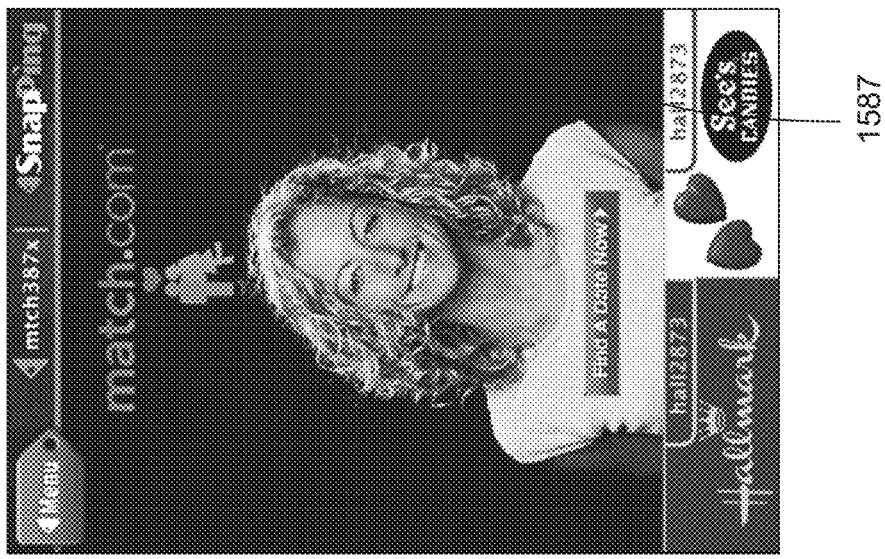
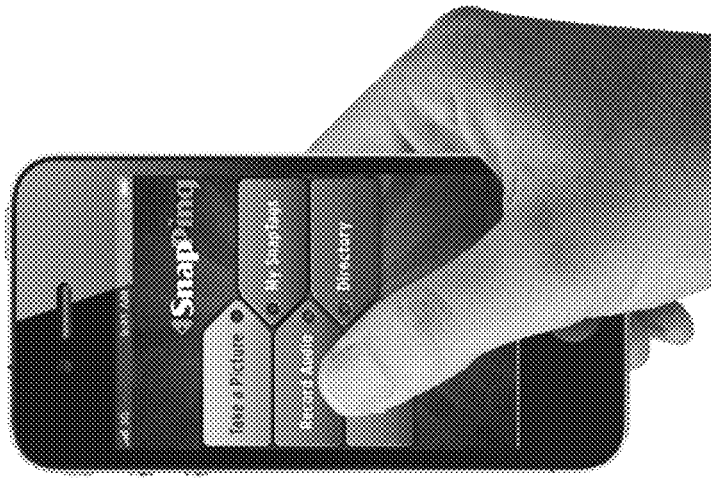
FIG. 20D

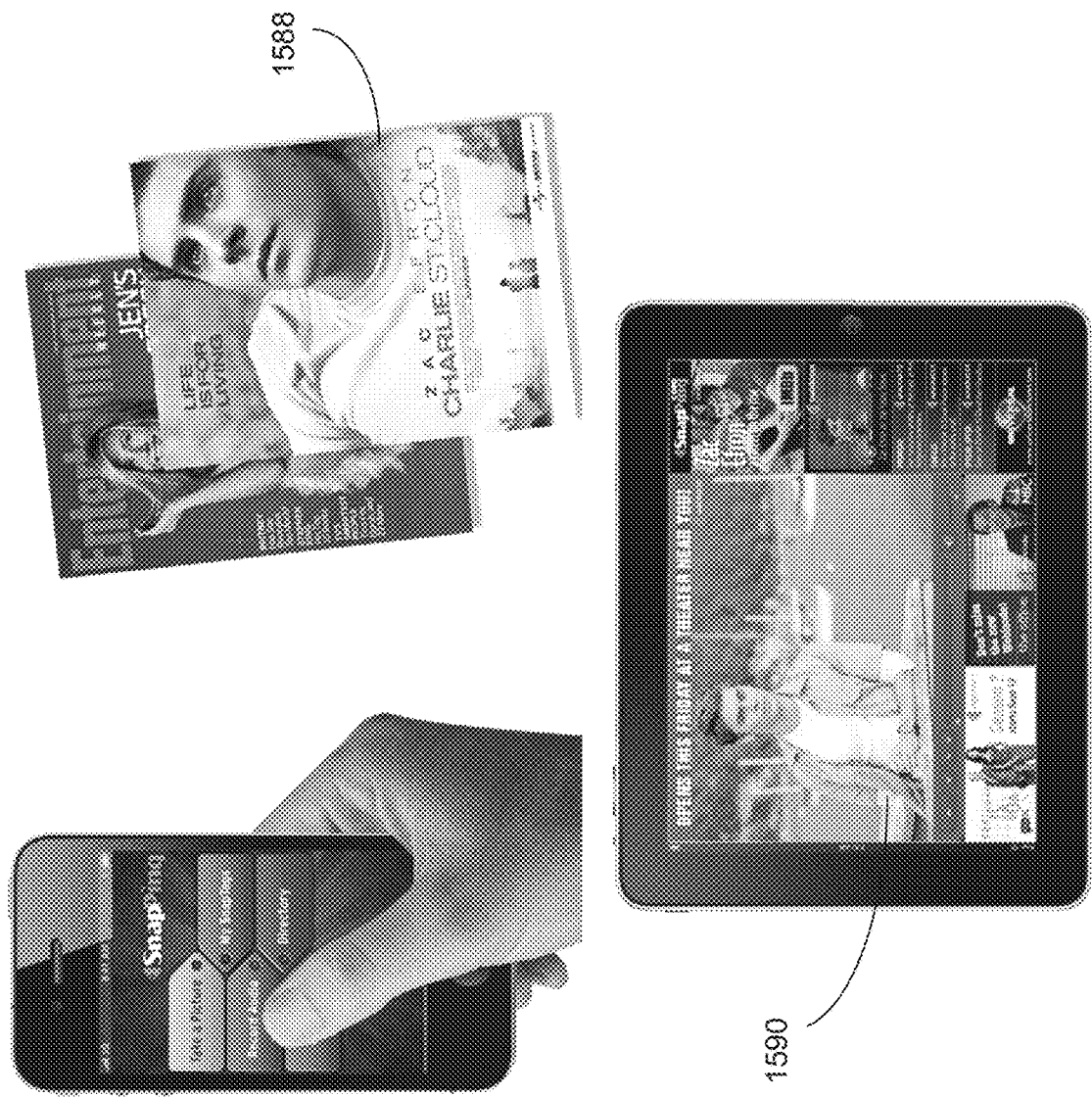

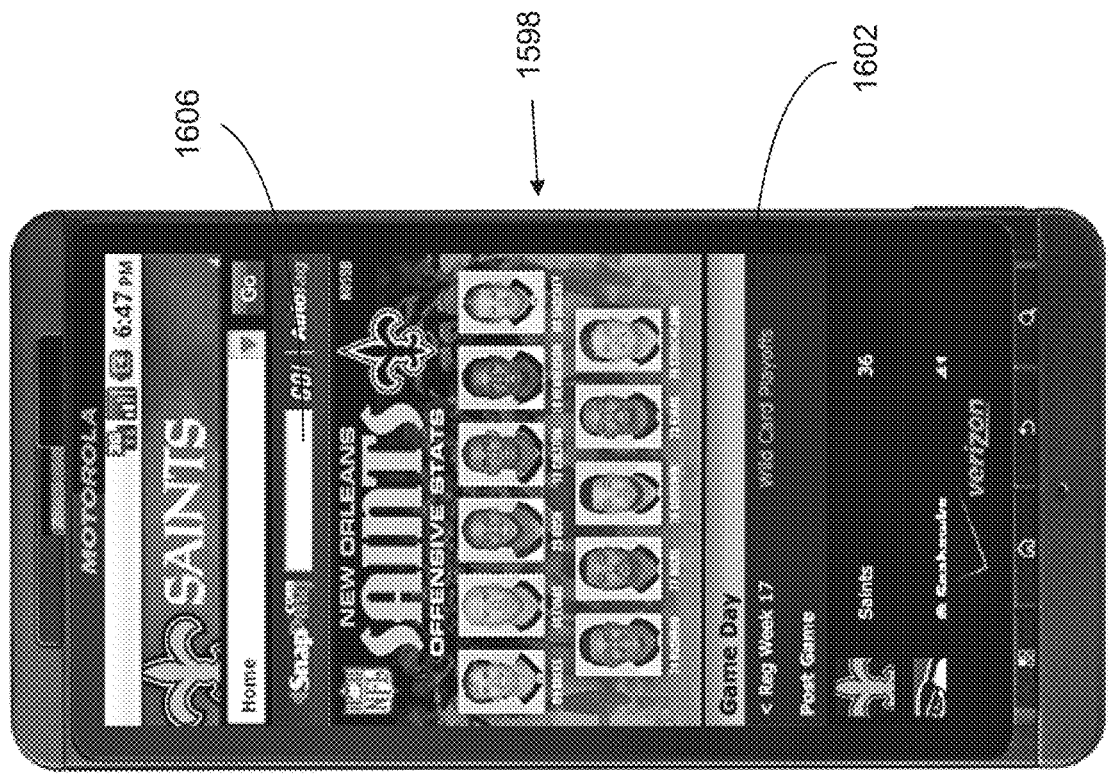
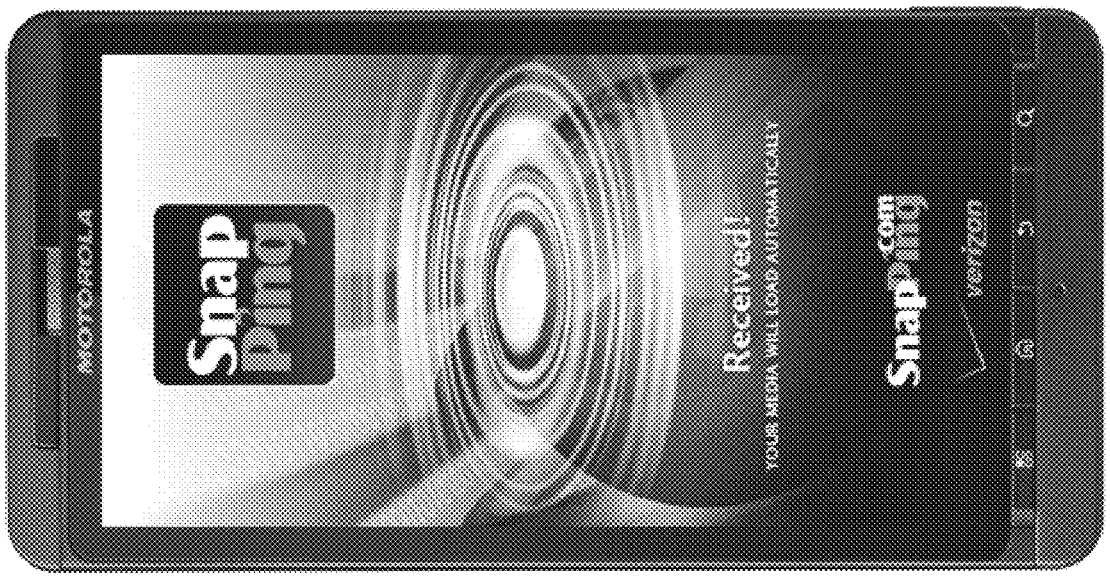
FIG. 23A

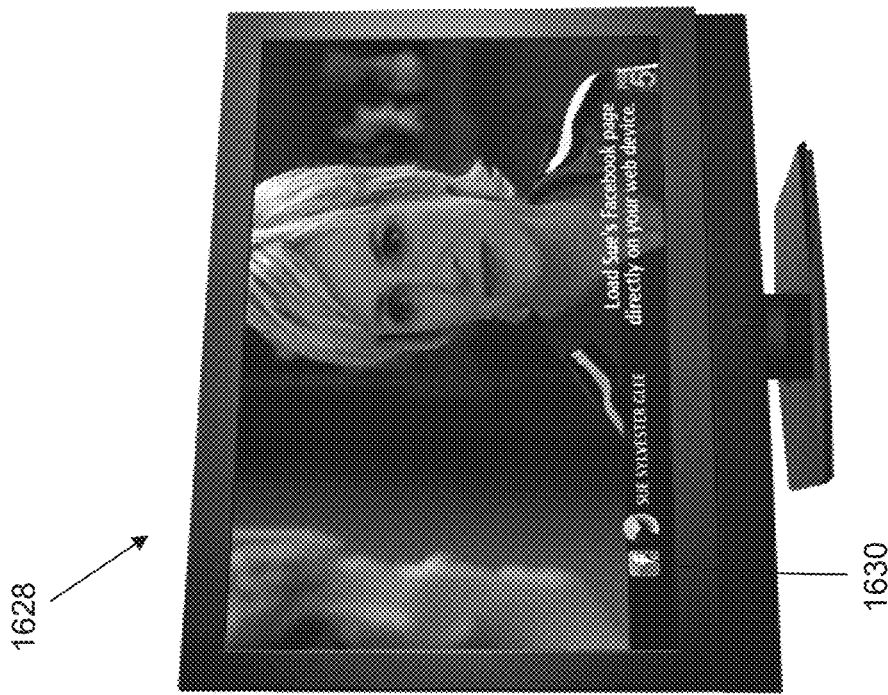
FIG. 25

UNIVERSALLY INTERACTIVE REQUEST FOR INFORMATION

CROSS REFERENCE TO RELATED APPLICATION

This application is a continuation of U.S. patent application Ser. No. 13/191,370, entitled "UNIVERSALLY INTERACTIVE REQUEST FOR INFORMATION", filed on Jul. 26, 2011, which claims priority under 35 U.S.C. § 119 to U.S. Provisional Application 61/409,002, entitled "UNIVERSALLY INTERACTIVE REQUESTS FOR INFORMATION," filed on Nov. 1, 2010 and to U.S. Provisional Patent Application 61/367,588, entitled "REQUEST FOR INFORMATION RELATED TO MEDIA CONTENT," filed on Jul. 26, 2010, both of which are related to U.S. patent application Ser. No. 12/467,890, entitled "REQUEST FOR INFORMATION RELATED TO BROADCAST NETWORK CONTENT," filed on May 18, 2009, which is a continuation-in-part to U.S. patent application Ser. No. 12/024,714, entitled "VERIFYING AND ENCOURAGING ASSET CONSUMPTION IN A COMMUNICATIONS NETWORK," filed on Feb. 1, 2008, which claims priority under 35 U.S.C. § 119 to U.S. Provisional Application No. 60/887,750, entitled "COMPENSATING FOR AD-SKIPPING IN A COMMUNICATIONS NETWORK," filed on Feb. 1, 2007, the entire contents of all of which are incorporated by reference herein as if set forth in full. Additional disclosure relating to this application is found in U.S. patent application Ser. No. 12/024,696, entitled "TARGETING CONTENT BASED ON LOCATION," filed on Feb. 1, 2008, which claims priority under 35 U.S.C. § 119 to U.S. Provisional Application No. 60/887,747, entitled "TARGETING CONTENT BASED ON LOCATION," filed on Feb. 1, 2007.

FIELD OF INVENTION

The present invention relates generally to providing information of interest, such as follow-on advertising, transaction interfaces, product coupons, or other information, to users of a communications network and, in particular, to a system for providing information of interest identified in relation to a first communications mode (e.g., while watching broadcast television, observing a billboard, reading a magazine or newspaper, listening to AM, FM, or satellite radio, or observing any non-media content of interest) to a user engaged in a second communications mode (e.g., using the Internet, watching TV, using a cellular telephone, or receiving hard copy mail).

BACKGROUND OF THE INVENTION

Assets such as advertising materials, web pages, product coupons or items of programming content are provided in connection with various communications mechanisms such as broadcast networks, data networks, ambient advertising and in print media. In the advertising context, these assets include commercials inserted into commercial breaks of broadcast television or radio, product placement advertising embedded into pre-recorded or live programming, banner ads, pop-up ads and the like, billboards and other outdoor signage and printed advertisements in magazines newspapers and the like. These different types of assets have been used in different contexts and have different relative advantages that have been the subject of considerable attention by asset providers, information providers and other interested parties.

In the case of broadcast television, commercials broadcast during commercial breaks have long been a significant source of revenues. These commercials can be designed to use full motion video and audio content to create viewer impressions that have substantial impact. More recently, broadcast television advertising has been supplemented by product placement, pop-up and other advertising opportunities in the television mode. Moreover, large audiences can be reached with some degree of targeting based on the demographics of the audience of the associated programming. Indeed, television advertising has been integral to the marketing of some of the most valuable brands of our era.

Of course, though, there are limitations to the effectiveness of television advertising. For example, air time for such advertising is expensive, particularly in connection with programming having the largest audiences of the most desirable demographics. In part because of the high value of such advertising spots, advertisers are limited, as a practical matter, to brief time intervals to make the desired impression and convey sufficient information to advance potential sales opportunities. Moreover, because of the passive nature of the broadcast experience, viewers are generally not in a position to immediately consummate a transaction or even, in most cases, to record information for later use. The latter shortcoming has led to the art forms of jingles, mnemonics and the like to assist viewers in retaining important advertising information.

Print advertising, for example, in periodicals or flyers, provides an opportunity for the advertiser to include a substantial amount of product or service information as well as coupons, retail outlet information and the like. All of this may enhance the opportunity to capture the consumer's attention and induce the desired purchasing decision. Moreover, as the consumer has a hard copy of the advertisement, the consumer may be able to keep the information on-hand until needed, e.g., to consummate a transaction. However, print advertising often lacks the reach of some other advertising modes such as broadcast advertising. In addition, because use of print materials is self-directed and the consumer is therefore not "captive," print materials can be easily ignored by consumers.

Another popular form of advertising is ambient advertising, such as billboards or panels on vehicles, that provide advertisements in the surroundings of potential consumers. Ambient advertising has the advantage of potentially reaching large numbers of consumers who are effectively captured in the advertising environment. However, those consumers may be distracted by other activities or fail to notice the advertisement altogether. Moreover, these consumers are often reached at less-advantageous times, for example, when the consumers are not in a purchasing mode. Ambient advertising, like broadcast advertising, also suffers from the disadvantage that consumers are generally not able to immediately consummate a transaction or even record information for later use.

By contrast, advertising in data networks can take advantage of interactive functionality to improve ad effectiveness. For example, users can select links of interest, in some cases, to delve deeper into details of interest and obtain more customized content. However, such data network advertising is not effective in reaching some consumers. In addition, such advertising can be easily avoided or disregarded by some network users. Moreover, metrics for measuring the effectiveness of such advertising are still being developed, particularly in contexts where the ads do not lead to an immediate "click."

Accordingly there is a continuing effort to provide effective asset delivery to users of multiple networks in different use modes. Ideally, asset providers would like to utilize the comparative advantages of each network to effectively maximize users' asset consumption by enabling flexible, elective access to secondary assets of interest to users.

In addition, it is desirable for asset providers to associate easily-accessible assets with non-media items that are of interest to users of data networks. Because non-media items such as actual individuals, buildings, natural monuments, commercial products and services, and so on, are not traditionally asset-enabled, asset providers would like to associate assets that users may electively consume with everyday items of content that users encounter.

SUMMARY OF THE INVENTION

The present invention is directed to improving the effectiveness of asset delivery as well as verifying the effectiveness of the assets and their receipt in leading to desired behaviors. The system incorporates a number of inventive aspects that are applicable in a variety of network contexts. In the exemplary context of a cable television network, the invention involves developing a database of pre-recorded or live assets played on the various channels of the cable television network at various times. The system can receive an indication of interest or a request-for-information request ("RFI request") entered in connection with an aspect of the viewer experience (e.g., a conventional advertisement during a programming break, a product placement advertisement, a pre-recorded or live television broadcast, a live sporting event). The indication of interest can be expressed through a captured code such as a captured image of a television advertisement or a captured image of an icon or other indicia associated with a television advertisement. In a similar manner, the indication of interest could be an audio recording of the television advertisement, a voice recording describing the television advertisement, or the entry of an alphabetic, numeric, or alphanumeric character string provided in an icon associated with the television advertisement. As discussed below, this information can be used to provide a follow-on asset via a variety of different networks or modes, to analyze advertisement effectiveness, to correlate advertisement viewing and consumption to purchasing decisions, and a variety of other purposes.

The RFI functionality described above is applicable in any context. For example, in addition to broadcast content, RFI requests may be submitted in connection with any type of media content such as content provided in radio advertisements and/or programs, print media such as magazines and newspapers, and content displayed on billboards, benches, busses, and/or subways. As a further example, in addition to the broadcast video context, RFI requests may be submitted in connection with video accessed via the Internet such as through YouTube®, Netflix®, Hulu™, or with Video-on-Demand (VOD) services. Moreover, RFI requests may be submitted in connection with items of non-media content that have been associated with a follow-on asset. For example, an RFI icon having an identifying RFI identifier could be associated with an individual, a place such as a public park or national monument, or an object or thing such as a car, bicycle, business, or sports team.

One implementation provides a request for information ("RFI") method and apparatus ("utility") for receiving a captured element of media content and providing additional information in any of various modes, thereby taking full advantage of different usage modes associated with different networks and advertising types. For example, asset providers, including advertisers and programming providers, may produce content (e.g., advertisements or pre-recorded or live programming in the case of broadcast networks) that includes RFI icons indicating that the content is RFI enabled and that a user may request additional follow-on assets and information relating to any of the RFI enabled content. The RFI icon may indicate the type of follow-on information that is available for the particular RFI enabled content (e.g., display a music cleft for information relating to music, a dollar sign for coupons or financial incentives, a question mark for additional information or product materials, and so on). Alternatively, the content may include a general RFI icon, and the user may be prompted at a later time regarding what type of information the user would like to receive in relation to the RFI enabled content. For example, the user may be shown a thumbnail view of a video frame that appeared at the time the RFI request was made before the user is prompted to provide further instructions regarding the specific follow-on information desired.

The RFI icon may also include a character string or other indicia which provides a unique or nearly unique identifier that can be used to identify the content of interest. Such indicia may include an alphabetic, numeric, or alpha-numeric text string, a 1-D or 2-D barcode, a quick response code, or a combination of any of these. The icon may be optimized for easy computer recognition from a captured image.

The same RFI icon could be used in broadcast network content, in print media and ambient advertising, and in connection with any type of non-media content (e.g., any person, place, or thing) of interest. For example, an RFI icon could be sewn into a letterman jacket or printed onto a vehicle bumper sticker. However, it might be advantageous to use different icons in different content categories.

The RFI icon may also be placed on the packaging of a product in a store or on a list of services available in a commercial establishment. An RFI request, submitted for a product or service using a mobile device, could result in an immediate indication of special pricing, detailed product or service information, or a coupon usable at the point of sale.

In a broadcast context, the RFI icon may be visible throughout the duration of an RFI enabled event or it may be visible for only a discrete period of time. For example, an RFI icon may be present throughout the duration of a televised commercial advertisement. In another implementation, however, the RFI icon may appear at the beginning of a program with instructions for the user to enter an RFI request at anytime during the program that the user notes something of interest. For example, an RFI icon containing a musical cleft may appear at the beginning of the television show "Lost." If and when the user hears music that is of interest to the user, the user may submit an RFI request to receive additional information regarding, for example, the artist(s) and track(s) played and to optionally download the music. In a non-broadcast context, an RFI icon may appear on a scoreboard during a live sporting event such as an NFL football game. Upon seeing the icon, a fan in attendance may submit an RFI request to receive additional information relating to the team, a specific player, a recent play during the game, a promotional deal on team gear, and so on.

It will be appreciated that this utility may be implemented without any icon or other adaptation of the original content. In this regard, an RFI request may be in many different ways. For example, as discussed in more detail below, an element of the content itself may be captured using a camera. Alternatively, a user may record an audio snippet of the content (e.g., a portion of a television or radio program, a portion of a live event). A user may also record a verbal description of the content. In these instances, the content does not have to include an RFI icon. The captured element may be matched to a tag associated with the follow-on asset by an appropriate search tool. Also, in the case of broadcast television, the user may click on an RFI input button without being prompted by any icon. In such cases, the user may then be prompted to indicate the desired information (e.g., by selecting from a menu) or the RFI input may simply be recorded, e.g., together with the time and channel (and any other information). Logic of an RFI platform can then be used to identify and provide responsive information.

As discussed above, an important aspect of the present invention relates to allowing users to easily request and receive follow-on assets relating to any content of interest. Such follow-on assets may include information such as product and/or service information or marketing materials, coupons, or other materials regarding the content. Certain proposals in this regard have been limited to specific interactive environments, specific media, or have required substantial production modification to accommodate this functionality. For example, interactive assets broadcast on a television network may require complex code at a set top box to implement interactivity. Moreover, such interactive assets may require assets to be developed through a production process that defines the interactive behavior of the asset. Interactive assets distributed through a broadcast network may also require that metadata be transmitted along with the interactive asset for processing by the set top box software. These interactive television asset systems may not extend to digital video recorder (DVR) time shifting environments and do not extend to certain broadcast environments such as airwave broadcasting, analog cable broadcasting, or digital cable broadcasting without interactive logic. Moreover, proposed solutions are generally limited to particular media and do not provide a common platform to support a variety of media including television, radio, print, billboard, and the like. Nor do they provide a common platform to support non-media content of interest.

Thus, in accordance with one aspect of the present invention, a utility is provided that supports requests for information in relation to a variety of media. The utility involves providing a network platform including stored media tags relating to defined items of media content of interest and a search tool for matching codes relating to the defined items of media content to the stored media tags. The defined items of media content may include television or radio programming, print content, web-based content, billboard content, and the like. The utility further involves receiving a code relating to one of the defined items of media content, operating the network platform to match the code to a corresponding one of the media tags, and providing a response to a user based on the corresponding one of the media tags. The stored media tags may include instructions regarding the mechanisms by which follow-on assets may be provided to a user making an RFI request.

The codes relating to the defined items of media content may include a broad array of content identifiers such as, for example, numeric, alphabetic, or alpha-numeric character strings, barcodes, quick response codes, and so on. The codes may also be audio or video snippets taken from the defined items of media content or images of the defined items of media content. For example, while a code may be a character string such as "BMW335i," it may also be an audio snippet recorded over a portion of a BMW television advertisement, or an image of an actual BMW 335i.

Similarly, a variety of techniques may be used to capture the code. These techniques depend, for example, on the nature of the media content of interest. Thus, in the case of media content including a visual component, the media content element may be captured using a camera to capture a digital image. For instance, the user can operate a digital camera to capture an image of a print media asset, a billboard, a frame or video segment, printing on a vehicle or other product, or an actual physical product (e.g., a product at a supermarket or automobile of interest).

In the case of audio content, an audio recorder can be used to capture a segment including some or all of the content. In other cases, where the media content is configured to include or is associated with an identifying character string or other identifying information, the identifying information may be captured by entering the identifying information using a keypad or other input device of a communications device and then operating the communications device to transmit the element to a network platform. Alternatively, a visual or audio code (e.g., encoded in a tone or series of tones, or in an image pattern) may be captured directly by a recording device. Such codes may be perceptible or imperceptible to a human user. It will be appreciated, in this regard, that a variety of communications devices may be utilized. For example, the code may be captured on a first device (e.g., a digital camera, digital recorder, or the like) and transferred to a second device such as a laptop computer, personal computer, cell phone, or other mobile device. The code may then be transmitted to the platform via a data network such as the Internet, telephony network, or other network.

Conveniently, the media content element may be captured and transmitted to the platform using a single device such as a smart phone with an appropriate application for executing the functionality described above. For example, such an application may provide prompts for the user to identify the desired methodology for capturing the content element (e.g., by entering a picture, audio recording, user voice recording, character string, text, or the like) and for transmitting the captured element to the platform. The device may also be operative to capture metadata or instruct metadata to be sent to the platform from another location. For example, the metadata may include the time that the element was captured, the location of the device at the time the element was captured, and other information such as a station, channel, periodical, name, and additional or other information associated with the media content element.

Because the code may be captured in a variety of ways, the network platform may receive the codes via a variety of different modalities. That is, the network platform may receive a typed entry, a transmission of an image, or a transmission of an audio, video, or voice recording from a user device such as a mobile telephone or a laptop, tablet, or desktop computer.

The process of matching the codes relating to the defined items of media content to the stored media tags may vary depending, for example, on the nature of the captured code, whether the captured code has been preprocessed and/or associated with metadata, and the nature of the follow-on asset to be provided in response to the RFI request. In the case where the code includes an image or video content, image recognition software may be used to identify image objects. In this regard, the image recognition software may identify shapes, text elements, logos, faces, or other objects that can be used as a basis to match the captured image to stored information. In the case of audio content elements, the audio content may be processed to generate text or to generate an audio signature that provides a basis for such matching. Such processing may be conducted in the time domain, frequency domain, or other domain. Character strings or other identifying information entered by the user may be directly matched to corresponding indicia in the stored tags. If any metadata has been captured or otherwise provided to the platform, such as time of capture, location of capture, user demographic information, a transmission band associated with the media content, or the like, such metadata can be used to expedite or improve the accuracy of the matching process. For instance, metadata may be used to disambiguate codes that are not globally unique. Focusing on an example in which the code is an alphabetic character string, metadata indicating the date and/or time the code was entered could be used to differentiate one code "ABC" from another code "ABC." For example, "ABC" entered at 11:00 am on a weekday may indicate the daytime talk show "The View," while "ABC" entered at 11:00 pm on a weekday may indicate the nightly news program "Nightline."

Once the captured element has been matched to a corresponding stored media tag, a response can be provided to the user based on the corresponding media tag. Generally, the response may involve providing an associated follow-on asset, or causing an associated asset to be provided, to an appropriate user device. The associated asset may include additional information, coupons, or other material related to the media content. In many instances, the asset is a web-based asset that may be provided to a user device via a data platform or website. In other instances, the asset may include downloadable media content that is directly downloaded to a user device in response to the user's RFI request (e.g., music files, software application files).

To accommodate the variable nature of the follow-on assets, each of the media tags may include coded instructions regarding the provision of its associated follow-on asset to a user device. For example, the media tag may indicate where the associated follow-on asset is stored and how the asset is to be provided to the user. In one embodiment, the associated asset may be stored at the network platform such that the corresponding media tag provides instructions regarding directing a user device to a centralized data platform or website that is hosted by or affiliated with the platform operator. In another embodiment, the associated asset may be stored at a third-party server that is operated, for example, by the producer of the media tag and associated asset. In this embodiment, the corresponding media tag may include instructions regarding directing a user device to a data platform or landing website that is hosted by the third party. In yet another embodiment, the corresponding media tag may include instructions regarding directing a user device to a social network web portal such as Facebook® or LinkedIn®.

Notably, the associated asset may be provided in a variety of different media and via a variety of different networks. Thus, for example, in response to the submission of a picture of a billboard or product, the user may receive a television advertisement, direct mailing, email, text message, web address, or the like related to an associated product or service. This information may be delivered to the device used to transmit the captured element to the platform or may be delivered to a separate device or location.

Just as metadata may impact the matching process, it may also affect the type of follow-on asset that is provided to the user device. For instance, if metadata included with the RFI request provides an indication of the user's geographic location, the follow-on asset provided to the user may be tailored accordingly (e.g., promotional materials and/or coupons may be tailored for redemption at the nearest retail outlet). In another example, a different follow-on asset may be provided to the user as a function of any known demographic characteristics of the user (e.g., a female and a male submitting an RFI request relating to the same content of interest may each receive a different follow-on asset).

The RFI utility may be an opt-in program on two levels or, in certain instances, an anonymous ad-hoc system: First, users may opt-in or subscribe by creating an RFI membership account that includes certain information voluntarily provided by the user. This information may include demographic information such as, for example, age, gender, ethnicity, income level, or geographic location. It may also include contact information, such as, for example, an e-mail address and preference information such as privacy permissions, product preferences, and the programming networks for which the user would like to enable the RFI utility. Second, and as discussed above, a subscribed user may indicate interest in particular RFI enabled content, or submit an RFI request, on a real-time basis. In circumstances where a cellular telephone or an personal computer is used to transmit the RFI request, there is no absolute requirement for a user to opt-in since a return path to the user is implicit in the request. For instance, if a cellular telephone is used, then the phone number used to communicate the RFI request is available and a response could automatically be sent via SMS message to the telephone. When using a PC, and immediate response to a web browser can be made.

Even though an ad-hoc mode is available, there are many reasons to encourage users to opt-in. To encourage users to opt-in and to educate users regarding the RFI program, a network operator, commonly referred to as a Multichannel Video Programming Distributor (MVPD) such as, for example, Time Warner Cable, Comcast, Verizon FiOS and DirecTV, may educate users regarding the RFI utility using broadcast information commercials, mailers, or the like. These informational materials may explain the RFI utility and instruct broadcast network users as to how to subscribe or opt-in to the program, and once subscribed, how to indicate an interest in specific RFI enabled content such that the user will receive follow-on information. In addition, content providers may also educate users regarding the RFI utility by using network pundits to provide real-time instruction to users as RFI icons become available. For example, during a live CNN newscast, an anchorman could instruct viewers to submit an RFI request whenever the RFI icon appears at the bottom of the screen to receive more information regarding a particular news story. The pundit could also instruct users to visit a centralized RFI website or web portal, such as www.SnapPing.com, and follow the appropriate links to subscribe or opt-in to the RFI program. During the subscription or opt-in process, the user may choose to enable the RFI utility for specific additional programming networks or the user may choose to opt-in globally for every available programming network.

To provide additional incentive to users to opt-in to the RFI program, members may be given access to advanced functionalities for organizing, filtering, and even forwarding tags for associated assets. Members may also take advantage of auto-tagging capabilities that allow the user to pre-define follow-on assets that the user would prefer to receive automatically without the need to submit an individual RFI request for each asset.

Members may also access a media generation platform operated in connection with the network platform. The media generation platform may include a media generation tool that is configured for generating web-based assets relating to defined items of media content of interest and associating the web-based assets with media tags for storage at the network platform. Using the media generation platform, users may create their own web-based assets for provision to user devices in response to RFI requests. For example, users may use the media generation platform to create personal or classified-type advertisements, web-based resumes, fan sites, and any number of web-based assets.

As an even further incentive, one or more of the benefiting entities, such as, for example, the MVPD, the network, an advertiser or other asset provider, or a third-party RFI provider, may employ a rewards program in which value is credited to subscribing user accounts based on the consumption of assets, indications of interest in follow-on information, and ultimately, purchasing decisions made after assets and/or follow-on information are consumed.

To improve the tailoring of requested RFI assets, once the specific asset of interest to the user is identified, one or more databases may be consulted to construct a profile for the user. That is, in the course of administering the RFI utility, one or more databases may be maintained that include subscriber-provided information (e.g., information provided by the user during the process of opting-in to the RFI program) and third-party information (e.g., asset provider mailing lists, data assembled from credit card companies, credit agencies, or credit card transaction processing services). A privacy database may also be implemented to restrict personally identifiable information, or other information, from being released to asset providers (e.g., user-specified privacy permissions, government privacy regulations, MVPD implemented privacy policies). Using this subscriber information, user profiles may be constructed and passed, along with an identification of the asset of interest, to the asset provider in an RFI request. The RFI request may be stripped of all personally identifiable information, or alternatively, it may include personally identifiable information in accordance with the various privacy regimes included in the privacy database or in accordance with an implicit or explicit privacy policy.

In response, the asset provider may use the profile contained in the RFI request to prepare an augmented package of assets or follow-on information that is appropriately tailored for the particular user and the particular asset of interest. Then the asset provider may return the tailored package of assets or follow-on information for delivery to the user via any appropriate network or mode. For example, the MVPD, network, third-party RFI provider, or any other appropriate RFI system operator may provide the follow-on information to the user through a web-portal that is associated with the user's RFI account and that is accessible to the user via various computing devices including, for example, personal computers and handheld, data-enabled devices (e.g., smart phones) or the follow-on information may be e-mailed or even mailed directly to the user. The web-portal may contain follow-on information related to RFI inputs from the user, and in addition, the web-portal may be configured to receive information from the user and/or third-party databases (e.g., retailers, asset providers, programming providers) relating to the user's consumer behavior. Alternatively, and depending on the mandates of the various privacy regimes included in the privacy database, the asset provider may provide the follow-on information directly to the user.

To close the loop concerning analysis of asset effectiveness, an RFI platform or database may receive consumer behavior information. Consumer behavior information may relate to purchasing decisions made by users after viewing an RFI enabled asset, after requesting follow-on information related to an RFI enabled asset, or after consuming a follow-on asset or information. MVPDs, programming networks, asset providers, and/or RFI providers may acquire consumer behavior information through many channels, including third-party databases maintained by credit card companies, credit agencies, or credit card transaction processing services, through asset providers and/or associated vendors or retailers that are equipped to track purchases through the use of loyalty numbers or member IDs associated with participating users' RFI accounts, through third-party consumer marketing services or affiliate program providers that monitor member purchases made with participating asset providers and/or retailers, or through direct-user reporting of transactions. Using the collected asset consumption information and consumer behavior information, a variety of statistical analyses may be performed to correlate the relationships between asset consumption and consumer purchasing decisions to positively affect the way asset providers design and implement effective marketing programs.

The utility described above provides several benefits to broadcast network users, MVPDs, programming networks, asset providers, and RFI providers. First, the utility allows asset providers to more effectively target assets to users because asset providers may craft follow-on assets and information that are tailored to particular user profiles. Second, users are able to consume content of interest (e.g., television or radio program, magazine articles) without interruption and consume follow-on assets in an interactive environment at a separate time, allowing asset providers to achieve the benefits of high impact, large reach advertising as well as the opportunity to engage interested users in an interactive mode with the potential of instantaneous transaction consummation. Third, the utility provides a mechanism for obtaining reliable statistical feedback regarding what users are consuming their content, and further, what users that are requesting additional information relating to their content and ultimately purchasing related products and/or services. Fourth, virtually any person, place, or thing may be RFI enabled in a manner that is not tied to any one particular technology or device, making follow-on assets convenient and attractive to a large array of asset providers as well as users.

A targeted asset delivery environment serves to further enhance the RFI utility discussed above in relation to broadcast television content. A targeted asset delivery system allows for delivery of targeted assets to desired groups of individuals or individuals having desired characteristics or audience classification parameters including personal information, demographic information, geographic information, psychographic information, or any other information that may be relevant to an asset provider in identifying a target audience. First, targeted asset delivery systems generally employ software resident at the user equipment device/digital set top box or another network location such as the head end that is aware of the targeted assets selected for or delivered to the set top. Thus, any express RFI input from a user may directly specify the asset to which the RFI input relates, and therefore, the MVPD or other RFI provider need not manipulate the click-stream data to associate a particular click with an RFI input. Second, while a user's indication of interest may be express (e.g., an RFI input), as discussed above, a targeted asset delivery system accommodates targeting of assets in a broadcast network with a high degree of granularity based on different audience classifications. As a result, the mere fact that an asset is selected for a particular user may be considered an implied indication of interest in the products, services, or asset provider associated with the selected asset. Thus, follow-on information may be directed to the user based only on the delivery, or delivery and consumption, of a targeted asset. Third, because many households include multiple users, targeting based on household demographics alone may have limited effectiveness. In this regard, targeted asset delivery systems include mechanisms to distinguish between multiple users of a single set top box such that any RFI request may stipulate which of multiple users associated with the set top box has indicated interested in particular content, and in turn, any follow-on asset may be crafted for that particular user.

BRIEF DESCRIPTION OF THE DRAWINGS

For a more complete understanding of the present invention and further advantages thereof, reference is now made to the following detailed description taken in conjunction with the drawings in which:

FIG. 13B provides a flow chart that illustrates the functionality of an exemplary request for information system from the perspective of a network platform of the request for information system;

FIG. 14A illustrates a smart phone for use in capturing a request for information code for submission to a request for information system;

FIGS. 17A-H illustrate screenshots of a number of exemplary request-for-information icons that identify a category of follow-on asset associated with an item of content;

FIGS. 20A-E illustrate screenshots of exemplary implementations of an image-capturing mechanism of a request-for-information application;

FIGS. 23A-C provide screenshots of exemplary third-party landing websites providing web-based assets to user devices;

FIG. 25 provides a screenshot showing an exemplary request-for-information icon indicating that an associated asset is to be provided directly through a social media portal;

DETAILED DESCRIPTION

Figure 1:
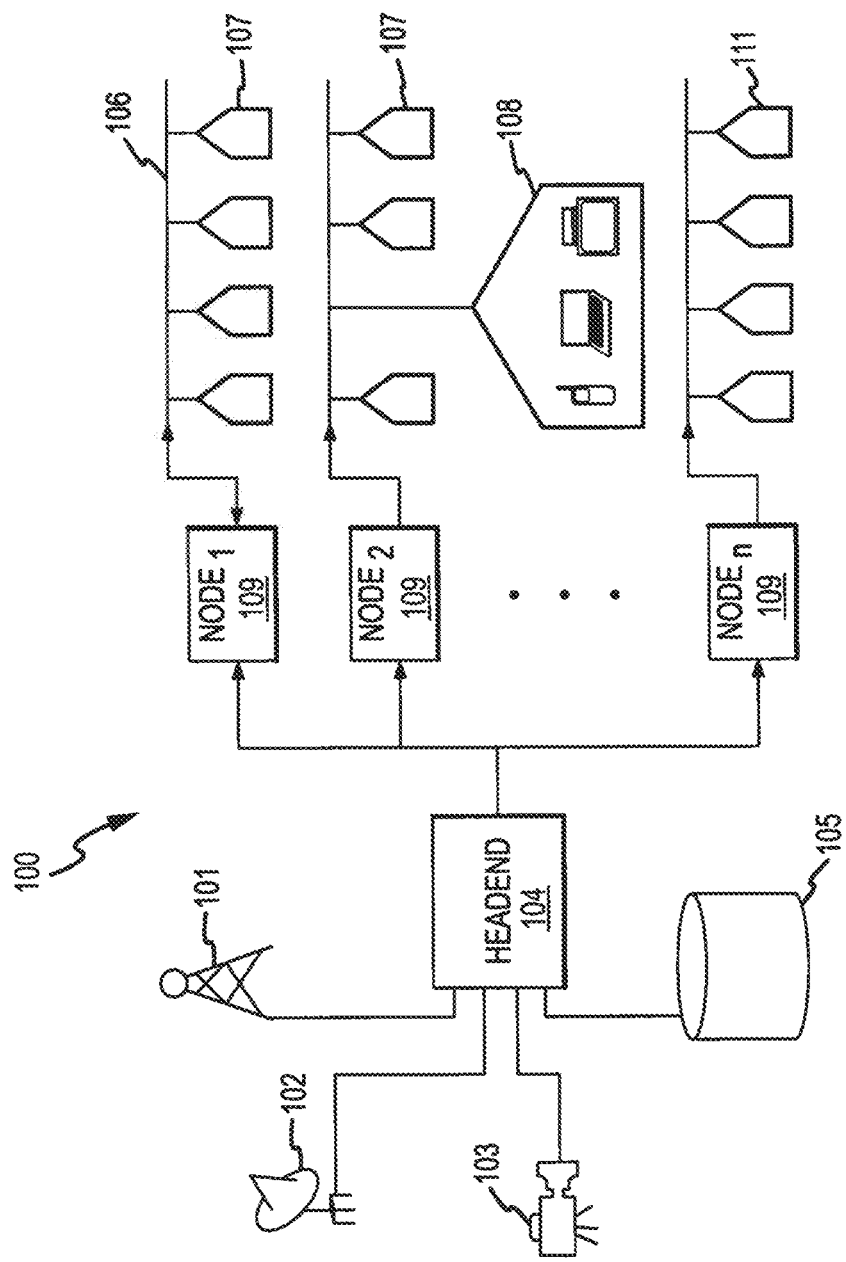
FIG. 1 illustrates a cable television network in which the present invention may be implemented.

The present invention relates to various structure and functionality for delivery of assets in communications systems or via other advertising modes, as well as a system for encouraging asset consumption, verifying asset consumption, and linking subsequent consumer behavior to such assets and associated business methods. In implementations described below, the invention relates to monitoring usage of one communications network or otherwise receiving captured elements of media content and using resulting information to deliver an asset to the user or another user(s) via another communications network or any other delivery mode. In one particular implementation, a user receives a first asset, such as a commercial airing during a programming break or another advertisement, via a broadcast television network such as a cable television network. Based on an indication of interest, e.g., an affirmative indication via a user input or an inference drawn from selection of the asset by a targeted advertising system, additional information is provided to the user via e-mail, Internet advertising, phone, mail or another mode. In other implementations, a media content element is captured from print, ambient, radio or another media source, e.g., using a camera, audio recorder, keyboard or other user input device. The captured content element is associated with stored additional or follow-on information desired by the user and the additional information is provided by any of the modes noted above. This allows advertisers or other asset providers to realize the benefits of broadcast television as well as the benefits of other modalities such as interactive information delivery via a data network. While delivering additional information in an interactive data network such as the Internet is a particularly advantageous implementation, it will be appreciated that various aspects of the invention are applicable in other contexts.

While much of the description focuses on providing follow-on information relating to captured elements of media content from a first communications mode (e.g., broadcast television content, radio content, Internet content, newspaper content, magazine content, billboard content), it should be understood that the system may be applied to provide follow-on information relating to any type or form of content that is capable of association with a tag that correlates stored follow-on information with the content of interest, as discussed below. That is, a collection of follow-on information may be associated with any product or service regardless of whether the product or service is the subject of an asset delivered via a defined communications mode. For example, a tag may be associated with a menu at a restaurant, a park bench, a point-of-sale display, an article of clothing, etc. In the case of a follow-on asset associated with a menu, for example, through the tag, a restaurant customer may receive additional information relating to the menu, such as nutritional information for select menu items and/or recipes.

The following description is divided into a number of sections. The Introduction section describes the broadcast network and network programming environments. The next section provides an overview of the targeted asset delivery environment, including a discussion of viewer presence and classification technologies as well as related targeted asset delivery technologies. The succeeding section provides an overview and exemplary implementations of a request for information (RFI) system in accordance with the present invention and highlights advantages of certain preferred implementations thereof. The described RFI system includes several components beyond the provision of follow-on assets or information to interested users in a separate network, including encouraging and verifying asset consumption, acquiring consumer behavior information, and correlating verified asset consumption information and consumer behavior information to close the loop with regard to an analysis of asset effectiveness. While applicable in other network environments, these discussions make specific reference to a cable television related implementation.

I. INTRODUCTION

A. Broadcast Networks

One application of the present invention is in the context of networks used to provide broadcast content, herein termed broadcast networks. Such broadcast networks generally involve synchronized distribution of broadcast content to multiple users. However, it will be appreciated that certain broadcast networks are not limited to synchronously pushing content to multiple users but can also be used to deliver content to specific users, including on a user pulled basis. Examples of broadcast networks used to deliver content to specific users on a pulled basis include broadcast networks used to deliver on demand content such as VOD and podcasts. Examples of broadcast networks include cable television networks, free-to-air television broadcasters using ATSC or NTSC, satellite television networks wireline TV networks, and satellite radio networks. In addition, audio, video or other content may be broadcast across Internet protocol and telephony networks. In any such networks, it is common practice to insert or otherwise provide informational content or "assets" such as advertisements (e.g., commercials air during programming breaks or product placement or other content embedded in or superimposed on programming) into a broadcast stream. The present invention provides a variety of functionality in this regard, as will be discussed in detail below.

For purposes of illustration, the invention is described in some instances below in the context of a cable television network implementation. Some major components of a cable television network 100 are depicted in FIG. 1. In the illustrated network 100, a headend 104 obtains broadcast content from any of a number of sources 101-103. Additionally, broadcast content may be obtained from storage media 105 such as via a video server. The illustrated sources include an antenna 101, for example, for receiving content via the airwaves, a satellite dish 102 for receiving content via satellite communications, and a fiber link 103 for receiving content directly from studios or other content sources. It will be appreciated that the illustrated sources 101-103 and 105 are provided for purposes of illustration and other sources may be utilized.

The headend 104 processes the received content for transmission to network users. Among other things, the headend 104 may be operative to amplify, convert and otherwise process the broadcast content signals as well as to combine the signals into a common cable for transmission to network users 107 or the headend 104 may be operative to process the signals to provide individual content for specific households (e.g., household 111). The headend also processes signals from users in a variety of contexts as described below. The headend 104 may thus be thought of as the control center or local control center of the cable television network 100.

Typically, there is not a direct fiber link from the headend 104 to a user equipment device such as a customer premises equipment (CPE) device 108, although this is beginning to change. Rather, this connection generally involves a system of feeder cables and drop cables that define a number of system subsections or branches. This distribution network may include a number of nodes 109. The signal may be processed at these nodes 109 to insert localized content, filter the locally available channels or otherwise control the content delivered to users in the node area. In some cases, the nodes 109 may process content received from the headend 104 to generate individualized content for a specific household. The resulting content within a node area is typically distributed by optical and/or coaxial links 106 to the premises of particular users 107. Finally, the content is processed by the CPE 108, which may include a television, data terminal, a digital set top box, a digital video recorder (DVR), or other terminal equipment. It will be appreciated that digital or analog signals may be involved in this regard.

II. ASSET DELIVERY ENVIRONMENT

A. Broadcast Network Assets

Broadcast networks, such as described in FIG. 1, may include asset-supported and premium content channels/networks. Such programming content generally comes at a substantial cost. That is, the programming providers expect to be compensated for the programming that they provide which has generally been developed or acquired at significant cost. That compensation may be generated by asset delivery revenues, by fees paid by users for premium channels, or some combination of the two. In some cases, funding may come from another source such as public funding.

In the case of asset-supported networks, the conventional paradigm involves time slot buys. Specifically, asset providers generally identify a particular program or time-slot on a particular network where they desire their assets to be aired. The cost for the airing of the asset depends on a number of factors, but primary factors are the size of the audience for the programming in connection with which the asset is aired and the demographic composition of the audience. Thus, the standard pricing model is based on the cost per thousand viewers (CPM), where the desired demographics of those viewers may be specified. The size of the audience is generally determined based on ratings. The most common benchmark for establishing these ratings is the system of Nielsen Media Research Corporation (Nielsen). One technique used by Nielsen involves monitoring the viewing habits of a presumably statistically relevant sampling of the universe of users. Based on an analysis of the sample group, the Nielsen system can estimate what portion of the audience particular programs received and, from this, an estimated audience size for the program can be projected. More specifically, ratings may be generated for each network for each quarter hour segment. The presumption is then made that users for a program (corresponding to a quarter hour segment of a network) also consume the assets for that program. Thus, the historical performance of the particular program, for example, as estimated by the Nielsen system, may be used to set asset delivery prices for future time slots or "breaks" associated with that program.

Generally, a break may include a series of asset delivery spots and the content of a break may be determined by a number of entities. For example, some asset delivery is distributed on a basis coextensive with network programming, e.g., on a national basis. This asset delivery is conventionally scheduled based on a timed play list. That is, the insertion of content is centrally controlled to insert assets at defined times. Accordingly, the programming and national asset delivery may be provided by the programming networks as a continuous content stream without cues for asset insertion. For example, prime-time programming on the major networks is often principally provided in this fashion.

In other cases, individual spots within a break are allocated for Regional Operations Center (ROC), affiliate, super headend or local (headend, zone) content. In these cases, a cue tone or message identifies the start of the asset delivery spot or spots (a series of assets in a break may all trigger from one cue). The cue generally occurs a few seconds before the start of the asset delivery insertion opportunity and may occur, for example, during programming or during the break (e.g., during a national ad). The RFI system of the present invention, as will be more fully discussed herein, can coordinate with equipment at any or all levels of this hierarchy to allow for tracking with respect to national, regional and local entities.

Network operators or local network affiliates can generally schedule the non-national assets to be included within defined breaks or spots for each ad-supported channel. Conventionally, this scheduling is finalized ahead of time, typically on a daily or longer basis. The scheduled assets for a given break are then normally inserted at the headend in response to the cue tone or message in the programming stream. Typically, all assets within a break trigger from a single cue tone or message. Thus, for example, where a given break includes three spots, the scheduled asset for the first spot is inserted at a first time period after the cue, the scheduled asset for the second spot is inserted at a second time period after the cue, and the scheduled asset for the third spot is inserted at a third time period after the cue. Accordingly, prior to broadcast, the identities of the providers of the assets (e.g., national, regional and/or local) that will be provided with programming are known. Therefore, if a user provides an input with respect to an ad spot in the programming, it may be determined which entity's ad was played, based on the time of the spot relative to the programming and/or by identifying metadata associated with the asset, as will be more fully discussed herein.

As noted, network users employ the network, and content providers and network operators derive revenue, based on delivery of desirable content or programming. The stakeholders in this regard include programming providers, asset providers such as advertisers (who may be the same as or different than the programming providers), network operators such as Multichannel Video Programming Distributors (MVPDs), and users—or viewers in the case of television networks. Programming providers include, for example: networks who provide series and other programming, including on a national or international basis; local affiliates who often provide local or regional programming; studios who create and market content including movies, documentaries and the like; and a variety of other content owners or providers.

Asset providers include a wide variety of manufacturers, retailers, service providers and public interest groups interested in, and generally willing to pay for, the opportunity to deliver messages to users on a local, regional, national or international level. Such assets include: conventional advertisements; tag content such as ad tags (which may include static graphic overlays, animated graphics files or even real-time video and audio) associated with the advertisements or other content; banners or other content superimposed on or otherwise overlapping programming; product placement; and other advertising mechanisms. Network operators (e.g., MVPDs) are generally responsible for delivering content to users and otherwise operating the networks as well as for contracting with the networks and asset providers and for billing. Users are the end consumers of the content. Users may employ a variety of types of CPEs or other user equipment devices including television set top boxes, iPOD™ devices, data terminals, wireless devices, satellite delivered video or audio to an automobile and/or appliances with built-in televisions, etc.

As will be discussed in more detail below, one implementation of the present invention involves providing a platform for receiving signals from user equipment devices associated with a cable television network. Based on these signals, the platform identifies an asset of the cable television network that was of interest to a particular user. The platform can then make associated information available to that user (or, optionally, one or more other identified users, e.g., on a "friends" list) via another network. For example, an e-mail may be sent to a stored e-mail address of the user. That e-mail may include additional information about a product of the identified asset of interest and/or a link to a web page having such information.

From the discussion above, it will be appreciated that the signals may be received from a variety of different types of user equipment devices. In this regard, the signals may be based on user inputs such as by entering a designated key of a remote control, phone, PDA, etc. Alternatively or additionally, as will be understood from the description below, the indication of interest may be obtained at least in part from a targeted asset system. Such a system may be operative to identify a user or users currently present at the user equipment device. Such information may be used in conjunction with a user input as noted above to associate the indication of interest with a particular user or users so that a follow-on asset can be appropriately delivered. Of course, the user or users could provide an input identifying themselves but this would render the system more intrusive and might interfere to some extent with the objective of allowing television viewers to retain a substantially passive viewing experience. Moreover, because certain targeted asset systems can identify classification parameters of viewers with a high degree of accuracy and granularity, selection of an asset by such a system may be tantamount to a positive indication of interest (though such selection may be based on desires of an asset provider and not necessarily correspond to desires of a user). Accordingly, the signal transmitted to the platform may be based on a selection by a targeted advertising system rather than a user input. For example, users may opt-in to the targeted asset system in general and may further select a setting that allows asset selections (or certain asset selections) to be used in providing follow-on information or contacts.

In addition, it will be appreciated that the platform may utilize inputs from a variety of sources to properly associate the indication of interest with an asset. As noted above, some commercial spots may be national while others are local. Moreover, channel selections and content may be configured locally by node equipment, DSLAMs and other network platforms. In addition, a targeted asset system may utilize dedicated asset delivery channels or retrieve assets from user equipment device storage. Also assets may be embedded in or superimposed on programming as noted above. Accordingly, a database may be compiled using information from content providers, programming networks, network providers, network equipment, targeted asset systems and the like to identify assets on different channels/bandwidth segments at different times. Alternatively, indications of interest may include asset identifiers.

From the foregoing, it will be appreciated that a targeted asset system may interact with an RFI platform in a variety of ways. An exemplary targeted advertising system is described below. Such a system is described more detail in published U.S. patent application Ser. No. 11/331,835, entitled "Content Selection Based on Signaling from Customer Premises Equipment in a Broadcast Network," and filed on Jan. 12, 2006, which is incorporated herein by reference.

B. The Targeted Asset Delivery Environment

The RFI subject matter of the present invention can be used in a variety of both traditional and targeted asset delivery systems. Some embodiments described below allow for delivery of targeted assets such as advertising so as to address certain shortcomings or inefficiencies of conventional broadcast networks. Generally, such targeting entails delivering assets to desired groups of individuals or individuals having desired characteristics. These characteristics or audience classification parameters may be defined based on personal information, demographic information, psychographic information, geographic information, or any other information that may be relevant to an asset provider in identifying a target audience. Preferably, such targeting is program independent in recognition that programming is a highly imperfect mechanism for targeting of assets. For example, even if user analysis indicates that a particular program has an audience comprised sixty percent of women, and women comprise the target audience for a particular asset, airing on that program will result in a forty percent mismatch. That is, forty percent of the users potentially reached may not be of interest to the asset provider and pricing may be based only on sixty percent of the total audience. Moreover, ideally, targeted asset delivery would allow for targeting with a range of granularities including very fine granularities. For example, it may be desired to target a group, such as based on a geographical grouping, a household characterization or even an individual user characterization. The present invention accommodates program independent targeting, targeting with a high degree of granularity and targeting based on a variety of different audience classifications.

Figure 2:
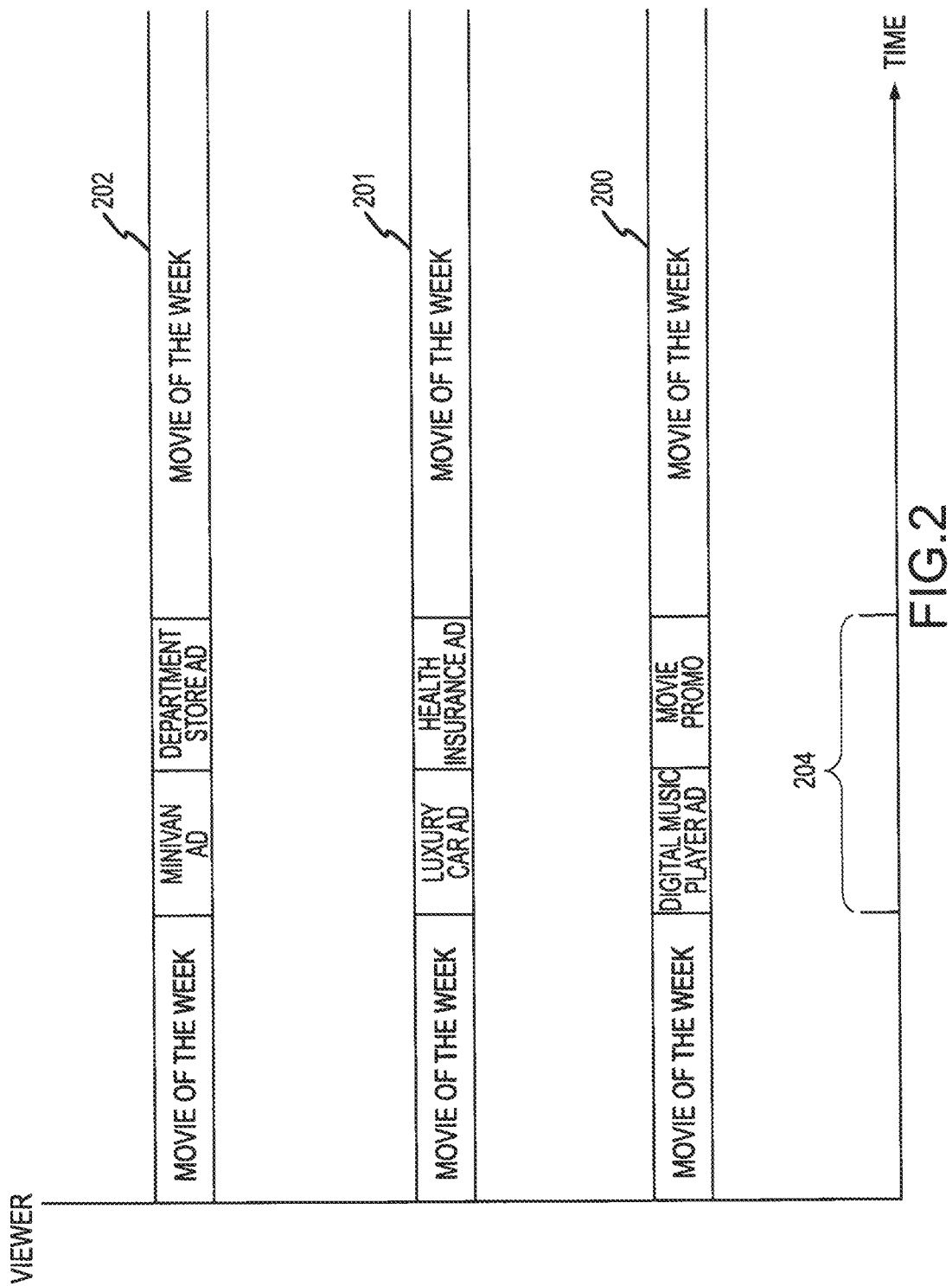
FIG. 2 illustrates a first targeted advertising context of the present invention.
Figure 3:
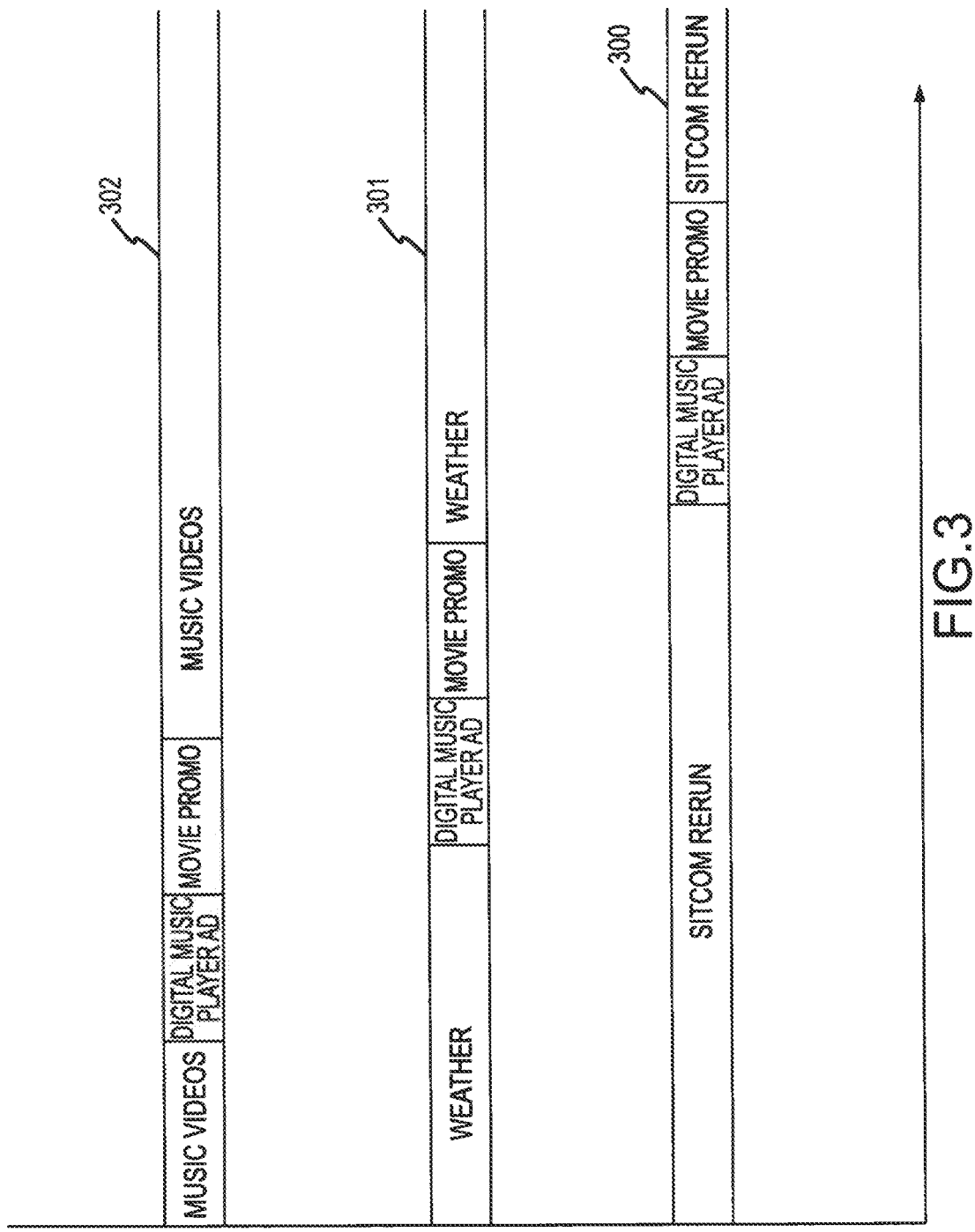
FIG. 3 illustrates another targeted advertising context of the present invention.

FIGS. 2 and 3 illustrate two different contexts of targeted asset delivery supported in accordance with the present invention. Specifically, FIG. 2 illustrates the delivery of different assets, in this case ads, to different users watching the same programming channel, which may be referred to as spot optimization. As shown, three different users 200-202 are depicted as watching the same programming, in this case, denoted "Movie of the Week." At a given break 204, the users 200-202 each receive a different asset package. Specifically, user 200 receives a digital music player ad and a movie promo, user 201 receives a luxury car ad and a health insurance ad, and user 202 receives a minivan ad and a department store ad. Alternately, a single asset provider (e.g., a motor vehicle company) may purchase a spot and then provide different asset options for the spot (e.g., sports car, minivans, pickup trucks, etc.). Similarly, separate advertisers may collectively purchase a spot and then provide ads for their respective products (e.g., where the target audiences of the advertisers are complementary). It will be appreciated that these different asset packages may be targeted to different audience demographics. In this manner, assets are better tailored to particular viewers of a given program who may fall into different demographic groups. Thus, spot optimization refers to the delivery of different assets (by one or multiple asset providers) in a given spot.

Figure 4:
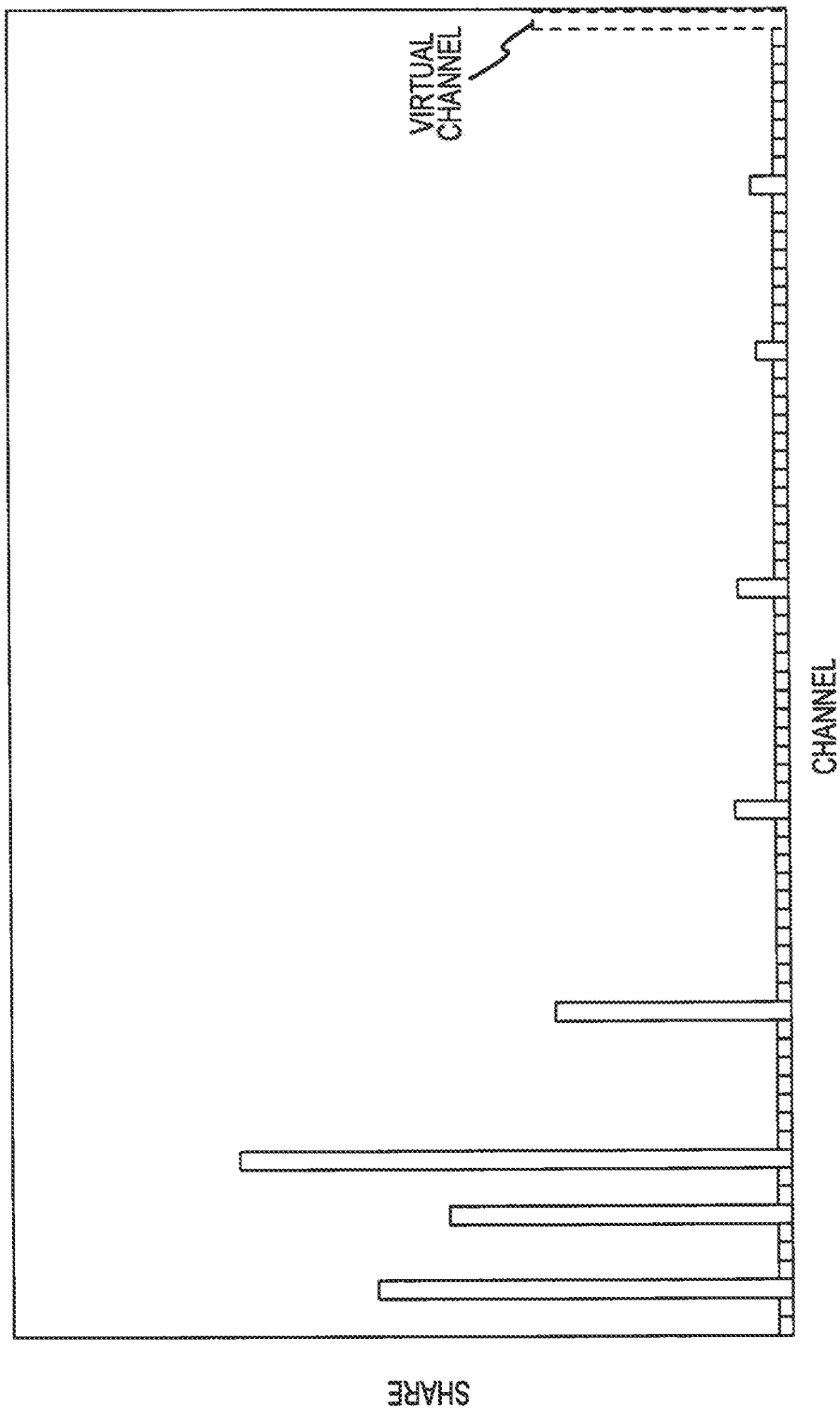
FIG. 4 illustrates an objective of audience aggregation in the context of FIG. 3.

FIG. 3 illustrates a different context of the present invention, which may be termed audience aggregation. In this case, three different users 300-302 viewing different programs associated with different channels may receive the same asset or asset package. In this case, each of the users 300-302 receives a package including a digital music player ad and a movie promo in connection with breaks associated with their respective channels. Though the users 300-302 are shown as receiving the same asset package for purposes of illustration, it is likely that different users will receive different combinations of assets due to differences in classification parameters. In this manner, users over multiple channels (some or all users of each channel) can be aggregated (relative to a given asset and time window) to define a virtual channel having significant user numbers matching a targeted audience classification. Among other things, such audience aggregation allows for the possibility of aggregating users over a number of low share channels to define a significant asset delivery opportunity, perhaps on the order of that associated with one of the high share networks. This can be accomplished, in accordance with the present invention, using equipment already at a user's premises (i.e., an existing CPE). Such a virtual channel is graphically illustrated in FIG. 4, though this illustration is not based on actual numbers. Thus, audience aggregation refers to the delivery of the same asset in different spots to define an aggregated audience. These different spots may occur within a time window corresponding to overlapping (conflicting) programs on different channels. In this manner, it is likely that these spots, even if at different times within the window, will not be received by the same users.

Figure 5:
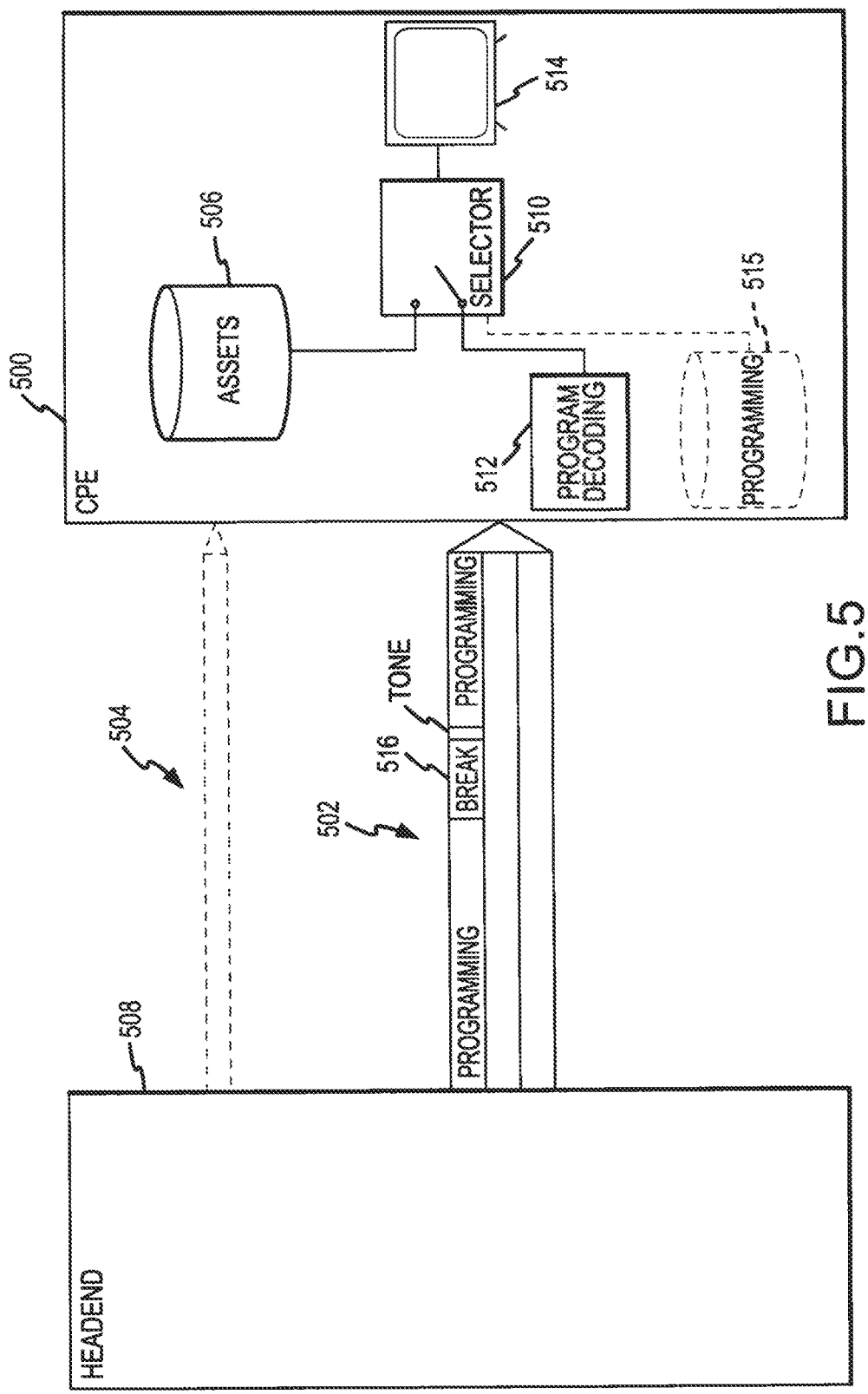
FIG. 5 illustrates an asset delivery system in accordance with one implementation of the present invention.

Such targeting including both spot optimization and audience aggregation can be implemented using a variety of architectures in accordance with the present invention. Thus, for example, as illustrated in FIG. 5, targeted asset insertion can be implemented at the CPEs. This may involve a forward-and-store functionality. As illustrated in FIG. 5, the CPE 500 receives a programming stream 502 and an asset delivery stream 504 from the headend 508. These streams 502 and 504 may be provided via a common signal link such as a coaxial cable or via separate communications links. For example, the asset delivery stream 504 may be transmitted to the CPE 500 via a designated segment, e.g., a dedicated frequency range, of the available bandwidth or via a programming channel that is opportunistically available for asset delivery, e.g., when it is otherwise off air. The asset delivery stream 504 may be provided on a continuous or intermittent basis and may be provided concurrently with the programming stream 502. In the illustrated example, a program-decoding unit, such as a digital set top box, processes the programming stream 502, and programming is displayed on television set 514. Alternatively, the programming stream 502 may be stored in programming storage 515 for CPE insertion.

In the illustrated implementation, the asset, together with metadata identifying, for example, any audience classification parameters of the targeted audience, is stored in a designated storage space 506 of the CPE 500. It will be appreciated that substantial storage at the CPE 500 may be required in this regard. For example, such storage may be available in connection with certain DVR units. A selector 510 is implemented as a processor running logic on the CPE 500. The selector 510 functions analogously to the headend selector described above to identify breaks 516 and insert appropriate assets. In this case, the assets may be selected based on classification parameters of the household or, more preferably, a user within the household. Such information may be stored at the CPE 500 or may be determined based on an analysis of viewing habits such as a click stream from a remote control as will be described in more detail below. Certain aspects of the present invention can be implemented in such a CPE insertion environment.

Figure 6:
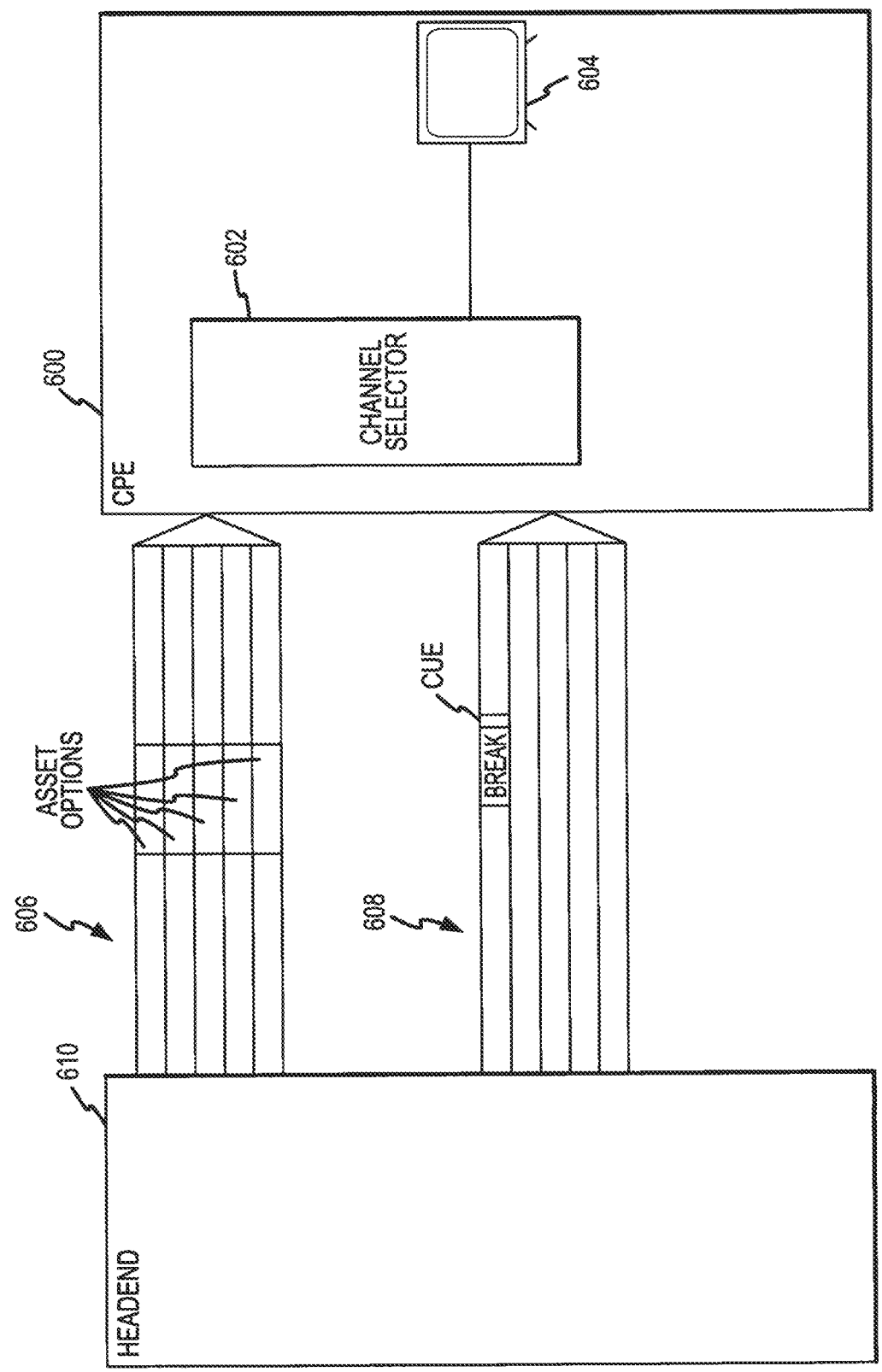
FIG. 6 illustrates an asset delivery system in accordance with a further implementation of the present invention.

In FIG. 6, a different architecture is employed. Specifically, in FIG. 6, asset options transmitted from headend 610 synchronously with a given break on a given channel for which targeted asset options are supported. The CPE 600 includes a channel selector 602, which is operative to switch to an asset channel associated with a desired asset at the beginning of a break and to return to the programming channel at the end of the break. The channel selector 602 may hop between channels (between asset channels or between an asset channel and the programming channel) during a break to select the most appropriate assets. In this regard, logic resident on the CPE 600 controls such hopping to avoid switching to a channel where an asset is already in progress. As described below, this logic can be readily implemented, as the schedule of assets on each asset channel is known. Preferably, all of this is implemented invisibly from the perspective of the user of set 604. The different options may be provided, at least in part, in connection with asset channels 606 or other bandwidth segments (separate from programming channels 608) dedicated for use in providing such options. In addition, certain asset options may be inserted into the current programming channel 608. Associated functionality is described in detail below. The architecture of FIG. 6 has the advantage of not requiring substantial storage resources at the CPE 600 such that it can be immediately implemented on a wide scale basis using equipment that is already in the field.

As a further alternative, the determination of which asset to show may be made at the headend. For example, an asset may be selected based on voting as described below, and inserted at the headend into the programming channel without options on other asset channels. This would achieve a degree of targeting but without spot optimization opportunities as described above. Still further, options may be provided on other asset channels, but the selection as between those channels may be determined by the headend. For example, information about a household or user (e.g., brand of car owned, magazines subscribed to, etc.) stored on the headend may be used to match an asset to a household or user. That information, which may be termed "marketing labels," may be used by the headend to control which asset is selected by the CPE. For example, the CPE may be instructed that it is associated with an "ACME preferred" customer. When an asset is disseminated with ACME preferred metadata, the CPE may be caused to select that asset, thereby overriding (or significantly factoring with) any other audience classification considerations. However, it will be appreciated that such operation may entail certain concerns relating to sensitive information or may compromise audience classification based targeting in other respects.

Figure 7:
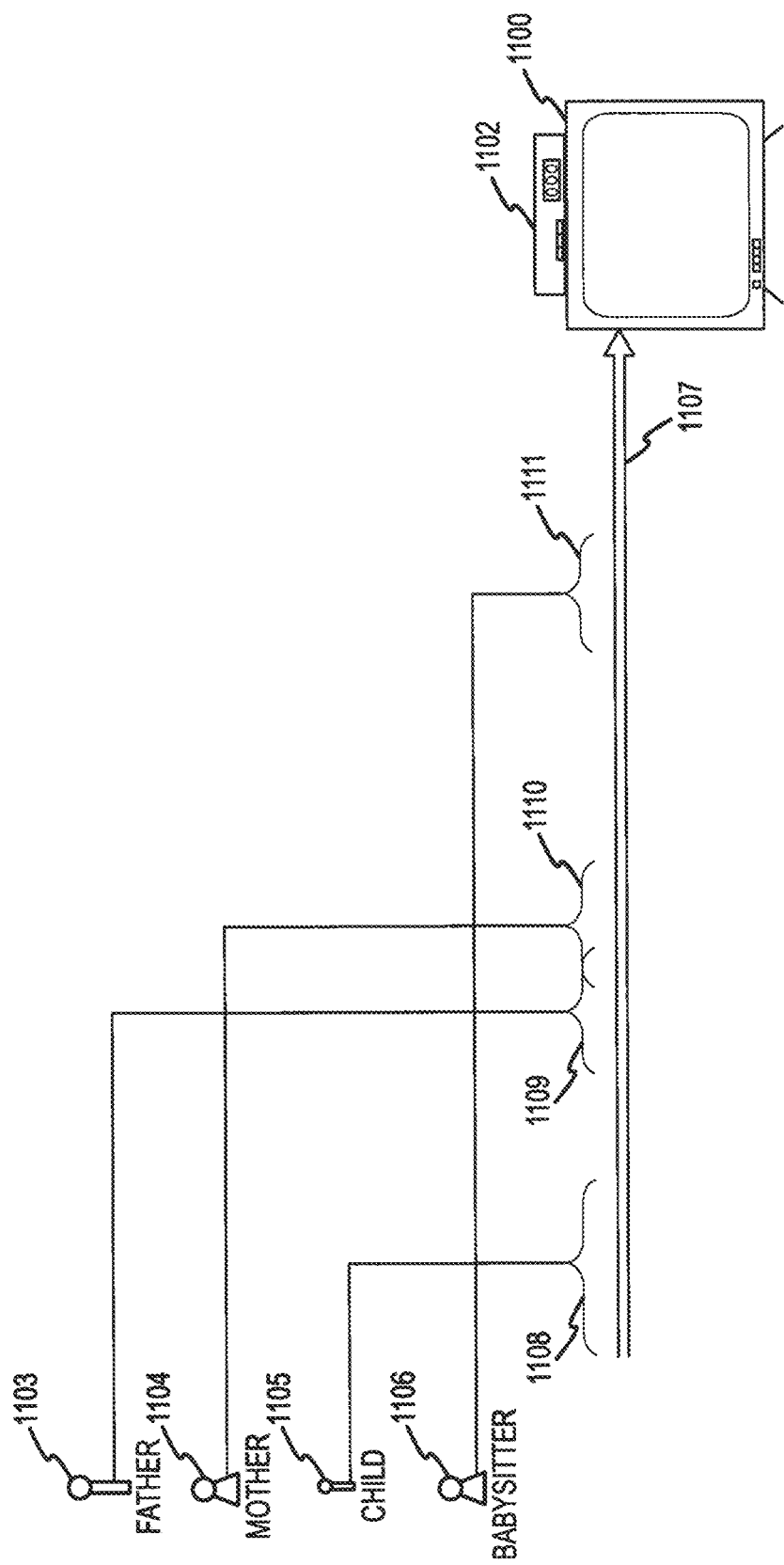
FIG. 7 illustrates the problem of multiple viewers in relation to the present invention.

Much of the discussion above has referenced audience classification parameters as relating to individuals as opposed to households. FIG. 7 illustrates a theoretical example of a CPE including a television set 1100 and a digital set top box 1102 that are associated with multiple users 1103-1106. Arrow 1107 represents a user input stream, such as a click stream from a remote control, over time. A first user 1105, in this case a child, uses the television 1100 during a first time period—for example, in the morning. Second and third users 1103 and 1104 (designated "father" and "mother") use the television during time periods 1109 and 1110, which may be, for example, in the afternoon or evening. A babysitter 1106 uses the television during a nighttime period in this example.

This illustrates a number of challenges related to targeted asset delivery. First, because there are multiple users 1103-1106, targeting based on household demographics would have limited effectiveness. For example, it may be assumed that the child 1105 and father 1103 in many cases would not be targeted by the same asset providers. Moreover, in some cases, multiple users may watch the same television at the same time as indicated by the overlap of time periods 1109-1110. In addition, in some cases such as illustrated by the babysitter 1106 an unexpected user (from the perspective of the targeted asset system) may use the television 1100.

These noted difficulties are associated with a number of objectives that are preferably addressed by the targeted asset system. First, the system should preferably be operative to distinguish between multiple users of a single set and, in the context of the system described above, vote and report to the network accordingly. Second, the system should preferably react over time to changing conditions such as the transitions from use by father 1103 to use by both father and mother 1103 and 1104 to use by only mother 1104. The system should also preferably have some ability to characterize unexpected users such as the babysitter 1106. In that case, the system may have no other information to go on other than the click stream 1107. The system may also identify time periods where, apparently, no user is present, though the set 1100 may still be on. Preferably, the system also operates free from persistent storage of any user profile or sensitive information so that no third party has a meaningful opportunity to misappropriate such information or discover the private network usage patterns of any of the users 1103-1106 via the targeted asset system. Privacy concerns can alternatively be addressed by obtaining consent from users. In this matter, sensitive information including personally identifiable information, or PII, can be transmitted across the network and persistently stored for use in targeting. This may allow for compiling a detailed user profile, e.g., at the headend. Assets can then be selected based on the user profile and, in certain implementations, addressed to specific CPEs.

In certain implementations, the present invention monitors the click stream over a time window and applies a mathematical model to match a pattern defined by the click stream to predefined audience classification parameters that may relate to demographic or psychographic categories. It will be appreciated that the click stream will indicate programs selected by users, volume and other information that may have some correlation, at least in a statistical sense, to the classification parameters. In addition, factors such as the frequency of channel changes and the length of time that the user lingers on a particular asset may be relevant to determining a value of an audience classification parameter. The system can also identify instances where there is apparently no user present.

In a first implementation, as is described in U.S. patent application Ser. No. 11/743,544, entitled "Fuzzy Logic Based Viewer Identification for Targeted Asset Delivery System," filed May 2, 2007, which is incorporated herein by reference, logic associated with the CPE 1101 uses probabilistic modeling, fuzzy logic and/or machine learning to progressively estimate the audience classification parameter values of a current user or users based on the click stream 1107. This process may optionally be supplemental based on stored information (preferably free of sensitive information) concerning the household that may, for example, affect probabilities associated with particular inputs. In this manner, each user input event (which involves one or more items of change of status and/or duration information) can be used to update a current estimate of the audience classification parameters based on associated probability values. The fuzzy logic may involve fuzzy data sets and probabilistic algorithms that accommodate estimations based on inputs of varying and limited predictive value.

In a second implementation, as is described in U.S. patent application Ser. No. 11/994,078, entitled "Method and Apparatus to Perform Real-Time Audience Estimation and Commercial Selection Suitable for Targeted Advertising," filed Nov. 21, 2007, which is incorporated herein by reference, the audience is modeled as an incomplete or noisy signal that can be processed to obtain audience classification parameter information. More specifically, a series of clicks over time or associated information provides observations reflecting the audience. The audience is the desired signal. However, the signal is assumed to be incomplete or noisy—a common problem in signal processing. Accordingly, filtering techniques are employed to estimate the "true" signal from the input stream and associated algorithms correlate that signal to the desired audience classification information. For example, a nonlinear adaptive filter may be used in this regard.

The targeted advertising system provides a variety of information that can be used in directing follow-on information to network users. This includes information identifying the user as well as classification parameter information. Systems for using such information to deliver follow-on information will now be described.

III. RFI SYSTEM OVERVIEW AND EXEMPLARY APPLICATIONS

A. Follow-on Information Request and Delivery

Figure 12:
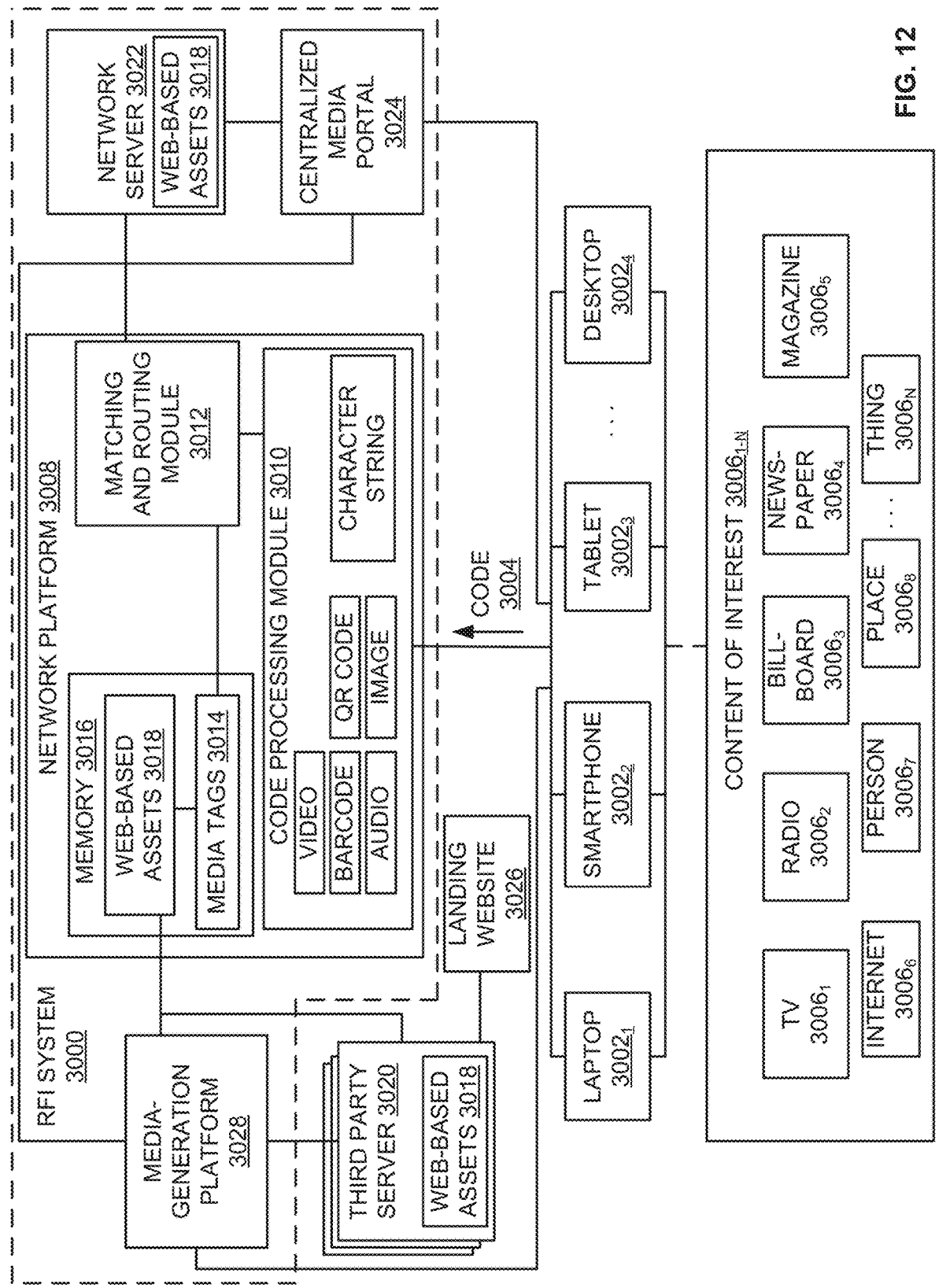
FIG. 12 illustrates a functional diagram of another embodiment of a request for information system in communication with a number of user devices and third party servers.

FIG. 12 shows a functional diagram of an exemplary application of an RFI system 3000 for use in providing follow-on content in relation to various media and non-media items of content of interest. The RFI system 3000 may be employed in the context of a broadcast network environment such as the targeted asset delivery environment discussed above or it may be implemented in a manner that is independent of a broadcast network. As a result, the RFI system 3000 may support multiple forms of media content such as print assets (e.g., newspaper articles or advertisements, magazine articles or assets), billboard assets, radio assets (programming or advertisements), television assets (programming or advertisements) provided via broadcast network programming and/or Internet video such as that provided on YouTube®, Netflix®, Hulu™, or with Video-on-Demand (VOD) services, and more. The RFI enabled or supported content may also include non-media content encompassing literally any type of content or item (e.g., any person, place, or thing). For instance, beyond elements of media content such as television and radio programming, print articles, advertisements, billboards, and so on, supported non-media content may include, to name a few, individuals, businesses, buildings and/or monuments, works of art, electronic items, all types of commercial products and/or services and related packaging, marketing materials, and/or point of sale displays, and more.

Further, these types of media and non-media content may or may not be specially adapted for use with the RFI system 3000.

Specifically, FIG. 12 shows examples of numerous different types of internet-enabled user devices $3002_{1-n}$ that may be used to submit an RFI request, or to capture a code 3004 that identifies an item of content about which the user is interested in obtaining more information and transmit that code 3004 to a network platform 3008. The user device $3002_{1-n}$ may include, for example, a laptop or desktop computer, a tablet computer, an internet-enabled mobile phone/smart phone, and so on. In addition, the code 3004 captured by the user device $3002_{1-n}$ may be any type of content identifier. In some instances, the code 3004 may be an alphabetic, numeric, or alphanumeric character string that has been associated with the content of interest. In other instances, the code may be a barcode, a quick response code (QR code), an audio or video snippet of media content (e.g., a recording of a radio show, a video of a live sporting event), a voice recording, or a still image of any person, place, or thing.

The user device $3002_{1-n}$ may enable an RFI application such as a software application (e.g., a smart phone application) that runs on the device $3002_{1-n}$. The RFI application facilitates RFI requests in that it allows the user device $3002_{1-n}$ to capture the code 3004 relating to the content of interest in a variety of different ways. In this regard, the RFI application may include one or more information gathering mechanisms that enable the user to capture the various types of identifying codes 3004. For example, the user device $3002_{1-n}$ may capture a digital image of televised media content of interest playing on a television $3006_1$. In other examples, the user device $3002_{1-n}$ may capture a digital image of media content appearing in a newspaper $3006_4$, a magazine $3006_5$, or on a billboard $3006_3$. The RFI application may also enable the user device $3002_{1-n}$ to capture an audio recording of the user's voice describing the content of interest, reciting an alphabetic, numeric, or alphanumeric character string associated with the content of interest or to record an audio snippet of media content playing on a radio 30062, the television $3006_1$, or on an Internet webpage $3006_6$. The RFI application may also include a bar code reader or similar mechanism for deciphering barcodes, QR codes, UPC codes, and the like. The user may also manually enter an alphabetic, numeric, or alphanumeric character string using a keyboard or other user interface. Using the information gathering mechanisms available through the RFI application, the user device $3002_{1-n}$ may be implemented to capture a code 3004 that relates to literally any person $3006_7$, place $3006_8$, or thing $3006_n$ of interest to the user.

Once captured, the user device $3002_{1-n}$ may transfer or transmit the code 3004 to a code processing module 3010 of a network platform 3008. This transmittal may be an electronic transmittal facilitated by the RFI application, an email, a text message, or any other appropriate form of electronic transfer. Moreover, the code 3004 may be forwarded to the network platform 3008 via various modalities. Some of these modalities include a communication structure of a cable television network, a data network, a telephone network, or any other modality by which the captured code 3004 may be directly or indirectly communicated to the RFI system 3000.

A code processing module 3010 of the network platform 3008 may employ a variety of processing algorithms and/or logic to process the code 3004 received from the user device $3002_{1-n}$. For example, the code processing module 3010 may include mechanisms for processing recorded audio or video snippets, captured images, and transmitted alphabetic, numeric, and/or alphanumeric character strings, barcodes, QR codes, and so on. In one example, the code processing module 3010 may analyze an audio snippet recorded from a radio talk show to identify the title of the show recorded and the timing of the recorded snippet. In another example, the code processing module 3010 may analyze an image captured of a user's television to identify the television program showing at the time of the image and the timing of the captured image.

The processing algorithms of the code processing module 3010 may also refer to ancillary information sent from the user device $3002_{1-n}$ along with the code 3004. Such ancillary information may include, for instance, a date, time, and channel or station upon which the content of interest $3006_{1-n}$ was captured or a GPS location of the user device $3002_{1-n}$ at the time the content of interest was captured. In the case of an RFI system implemented in conjunction with a targeted advertising system, demographic information may be provided from the user device or from another location such as a database of the network provider, subject to privacy rules as discussed below.

A matching and routing module 3012 of the network platform 3008 may function in cooperation with the code processing module 3010 and may include any appropriate processing logic needed to match the code 3004 against a library of media tags 3014 stored within a memory structure 3016 of the network platform 3008. This matching process results in the identification of at least one stored media tag 3014, which may include instructions for providing an associated web-based asset 3018 to the requesting user device $3002_{1-n}$ (or another user device $3002_{1-n}$) based upon the location of the of the associated web-based asset 3018. The tag 3014 identified via the matching process may also indicate that the asset 3018 associated with the tag 3014, and thus the code 3004, has expired or otherwise become invalid. In this case, the user may receive a message rejecting the RFI request and, in one embodiment, providing suggestions regarding the retrieval of additional and/or later-dated assets 3018.

The web-based asset 3018 may include any information that may be provided to the user, via the user device $3002_{1-n}$ or otherwise, in response to the RFI request (submission of the code 3004). For example, the web-based asset may include or implement coupons or other financial incentives, product and/or service information, websites/purchase interfaces, web-based contests, web-based polling or voting, or any other information related to the content of interest $3006_{1-n}$.

The associated web-based asset 3018 may be stored in numerous accessible memory structures. For example, the associated web-based asset 3018 may be stored (1) within the memory structure 3016 of the network platform 3008, (2) at a network server 3022 that is operated in conjunction with the network platform 3008 and configured to host a centralized media portal 3024 for accessing web-based assets 3018, or (3) at a third-party server 3020 that is in communication with the network platform 3008 and configured to host a stand-alone, third-party landing web site 3026.

These asset storage options allow producers of web-based assets 3018 to store and host their own assets 3018 and separately provide them to the user devices $3002_{1-n}$ upon request. They also allow producers of web-based assets 3018 to take advantage of a centralized storage and access system that is maintained by the RFI system operator. For example, a producer of a web-based asset 3018 may store and host its web-based assets 3018 independently or it may store its assets 3018 within the RFI system 3000 such that the network server 3022 hosts the assets 3018 and makes the assets 3018 accessible to user devices through the centralized media portal 3024. Similar to the mechanisms available for forwarding the code 3004 to the network platform 3008, discussed above, any appropriate modality may be utilized to deliver the associated web-based asset 3018 to the user device $3002_{1-n}$.

To accommodate this variety of options for storing the web-based assets 3018, the stored media tag 3014 that matches the code 3004 submitted by the user device $3002_{1-n}$ may include instructions for various components of the RFI system 3000 regarding the provision of the associated/requested web-based asset 3018 to the client device $3002_{1-n}$. For instance, if the web-based asset 3018 has been stored in the memory 3016 of the network platform 3008 or at the network server 3022 operated in conjunction with the network platform 3008, the matching stored media tag 3014 may provide instructions for the matching and routing module 3012 to direct the client device $3002_{1-n}$ to the centralized media portal 3024 hosted by the network server 3022. The network platform 3008 and network server 3022 may reside on a single machine or multiple machines and may be co-located or geographically distributed. Alternatively, if the web-based asset 3018 has been stored in the third party server 3020, the matching stored media tag 3014 may provide instructions for the matching and routing module 3012 to direct the client device $3002_{1-n}$, to the landing website 3026 hosted by the third-party server.

In addition to mechanisms for receiving RFI requests and providing the web-based assets 3018 to the user devices $3002_{1-n}$, one embodiment of the RFI system 3000 may include a media generation platform 3028. The media-generation platform 3028 may be operated in conjunction with the network platform 3008 and may be communicatively coupled with any of the components of the RFI system 3000 and/or the third-party server 3020. More specifically, the media-generation platform 3028 may include any appropriate logic and/or software tools to enable a user to produce a web-based asset 3018 and associate the asset with a media tag 3014 for storage within the memory 3016 of the network platform 3008. In this regard, the centralized media portal 3024 may include a user interface through which a user at any one of the user devices $3002_{1-n}$ may interact with the media-generation platform 3028 in generating media assets 3018. The functionality of the media-generation platform 3028 will be detailed further below.

Figure 13A:
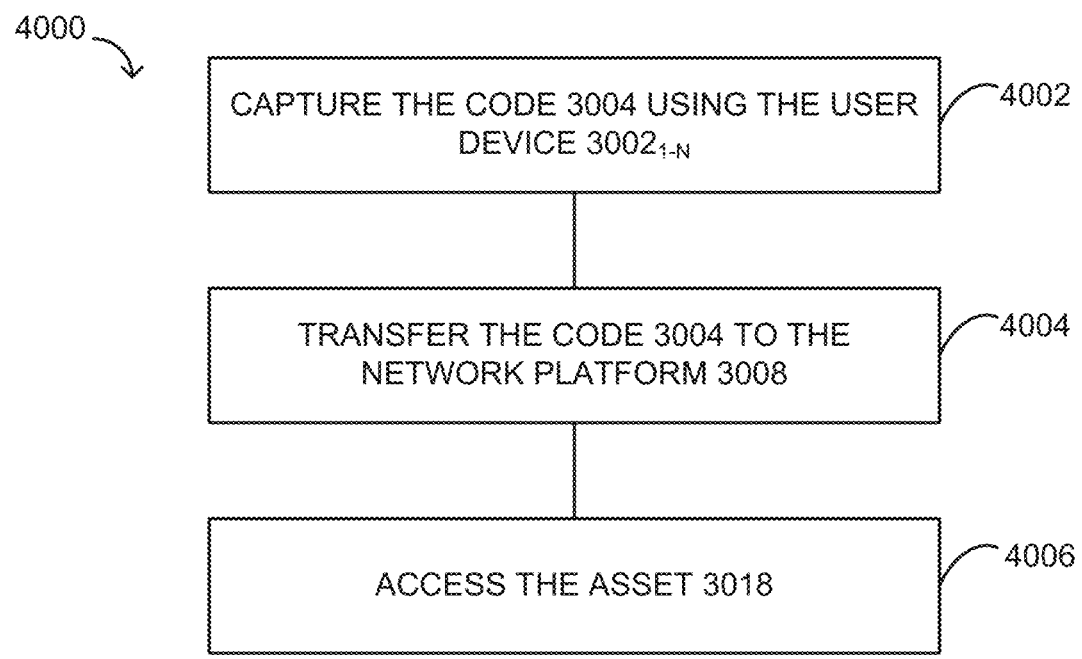
FIG. 13A provides a flow chart that illustrates the functionality of an exemplary request for information system from the perspective of a user device.

FIG. 13A shows a flow chart 4000 that illustrates the functionality of the RFI system 3000 from the user's perspective. Initially, an RFI application running on the user device $3002_{1-n}$ may be used to capture the code 3004 relating to the item of content of interest $3006_{1-n}$ in which the user is interested (4002). As discussed above, the item of content of interest $3006_{1-n}$ may be any media or non-media content that is of interest to the user and that has been associated with a stored media tag 3014 on the network platform 3008. Further, the RFI application may enable numerous mechanisms for capturing the identifying code 3004 relating to the item of content of interest $3006_{1-n}$, including capturing a voice recording, capturing an audio or video snippet reflecting a portion of the content of interest, capturing an image of the content of interest or of a character string that has been associated with the content of interest, or capturing a typed or spoken character string that has been associated with the content of interest.

Next, the user device $3002_{1-n}$ may transfer the code 3004 to the code processing module 3010 of the network platform 3008 as an RFI request (4004). In this embodiment, after the network platform 3008 processes the code 3004 and matches it against the library of stored media tags 3014, the user device accesses the corresponding asset 3018 in a manner provided by the selected media tag 3014 (4006).

FIG. 13B shows a flow chart 4008 that illustrates the functionality of the RFI system 3000 from the perspective of the network platform 3008. Initially, the code processing module 3010 of the network platform 3008 receives the transmitted code 3004 from the user device $3002_{1-n}$ (4010). Upon receipt, the code processing module 3010 may determine whether the code 3004 requires analysis or deciphering prior to being matched against the library of stored media tags 3014 (4012). If the code 3004 requires processing (e.g., voice or video recognition software is needed to interpret the code 3004), the code processing module 3010 may apply code processing logic to decipher the code 3004 (4014). If the code 3004 is clear without analysis or if code processing is complete, the matching and routing module 3012 may compare the code 3004 to the stored media tags 3014 within the memory structure 3016 of the network platform 3016 (4016) to identify a corresponding one of the media tags 3014 (4018).

The corresponding media tag 3014 may include instructions regarding the provision of the web-based asset 3018 associated with the corresponding media tag 3014 to the user device $3002_{1-n}$. Thus, the matching and routing module 3012 or any other appropriate processing module of the network platform 3008 may process the corresponding stored media tag 3014 (4020), and based upon the instructions provided in the corresponding media tag 3014, the matching and routing module 3012 of the network platform 3008 may cause the associated web-based asset 3018 to be provided to the user device $3002_{1-n}$. That is, in this embodiment, it is first determined whether the associated asset 3018 resides on the RFI system 3000 (e.g., on the network platform 3008 or the network server 3022) or whether the associated asset is stored on a third-party server 3020 (4022). If the associated asset is stored within the RFI system 3000, the matching and routing module 3012 may direct the user device $3002_{1-n}$ to access the asset 3018 through the centralized media portal 3024 hosted by the network server 3022 (4024). If, on the other hand, the asset 3018 is stored at one of the third-party servers 3020, the matching and routing module 3012 may direct the client device to the landing website 3026 hosted by the third party server to access web-based asset 3018 (4026).

It will thus be appreciated that one or more networks and user devices may be involved in the RFI request and/or delivery of the asset 3018 to the user. The following discussion details a series of screenshots demonstrating an exemplary implementation in which a data terminal such as a data-enabled telephone or PDA is used in capturing a code identifying a defined item of content of interest that has been associated with a media tag and a web-based asset, transmitting the code/identifier to an RFI system, and/or receiving additional information or the web-based asset responsive to the RFI request. This is a convenient implementation as such terminals often include functionality for capturing content and communicating content to a network platform, and include on-board resources that can be programmed to execute an application for implementing the RFI functionality. However, it should be appreciated that any of this functionality may be distributed between multiple devices. Thus, for example, a digital image or audio recording may be captured on a first device and an associated file may be uploaded to a separate data terminal for emailing or otherwise electronically transmitting the file to the RFI system. Moreover, a smart phone, PDA, or cable television box may be used to submit an RFI request, and a computer or other data terminal may be used to retrieve or review the additional information. Thus, the following description should be understood as exemplifying one implementation of the invention and not by way of limitation.

Figure 14B:
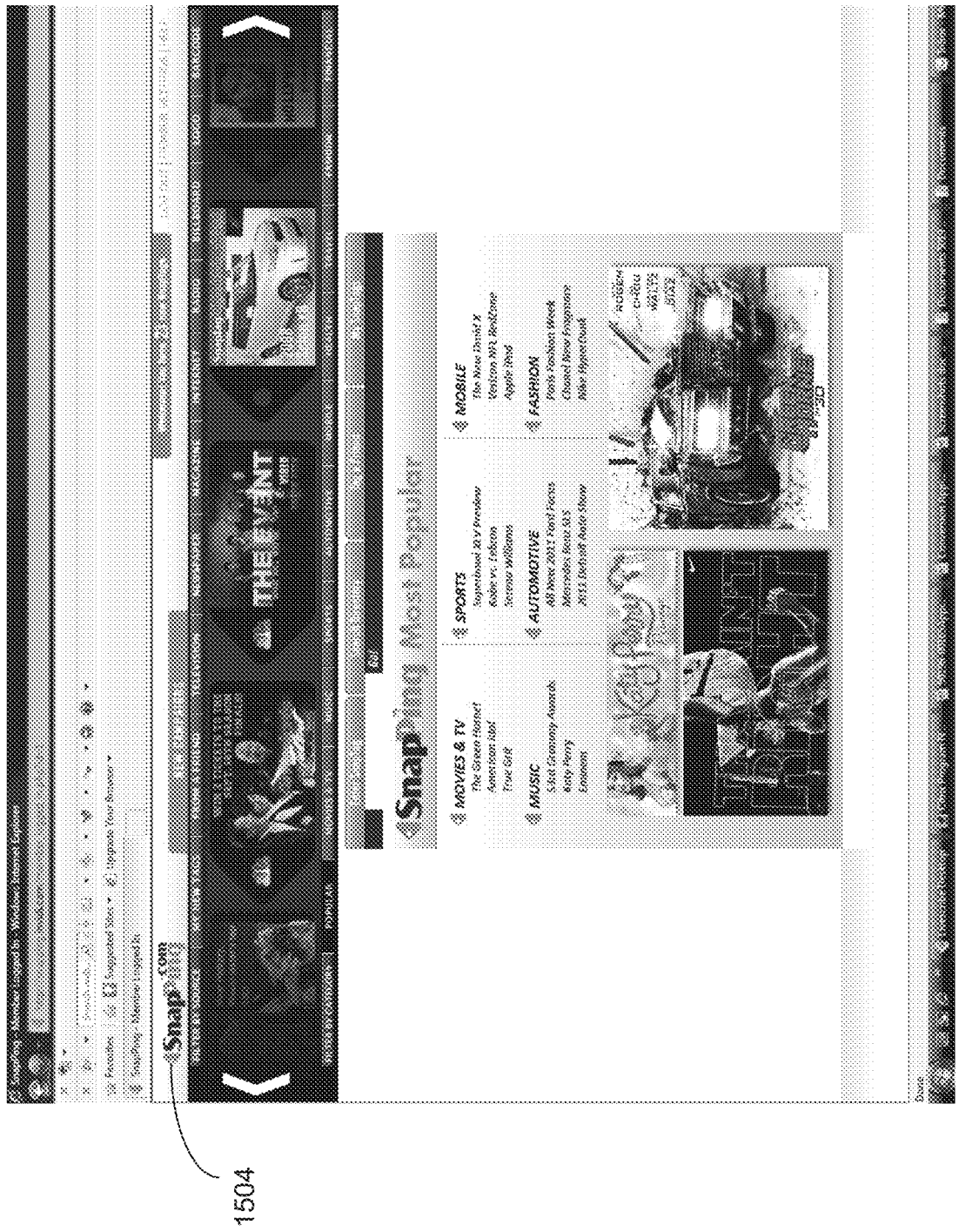
FIG. 14B illustrates a screenshot of an exemplary centralized data network platform, identified by the URL www.SnapPing.com, operated in conjunction with a request for information system.

FIG. 14A illustrates a smart phone 1500 that may be utilized in capturing a content identifier, or an RFI code, transmitting the code to an RFI system, and/or receiving additional information or a notification regarding additional information in accordance with the present invention. The illustrated smart phone 1500 includes a processor for running an RFI application to execute the noted functionality. The smart phone 1500 further includes a user interface 1502 for displaying graphics and receiving inputs from a user. In the illustrated embodiment, the user interface 1502 includes a touch screen, but it will be appreciated that another user interface element such as a video terminal, mouse, voice recognition logic, or the like may be employed. In FIG. 14A, the user interface 1502 displays a splash screen associated with an exemplary RFI application denoted SnapPing™. This application may be associated with one or more centralized data network platforms 1504 identified by the URL www.snapping.com, shown in FIG. 14B. Such an RFI system may be hosted and/or operated by, for example, an MVPD, a content provider, a conventional television network broadcaster, an advertising aggregator, a targeted advertising company, or a dedicated RFI service provider.

The RFI application may be activated in any variety of ways. For example, the user may click (touch) on an RFI icon on the smart phone user interface. Alternatively, the RFI application may be voice-activated. As a further alternative, the RFI application may be initiated automatically upon sensing an RFI identifier or code. Upon activation of the RFI application, the user may be presented with a screen, such as shown in FIG. 14A, providing the user with a number of opportunities to initiate an RFI request. In the illustrated example, the user is prompted to enter, via a touch screen, a selection of an option from "take a picture," "record audio," "directory," "enter code," and "my SnapTags." The options may also include other desired options. For example, the options may include a "buy now" option to initiate an instant-purchasing function of the RFI application.

Thus, if the user selects the "take a picture" graphical object (as discussed in more detail below), the user may be prompted to capture an identifying code using a digital camera associated with the smart phone. A user might select this option in order to take a picture of a television screen, a billboard, print media, or another item of content that can be captured using a camera.

The user may select the "record audio" graphical object to capture a content identifier, or code, via an audio recording. In one example, this option may be selected to capture audio from a radio or an audio track from television. The "record audio" option may also encompass voice-recordation functionality, which may be implemented in a variety of ways. For example, the user may enter a tag identifier or code by reading a portion of print media, describing the content of interest (e.g., "billboard at mile marker 27 of Highway X"), or reciting a character string that identifies the content (e.g., "bmw325im").

The "directory" option allows the user to request specific assets from a directory. For example, if the user enters the "view directory" option, the user may then be able to search for and select commercials, product information, coupons, general information, or any other additional information that is available in the directory. Such information may be searched using a variety of tools including keyword searches, location searches, channel, station, or other media identifiers, time, or any other search modality.

The user may select an "enter code" option in order to enter an RFI code or identifier via a keyboard, touch screen, or the like. As noted above, such codes may be provided in connection with the elements of content and may include any appropriate identifiers such as alphabetic, numeric, or alphanumeric character strings, one-dimensional or two-dimensional bar codes, QR codes, or UPC codes.

While not illustrated in FIG. 14A, an optional "buy now" option may be selected where the user desires to consummate a transaction and not merely receive additional information. Thus, for example, if the user selects the "buy now" option, the user may be prompted to enter a code or the application may automatically detect the subject matter of interest. The user may then be provided an option to electronically complete a transaction regarding the subject matter of interest. Thus, for example, if an RFI character string is displayed in connection with a commercial, the user may enter the "buy now" option. The user may then be prompted to enter the character string. Upon entering the RFI character string, the user may be provided with a "buy now" interface to consummate the transaction. This may be executed at an e-commerce portal of the provider of the product or service, by the RFI system acting as an e-commerce portal on behalf of affiliates, or at a separate e-commerce portal. Alternatively, the transaction may be consummated by other mechanisms such as a telephone connection to an operator. In any case, the user may be prompted to enter credit card or other financial information to execute the transaction, or such information may be securely retrieved from the RFI system.

Figure 15:
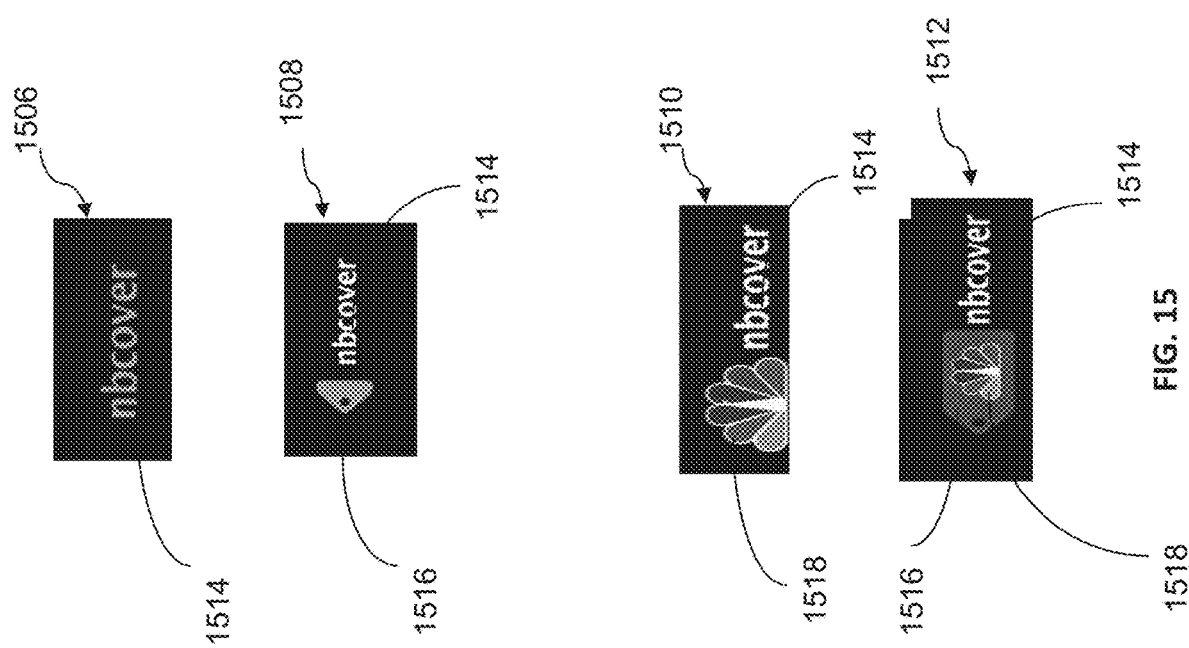
FIG. 15 illustrates a number of exemplary request-for-information icons for association with content of interest.

As noted above, an RFI tag and corresponding asset may be associated with any type of content. To alert users that an element of content is associated with a tag, an icon representing the tag may be affixed to or associated with the content itself. Such an icon may take any suitable form. It is desirable that the icons have a standardized format in order to enhance recognition of the icon by consumers. FIGS. 15-16, 17A-H, and 18 show numerous exemplary icons. Specifically, FIG. 15 shows an icon 1506 that includes an alphabetic character string 1514 that may serve as the code submitted to an RFI system when making an RFI request. Here, the character string 1514 states "nbcover". FIG. 15 also shows an icon 1508, which includes the character string

1514 as well as a SnapPing™ logo 1516. The SnapPing™ logo 1516 expressly indicates to users that an RFI tag and a corresponding asset have been associated with the content. Another icon 1510 includes the character string 1514 as well as a third-party branding panel 1518 that identifies a brand associated with the content and any associated tag and asset. The branding panel 1518 may correspond to a provider or entity associated with the content being captured and/or an entity from whom additional information/an asset is requested. Here, the branding panel 1518 incorporates an NBC trademark. FIG. 15 also shows an icon 1512, which includes the character string 1514 as well as the branding panel 1518 overlaid upon the SnapPing™ logo 1516.

Figure 16:
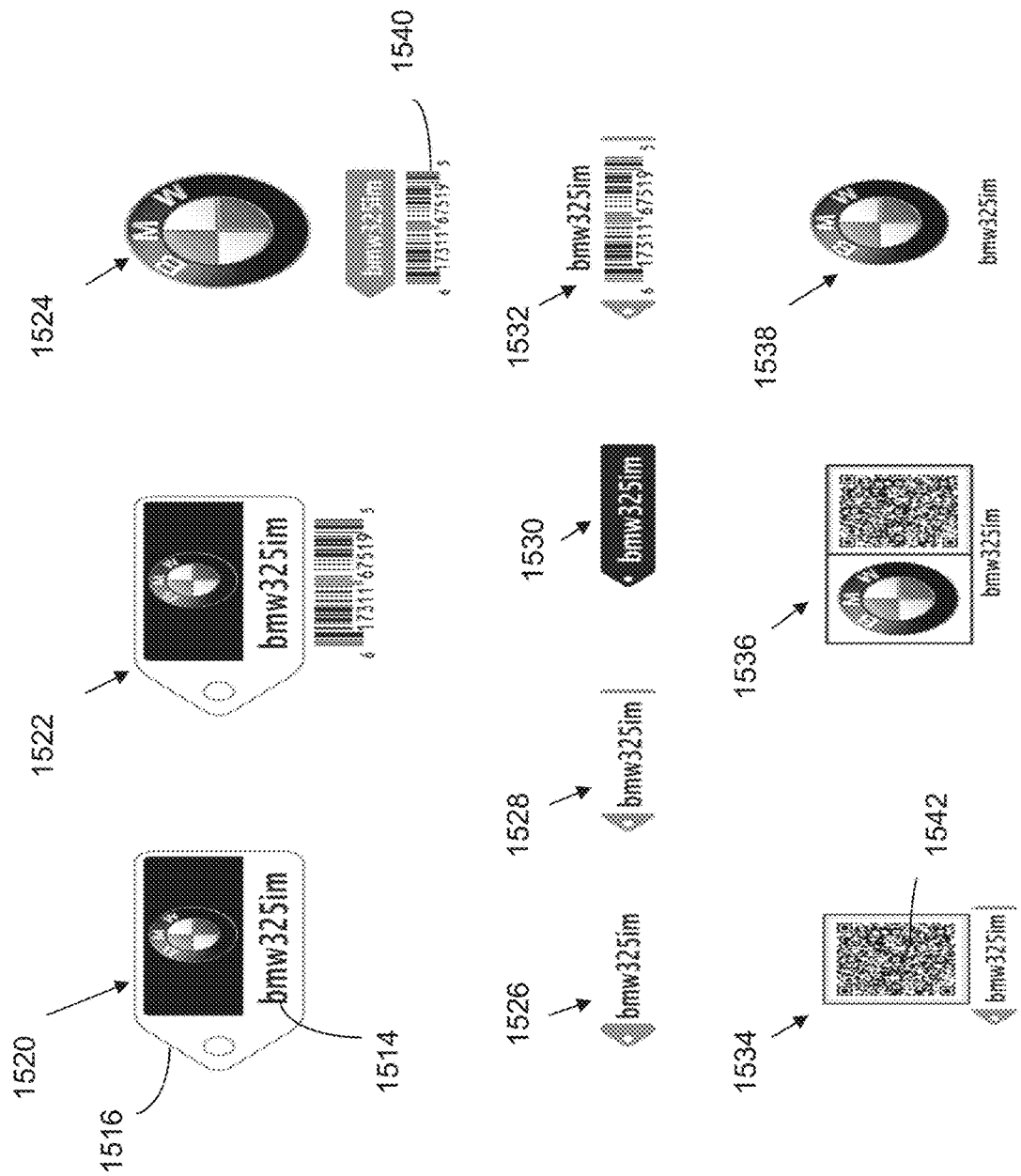
FIG. 16 illustrates a number of additional exemplary request-for-information icons for association with content of interest.
Figure 17A:
Figure 17B:
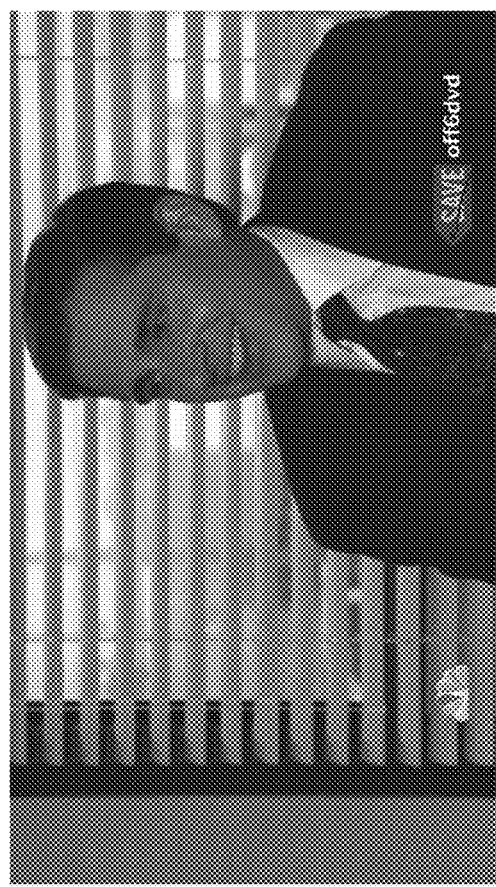
Figure 17C:
Figure 17D:
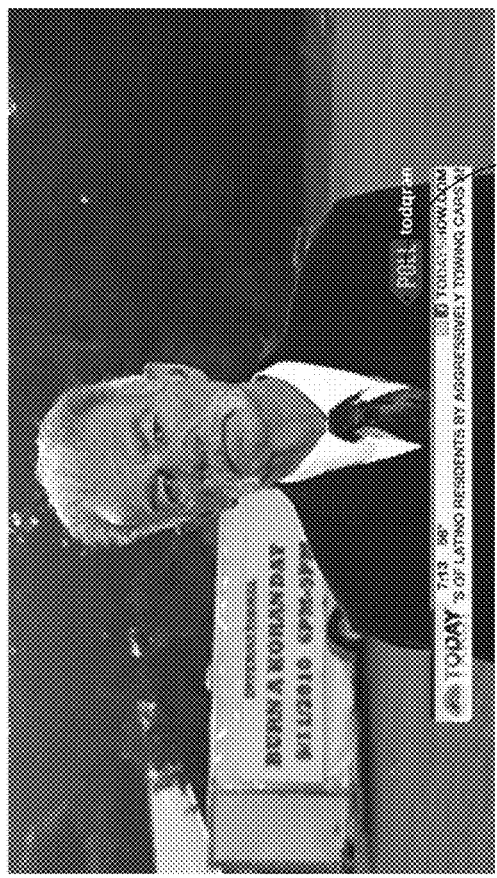
Figure 17G:
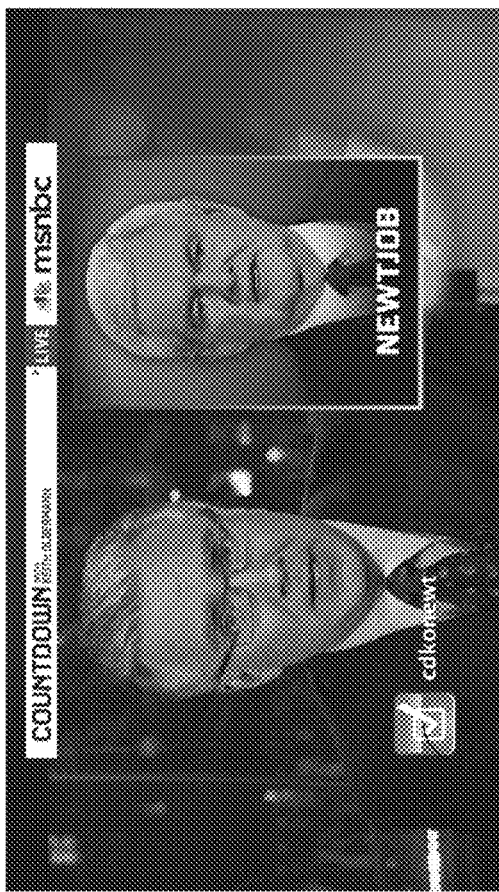
Figure 17H:
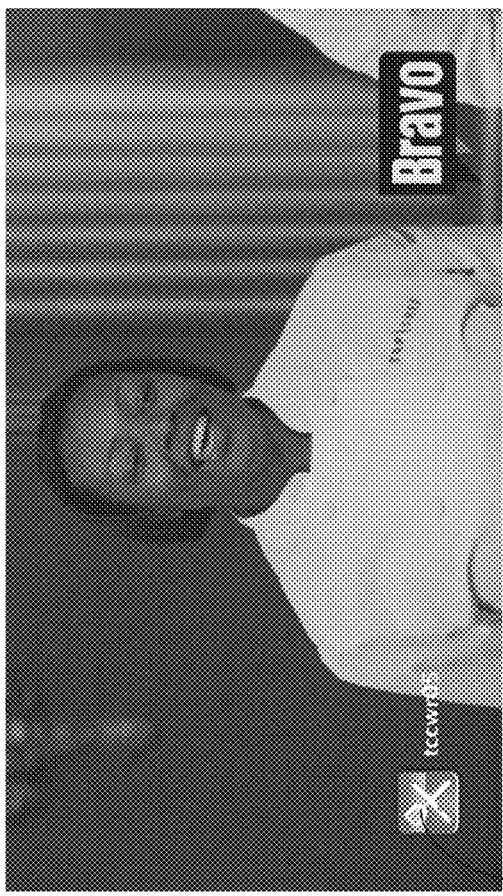

FIG. 16 shows several additional exemplary RFI icons 1520-1538 having additional combinations of the character string 1514 (i.e., "bmw325im"), the SnapPing™ logo 1516, and the branding panel 1518 (showing a BMW trademark). In addition, the RFI icons 1522, 1524, 1532, 1534, and 1536 incorporate a barcode 1540 or a QR code 1542, demonstrating that the RFI icon may include one or more identifiers selected from character strings, bar codes, UPC codes, or any other information that associates the item of content containing the icon with its corresponding tag and asset, or stored follow-on information.

In this implementation, the asset provided with a tag may include any type of electronic information including multimedia content (e.g., video, audio, print, graphics, web links to sponsored websites, social media sites, and/or video-on-demand players, etc.). In many instances, it may be desirable for the icon associated with the content to highlight the specific type of asset that is associated with the tag. Thus, the RFI icon may incorporate a symbol that represents the type of follow-on information that the user will receive in response to an RFI request. For example, FIGS. 17A-H show a number of icons that are associated with television programs. The icons include symbols 1544-1558 which respectively indicate that the associated tags include general information, a coupon or financial incentive, a contest or give-away, an opinion poll, a commercial clip, a music clip, political campaign information, and a recipe.

Figure 18:
FIG. 18 provides a screenshot of an exemplary request-for-information icon that indicates a geographical scope of a follow-on asset associated with an item of content.

The RFI icon may also provide an indication of the geographical scope of the follow-on information or asset that will be provided in response to an RFI request. For example, FIG. 18 shows an RFI icon 1560 that includes an indication that a coupon/promotional deal 1562 associated with the content of interest 1564, or a televised McDonalds® advertisement, is valid at McDonalds® restaurants in Queens, N.Y. Incorporating such geographic indicators into RFI icons allows the system to function equally regardless of whether RFI tags and their corresponding assets are geographically dependent or applicable on a nationwide basis. As an alternative to implementing a geographically-specific RFI icon such as the icon 1560, a user may submit an RFI request in relation to a non-location-specific icon, and ancillary information known about the user (e.g., metadata indicating the user's physical location) may be applied to tailor the follow-on asset geographically. That is, while an RFI icon may not contain a geographical or other specialized indicator, the follow-on asset provided in response to the user's RFI request may be tailored geographically or otherwise to accommodate ancillary information known about the requesting user.

Notably, while the code submitted to the RFI system as part of an RFI request may be an explicit identifier such as an alphabetic, numeric, or alphanumeric character string, a barcode, a UPC code, a QR code, and so on, the code may be any content identifier capable of being used to associate the content of interest with its corresponding media tag and asset. That is, as discussed above in relation to FIGS. 12-13, the code may be an element of the content itself, such as a recorded video or audio snippet or a captured image of the content. In these instances, the RFI system may process the code using audio, voice, image, and/or video recognition algorithms and/or any other appropriate processing logic to identify the content source of the submitted code.

Figure 19A:
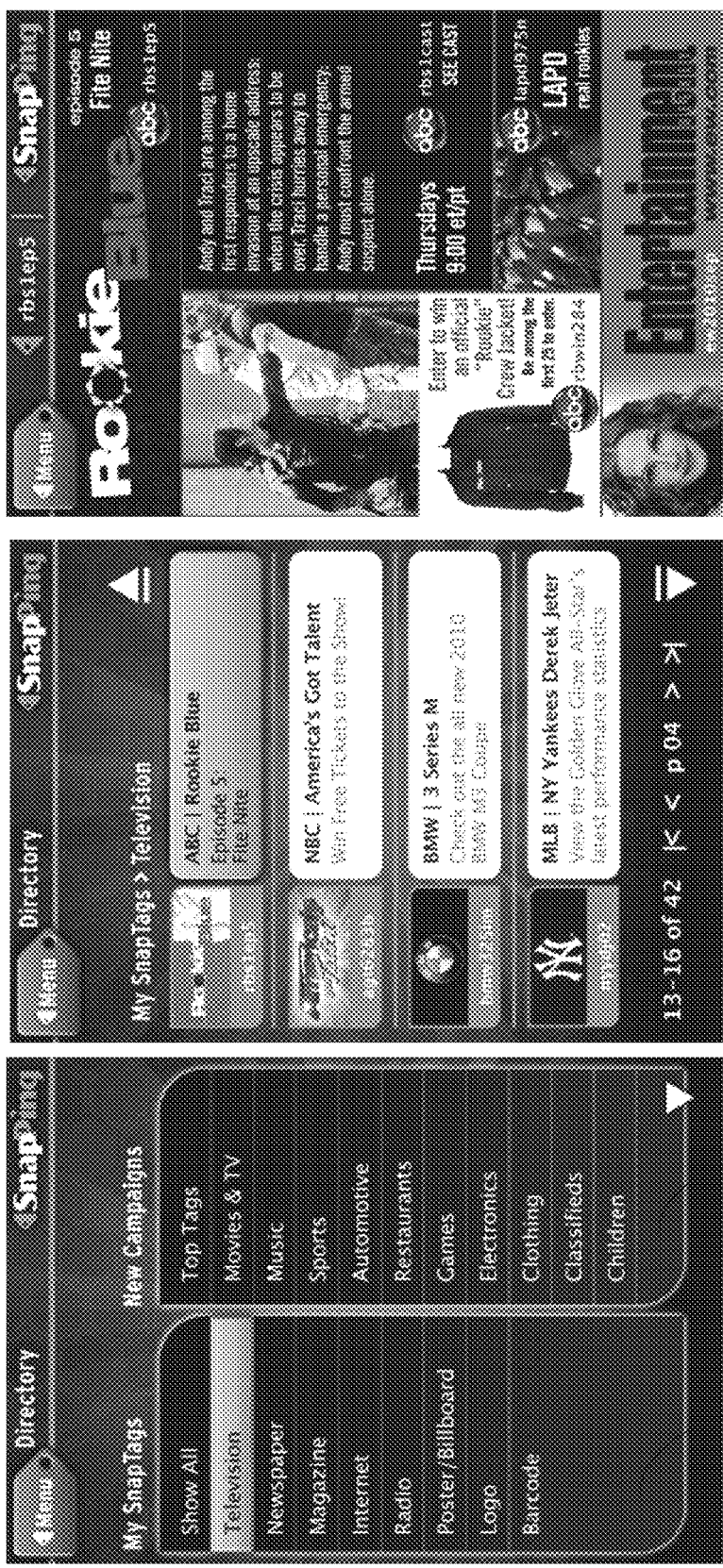
FIGS. 19A-B illustrate screenshots of an exemplary directory interface of a request-for-information application.
Figure 19B:
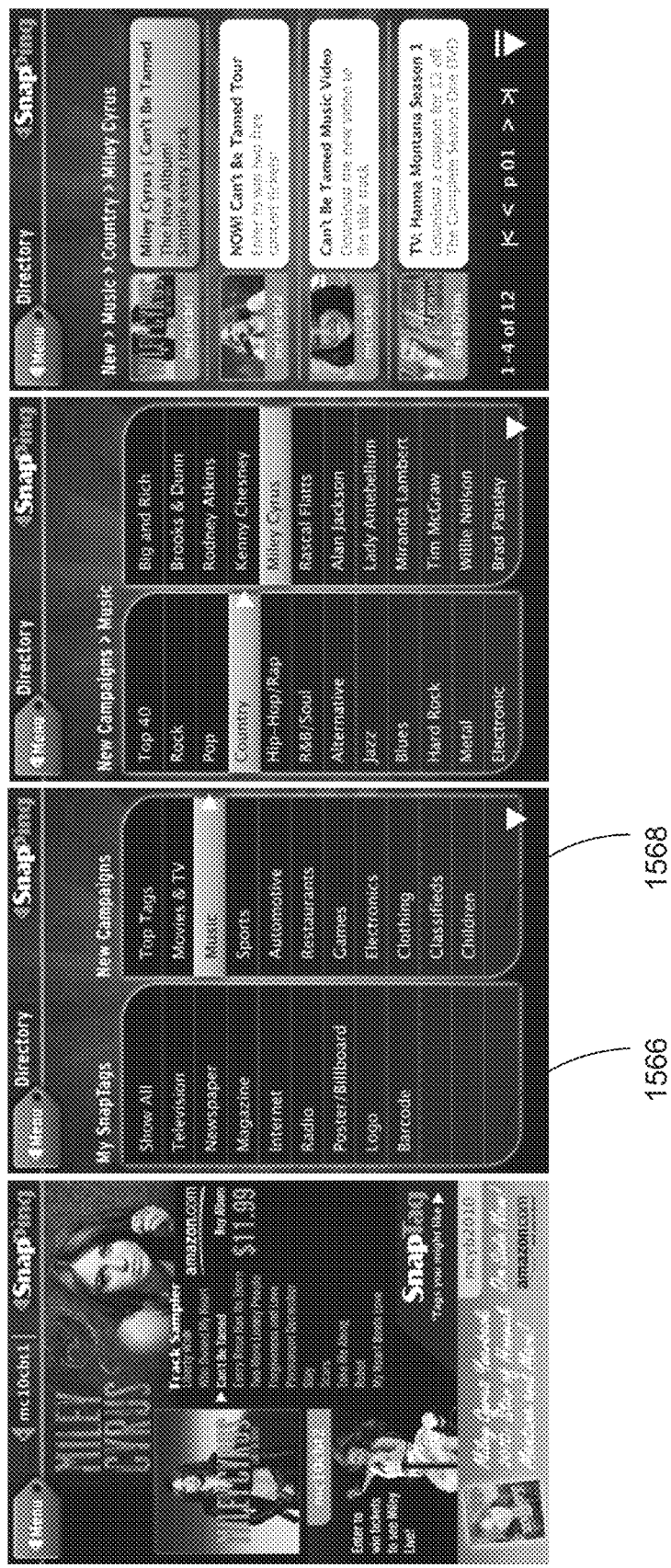

As noted above, the user may also select the "directory" option within the RFI application shown in FIG. 14A. FIG. 19A-B show an example of an interface that may be provided upon selection of this "directory" option. By accessing this option, the user may organize and manage his/her tags in an indexed fashion such that the user may repeatedly return to the directory to conveniently locate previously requested assets/tags. In this embodiment, the interface includes a panel 1566 identified by the "my SnapTags" label and a panel 1568 identified by the "new campaigns" label. The "my SnapTags" panel 1566 can be navigated to access tags previously requested by the user. In this case, the tags can be searched by the content from which codes identifying the tags were captured (e.g., television, newspaper, magazine, Internet, radio, poster/billboard, physical store, individual, location). The user can navigate a series of screens to identify a particular tag previously requested by the user and select the tag. Upon selecting the tag, the user may receive additional information or a notification concerning the additional information. In the latter regard, the notification may include an email, URL, or other information for use in retrieving the additional information.

The new campaigns panel 1568 can be used to search and select a new tag not previously entered by the user. In the illustrated example, these new tags can be searched by subject matter, for example, movies, restaurants, or local events. The user can navigate a series of screens to access information of interest. As shown in an example featured in FIG. 19B, the user may select "music," then "country," followed by "Miley Cyrus" to view and select from available tags associated with follow-on assets that include information about Miley Cyrus. It will be appreciated that other interface elements or search functionalities can be provided in connection with the directory option.

Figure 20A:
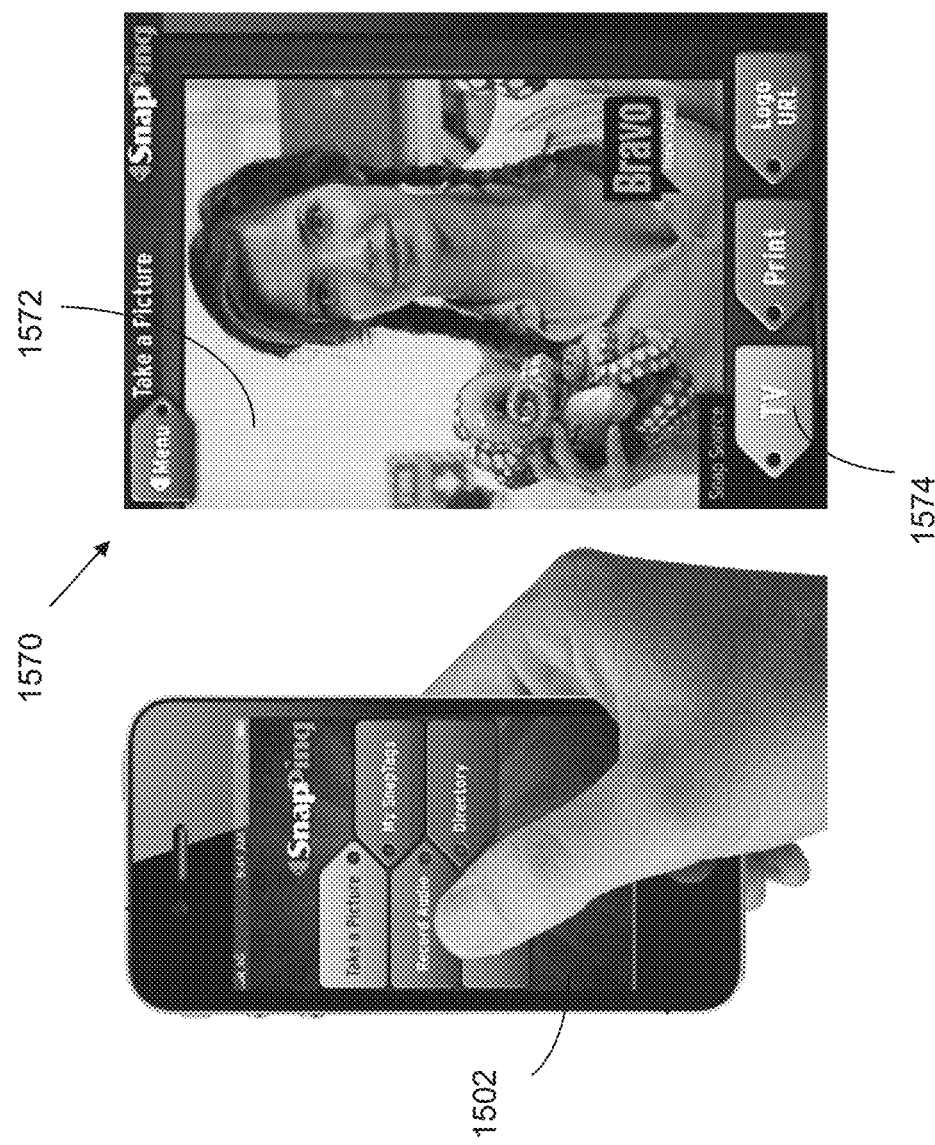

In the case where the user has selected the "take a picture" option, the user may receive an interface as indicated by screenshot 1570 of FIG. 20A. The illustrated screenshot 1570 shows an image panel 1572 displaying the image to be captured as well as a user input panel 1574 for executing RFI functionality. In the illustrated example, the user is operating the application to capture an image of a television program. The illustrated television program is "Top Chef" on the Bravo channel, and an RFI icon is superimposed on the screen. The user may use the input panel 1574 to snap the picture and then send the picture to the RFI system. In response, the user may receive a web-based asset such as the one illustrated by screenshot 1576. The additional information may concern the program, a topic discussed in the program (e.g., recipes for the summer), a product that is the subject of product placement embedded in the program, or any other information of potential interest. For instances, the user may receive information about the featured chef (i.e., Padma Lakshmi) and/or recipes for dishes featured on the show. This information may be bundled with advertisements such that the user may receive the asset free of charge, while providing a revenue generating stream for the system operator. In some cases, the user may be provided with further options, e.g., "program information," "product information," or "subject matter" options.

FIG. 20B provides a further example where the "take a picture" option is used in connection with a television commercial. In this case, screenshot 1578 illustrates an interface that can be used to capture and transmit an image of the commercial with an embedded RFI icon. As discussed above, the RFI system can recognize the RFI icon, extract the code or character string provided with the RFI icon, and match the code against a library of stored media tags that are associated with responsive assets. In the illustrated example, the responsive asset is indicated by screenshot 1580. The illustrated screenshot 1580 provides additional product information and a URL for accessing additional information or consummating an online transaction. It also provides a coupon for a 2-for-1 purchase of the advertised product, Dove® soap.

FIG. 20C shows a further example of the "take a picture" functionality. In this case, a screenshot 1582 illustrates an interface that can be used to capture an image of a televised sporting event including an RFI icon. A screenshot 1584 shows that the responsive asset includes player information, together with other advertisements for products. The advertisements for other products may relate to the subject matter of the RFI icon, may be identified as being of likely interest to the user based on the RFI icon or other information (such as classification information inferred by a targeted advertising system), or may be conventionally targeted.

FIG. 20D illustrates a further use of the "take a picture" option. In this case, a screenshot 1586 shows that the user may operate the smart phone to capture a picture of ambient advertising, specifically, an ad displayed on a vehicle and including a URL, www.match.com. In response to transmission of the captured image, the user may receive associated information shown in screenshot 1587. For example, the user may be directly forwarded to the URL, may be provided with additional information relating to the URL, and may be provided advertising that relates to the captured image. The user may be able to navigate from the advertisement directly to the associated URL to execute a transaction or other activity.

FIG. 20E shows yet another use of the "take a picture" option. In this example, the user may operate the smart phone to capture a picture of a movie poster 1588 that contains an RFI icon. In response, an asset 1590 containing follow-on information may be provided. The asset 1590 may include information about the movie, including movie trailers, show-times and locations, behind-the-scenes interviews, information about the actors, and/or discounted movie tickets. FIG. 20E also demonstrates that an RFI request may be submitted through one user device, such as a smart phone, while an asset containing follow-on information may be accessed or retrieved using another device, such as a tablet computer.

Figure 21B:
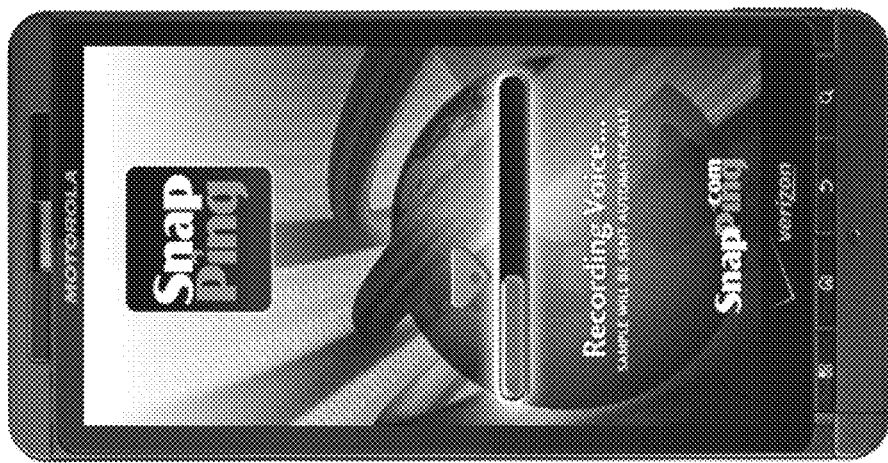
FIGS. 21A-B illustrate screenshots of exemplary interfaces for an audio-capturing mechanism of a request-for-information application.
Figure 21A:
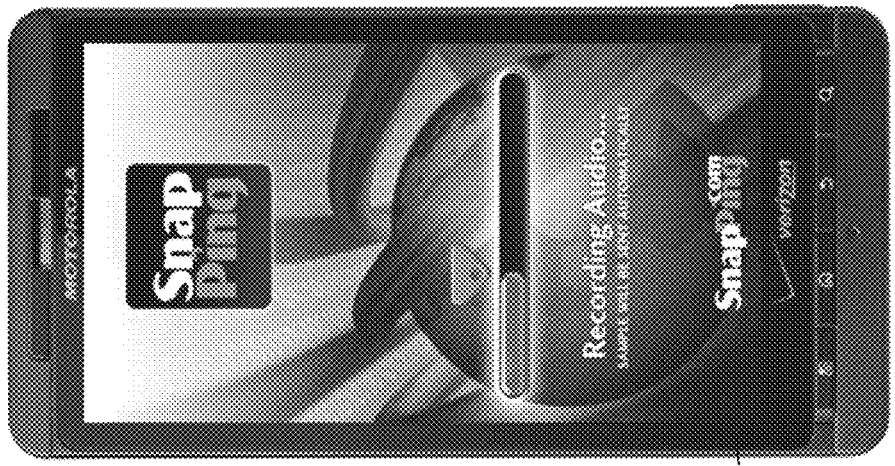

FIG. 21A shows an interface 1592 that may be provided in connection with selection of the "record audio" option, discussed above. For example, this option may be selected to record a radio advertisement or the audio track of a television program or commercial. The illustrated interface can be used to initiate and terminate recording as well as to send the recorded audio information to the RFI system. The interface may further include a display to indicate to the user that audio is being captured and to indicate the quality or magnitude of the audio signal.

For example, a user may select the "record audio" option to record or "sniff" a snippet of a radio or television program or other asset that has been associated with one or more tags. Once the snippet has been recorded, the sniffed snippet may be sent to the RFI system alone or along with time-stamp and/or other identifying information to be matched with a tag for provision to the user. In this regard, the system may employ discovery engine technology (e.g., analogous to conventional audio recognition technologies such as Shazam® music identification software) to identify a content source of the sniffed audio snippet. That is, the discovery engine software may analyze the audio snippet to determine that the snippet was recorded during the most recent episode of Top Chef, during the ninth inning of the latest World Series baseball game, or during the popular radio talk show Car Talk. Once the content source of the snippet has been identified, the RFI system may identify one or more tags that were associated with that particular item of content and apply several factors to narrow the tags down to the specific tag of interest to the user. For example, a time stamp accompanying the sniffed snippet may indicate that the snippet was recorded over the first thirty seconds of the show Top Chef. This timing may coincide with when an RFI icon appeared on the screen to indicate an available asset relating to the subject of Thai cuisine, the featured cuisine of that episode. With this information, the RFI system may match the sniffed snippet with the Thai cuisine tag and provide an associated asset to the user in response to the user's RFI request. Alternatively, the audio snippet may be directly correlated to a tag (without the intermediate step of identifying a program or the like). Notably, this type of audio code matching may apply equally to any television content, including programming and commercial content, as well as radio content such as music, commercial content, and radio talk show programming.

The "record audio" option also enables a user to record his/her own voice. As shown in screenshot 1594 of FIG. 21B, the user may enter the "record audio" option with the application and may select "voice record snaptags" to begin recording. The recording may include a description of the content for which the user desires follow-on information (a web address, a section of media print text, etc.) or it may simply include a recitation of an RFI character string associated with the icon that is displayed in connection with the content. For example, a user may observe an RFI icon on the front door of a local business. To obtain additional information about the business, the user could activate the "voice record" option of the RFI application and recite the RFI character string incorporated within the icon to immediately receive an asset including follow-on information relating to the business. Optionally, the "voice record" interface may display the captured text, e.g., an RFI character string as it is being entered by voice. The latter feature is particularly applicable in cases where the smart phone is equipped with voice recognition software. Displaying the text can ensure the accuracy of the entered information.

Figure 22:
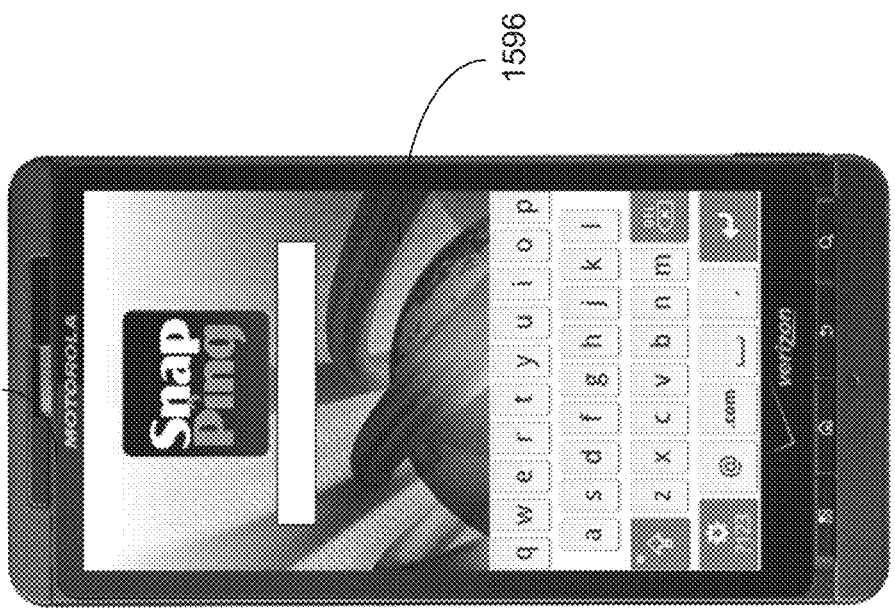
FIG. 22 illustrates a screenshot of an exemplary interface for a character-string-capturing mechanism of a request-for-information application.

FIG. 22 also shows a screenshot 1596 of an interface that may be provided in connection with the "enter code" option. In this case, the user is able to enter the RFI character string using a touch screen. Alternatively, the user may key in a web address or elect to go to the directory.

In another embodiment, the RFI icon or elements generally contained within the RFI icon may be incorporated within interactive content that overlays an Internet-based content stream being viewed on an Internet video player or on Internet-based television (e.g., IPTV or Internet television). In these instances, the user may submit an RFI request simply by interacting with the interactive content overlay by clicking on the icon or an associated code or link using, for example, a computer mouse, a smart phone touch screen, or a television remote control.

Figure 23B:

A producer of a tag and a corresponding asset may choose to provide the asset through one or more data platforms. In one embodiment, the asset may be provided through a data network that is separate from, but communicatively coupled to, an RFI system such as the RFI System 3000 discussed in relation to FIG. 12 above. For example, FIGS. 23A-B show screenshots 1598, 1600 of an asset that includes a variety of information and promotional materials relating to the New Orleans Saints® football team. As shown in FIGS. 23A-B, the asset may be provided as an independent mobile landing website 1602 or a traditionally-formatted landing website 1604. A key characteristic in providing the asset through an independent landing website lies in the fact that the asset is stored within and hosted by one or more third-party servers that may be operated by an entity other than the RFI-system operator. In the embodiments shown, the landing websites 1602, 1604 may be hosted by a server or servers that are maintained by, or at the direction of, the Saints® football team. This ability to provide assets through an independent data platform allows asset producers to generate, maintain, and serve their own assets while participating in an RFI program. As discussed above, the media tag stored within the RFI system may include instructions directing the user device to a URL associated with the landing website 1602, 1604 and/or directing the third-party server to provide the landing website 1602, 1604 to the user device such that the provision of the landing website 1602, 1604 occurs seamlessly to and without further action by the user.

The screenshots 1598 and 1600 show that the landing websites 1602 and 1604 may include search widgets 1606 and 1608, respectively. The search widgets 1606, 1608 each provide a search tool that links the landing website 1602, 1604 to the RFI system. A user viewing the landing website 1602, 1604 may enter a character string identifying another item of content and be directed to an asset associated with that character string. Thus, while the user device has been directed to the independent landing website 1602, 1604, the user is still in communication with the RFI platform and may at any time submit additional RFI requests via the convenient search widget 1606, 1608. The search widget 1606, 1608 may appear on any appropriate number of tiered web pages within landing website 1602, 1608, and the number of web pages that include the search widget 1606, 1608 may be negotiated between the producer of the asset and the RFI-system operator.

Figure 23C:
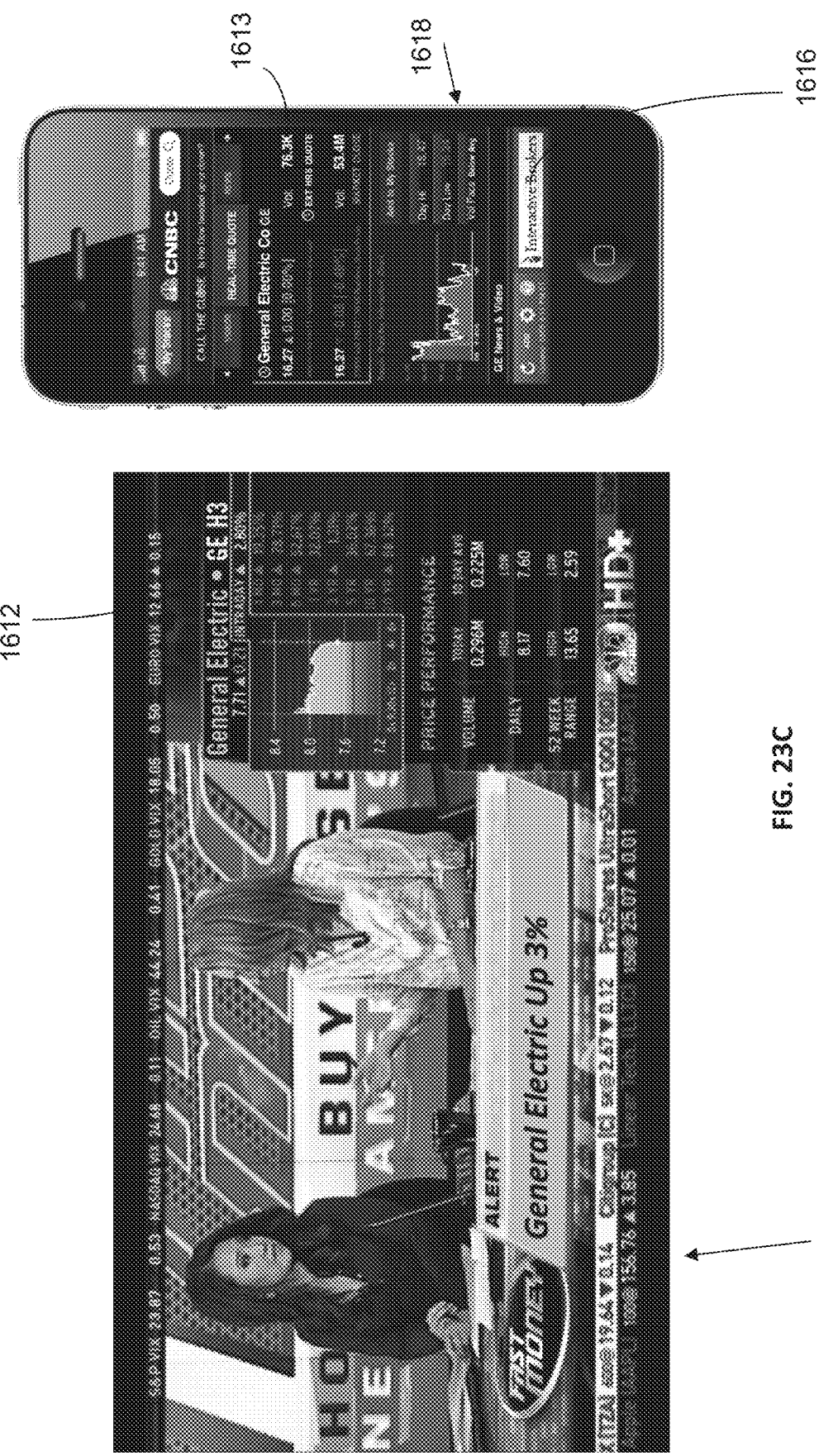

FIG. 23C shows a screenshot 1610 of the broadcast television program "Fast Money" on CNBC®. The screenshot 1610 shows that an RFI code "GE H3" 1612 has been associated with the General Electric® stock ticker. A screenshot 1614 shows a CNBC® landing website 1618 that is associated with the RFI code 1612. The landing website 1618 includes an "interactive brokers" selection 1616 through which a user may purchase General Electric® stock. Through the use of RFI codes, tags, and their associated assets, the RFI system can essentially transform any traditional item of content (e.g., media content or otherwise) into an interactive e-commerce platform by driving user traffic to an e-commerce-enabled data platform.

Figure 24:
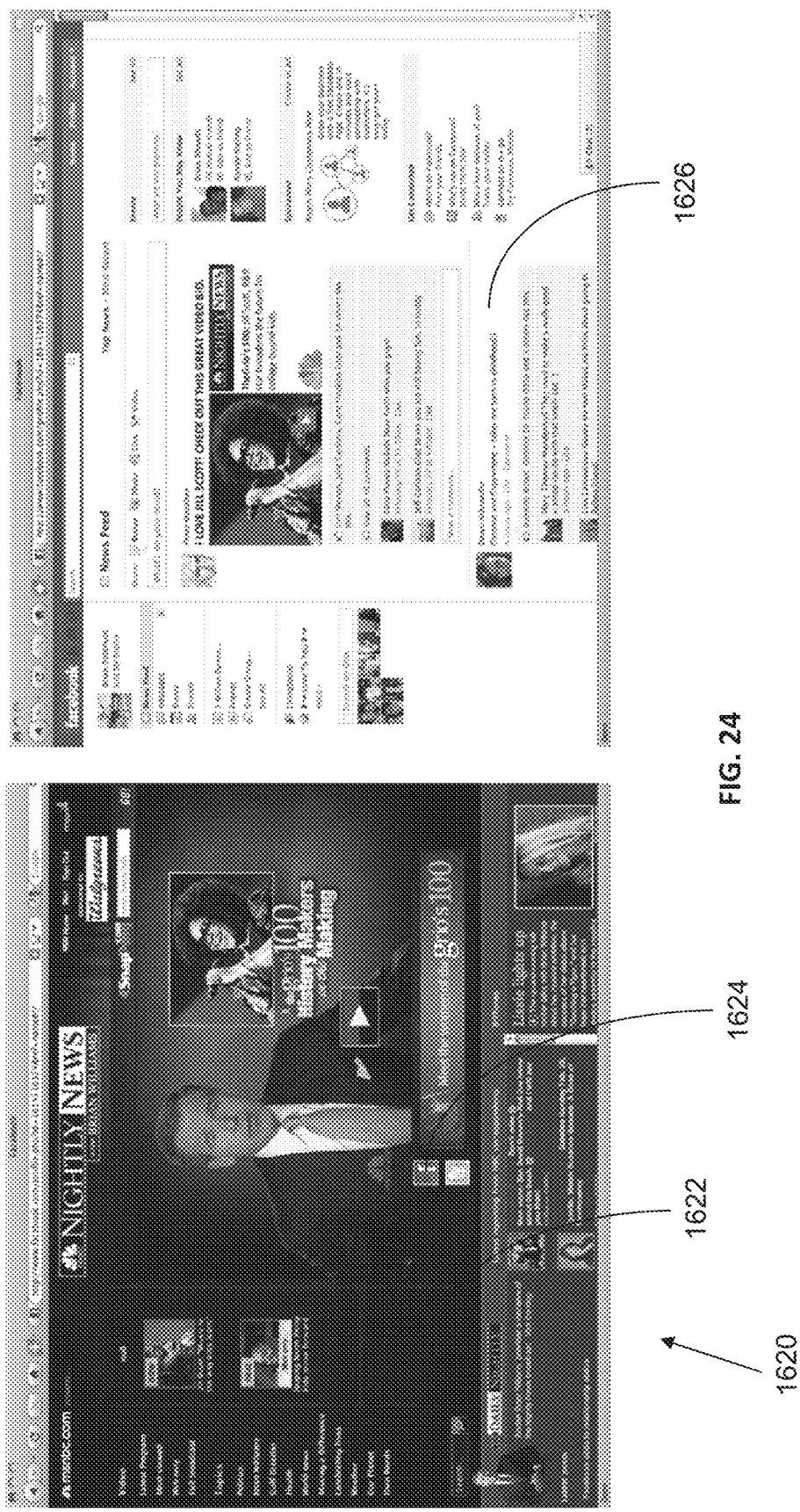
FIG. 24 provides a screenshot of an exemplary third-party landing website having a link to a social media portal.

The RFI system may also act as a tool to enable media awareness through social networks. FIG. 24 shows a screenshot 1620 showing a landing website 1622 associated with the program "Nightly News with Brian Williams" on NBC®. The landing website 1622 features a discussion of the R&B singer Jill Scott as part of "The Grio's 100. History Makers in the Making" and incorporates a social media icon 1624 that links to the Facebook® social media website. A user may click on the social media icon 1624 to automatically link the Jill Scott discussion to his or her Facebook® page 1626, thereby extending NBC's asset to the social media realm.

Alternatively, and similar to the implementation in which the asset is provided through an independent landing website, the asset may be provided directly through a social networking portal, such as Facebook® or LinkedIn®, that is independent of the RFI system. FIG. 25 shows a screenshot 1628 of the broadcast television program "Glee" on Fox®. The screenshot 1628 shows that an RFI character string "Sue Sylvester Glee" 1630 has been associated with the actress Sue Sylvester, a popular actress on the show. The RFI icon 1630 indicates that entering an RFI request in relation to the RFI icon (e.g., by capturing an image of the screen, typing the character string "Sue Sylvester Glee," recording a voice recording, etc.) will directly load the actress's Facebook page 1632 to the user's device.

Figure 26:
FIG. 26 provides screenshots showing an exemplary implementation of a mechanism for directly receiving downloadable content in response to a request for information from a user device.

In another embodiment, the asset may be directly downloaded to the user device. That is, rather than merely viewing the asset through a landing website, a social media platform, or otherwise, the asset itself may consist of downloadable content that is directly downloaded to the user device in response to the RFI request. For example, FIG. 26 shows a screenshot 1634 of the television program "Sports Center" on ESPN®. The screenshot 1634 shows that an RFI code "Watch ESPN" 1636 has been associated with the program. Specifically, an RFI icon providing the code indicates that the available asset is a "Snap An App," or that submitting an RFI request in relation to the icon, as shown in screenshot 1638, will download the "WatchESPN" application directly to the user device for operation upon the user device, as shown in screenshots 1640 and 1642.

Another implementation allows the producer of an RFI tag and a corresponding asset to provide the asset, or cause the asset to be provided, through a centralized media portal that is operated by or in connection with the RFI-system operator (e.g., the centralized media portal 3024 discussed above in relation to FIG. 12). That is, rather than an independent landing website or social media portal, the web-based asset may be provided through the centralized data network platform 1504 identified by the URL www.snapping.com (hereinafter "SnapPing.com") shown in FIG. 14B.

Figure 27:
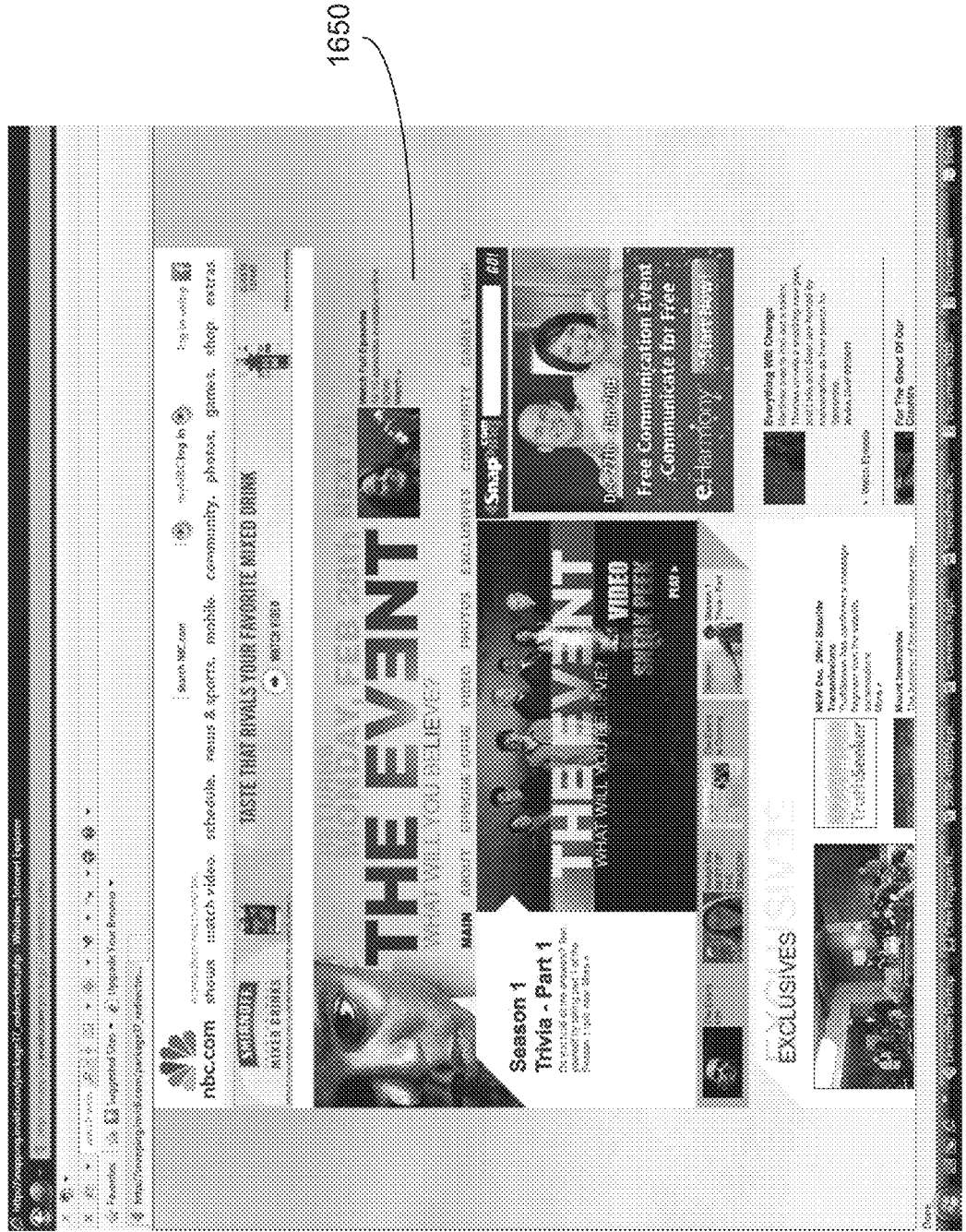
FIG. 27 provides a screenshot illustrating an exemplary centralized data network platform, identified by the URL www.SnapPing.com, providing a web-based asset to a user device.

FIG. 27 shows a web-based asset 1650 provided through SnapPing.com. The asset provides information relating to the program "The Event" on NBC® and includes video clips, photos, exclusives, episode guides, and more. The asset also includes advertisements for the dating website eHarmony® and for Smirnoff® alcoholic beverages. In this embodiment, rather than the asset 1650 being stored within and hosted by a third-party server that is merely communicatively linked to the RFI system, as is the case with the landing website and social media platform embodiments discussed above, the asset 1650 is stored in memory within the RFI system (e.g., within the memory 3016 of the network platform 3008 or within the network server 3022). In this regard, the producer of the asset 1650 provides the asset 1650 to the RFI-system operator for storage and hosting. The stored media tag associated with the asset provides instructions regarding the location of the asset 1650 and for providing the asset 1650 to the user via SnapPing.com.

Figure 28:
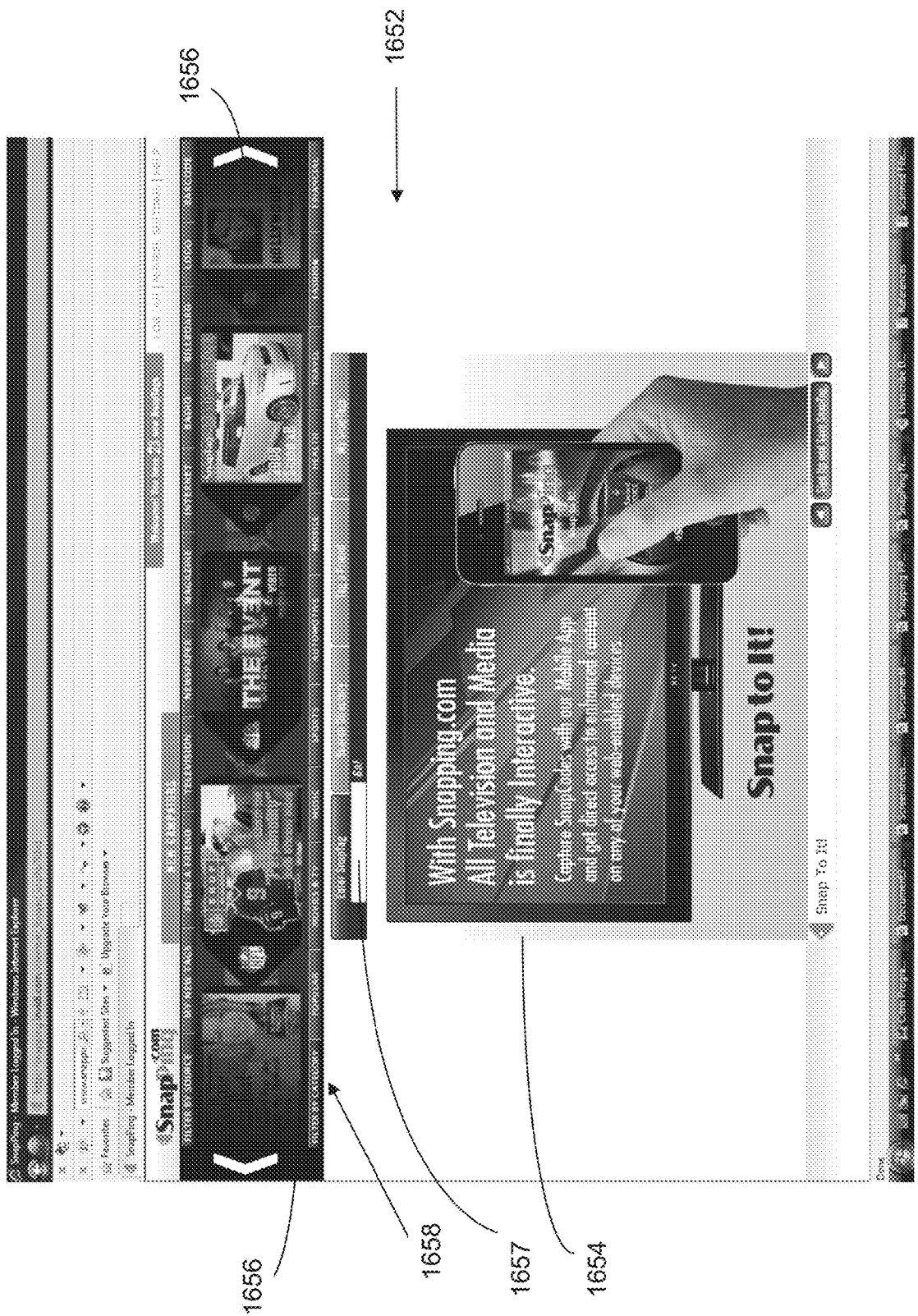
FIG. 28 provides a screenshot illustrating a homepage of an exemplary centralized data network platform, identified by the URL www.SnapPing.com, for providing web-based assets to user devices.
Figure 29:
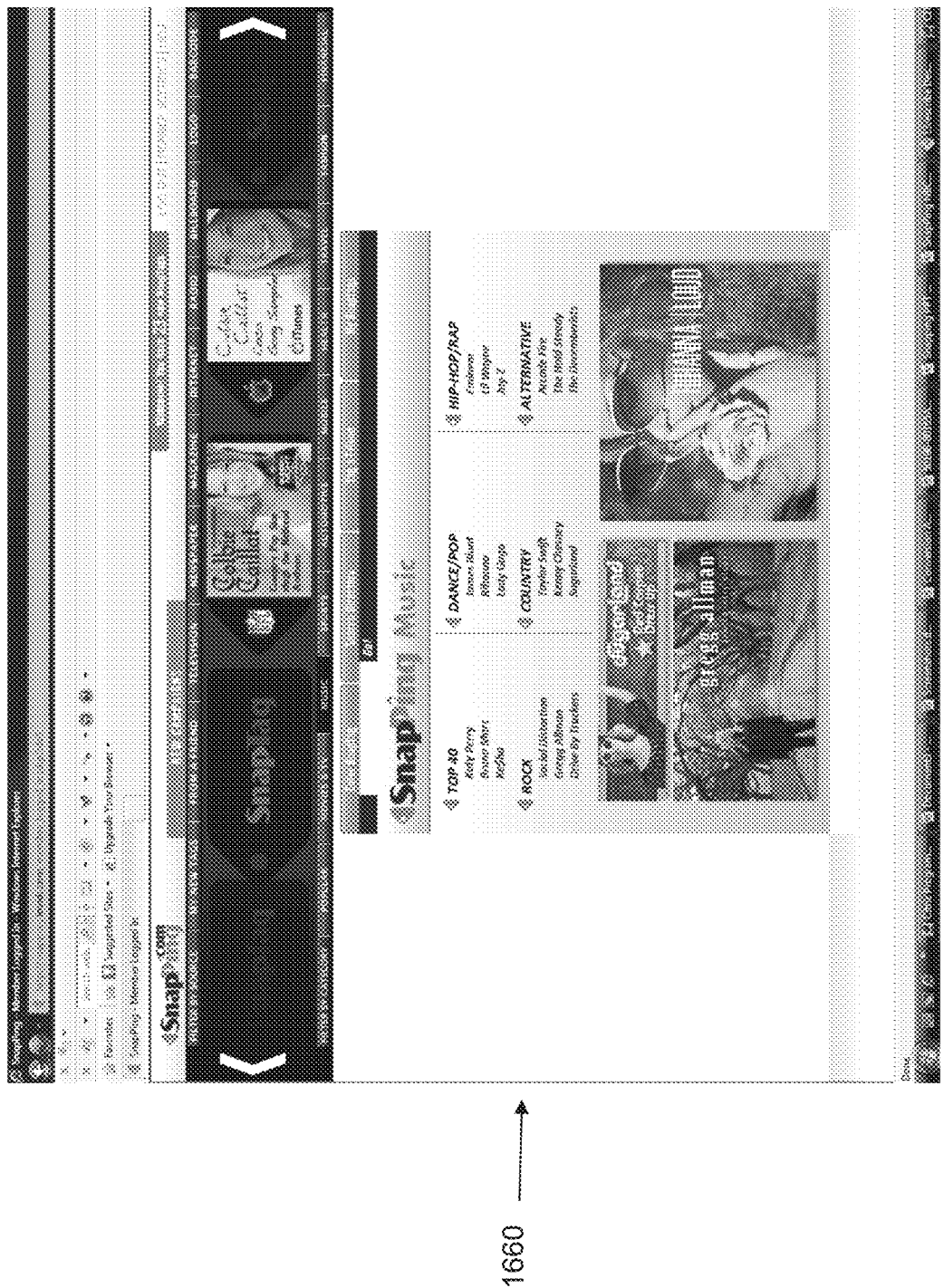
FIG. 29 provides a screenshot illustrating a non-member interface of an exemplary centralized data network platform, identified by the URL www.SnapPing.com.
Figure 30:
FIG. 30 provides a screenshot illustrating another non-member interface of an exemplary centralized data network platform, identified by the URL www.SnapPing.com.

Beyond providing a platform for delivering requested web-based assets to users for consumption, SnapPing.com may serve as a hub where users submit RFI requests, search tag directories, and organize and share tags. In one embodiment, SnapPing.com provides both non-member and member platforms. For example, FIG. 28 provides a screenshot 1652 that reflects a SnapPing.com homepage 1654. The homepage 1654 includes a scrolling bar 1656 located at the top of the page. The scrolling bar 1656 is bordered to the bottom by a number of non-member selections 1658 including "filter by category," "popular," "movies & TV," "music," "sports," "automotive," "mobile," "health," "travel," "fashion," and "financial." By selecting any of these links, a user may locate and select one or more tags having associated assets that the user would like to view. For example, selecting the "music" link takes the user to a webpage 1660 shown in FIG. 29, where the user may link to tags associated with assets presenting information about a variety of music genres and artists. In another example shown in FIG. 30, selecting the "health" link takes the user to a webpage 1662, where the user may link to tags associated with assets having information about a variety of health issues such as "fitness," "nutrition," "healthcare," and so on. The SnapPing.com homepage 1654 also includes a search widget 1657 that allows both non-members and members to submit RFI requests for particular tags/assets.

Figure 31:
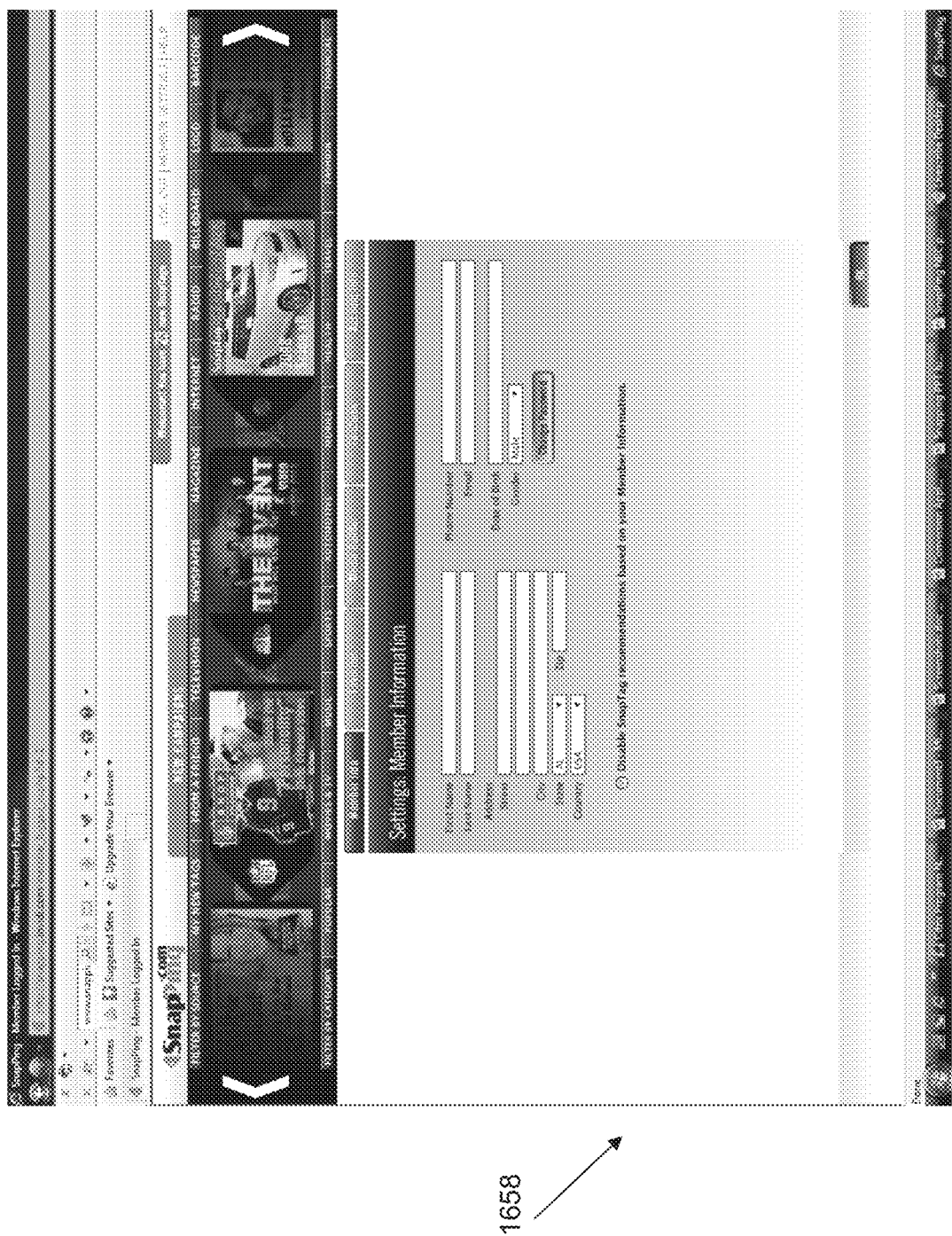
FIG. 31 provides a screenshot illustrating a member settings interface of an exemplary centralized data network platform, identified by the URL www.SnapPing.com.
Figure 32:
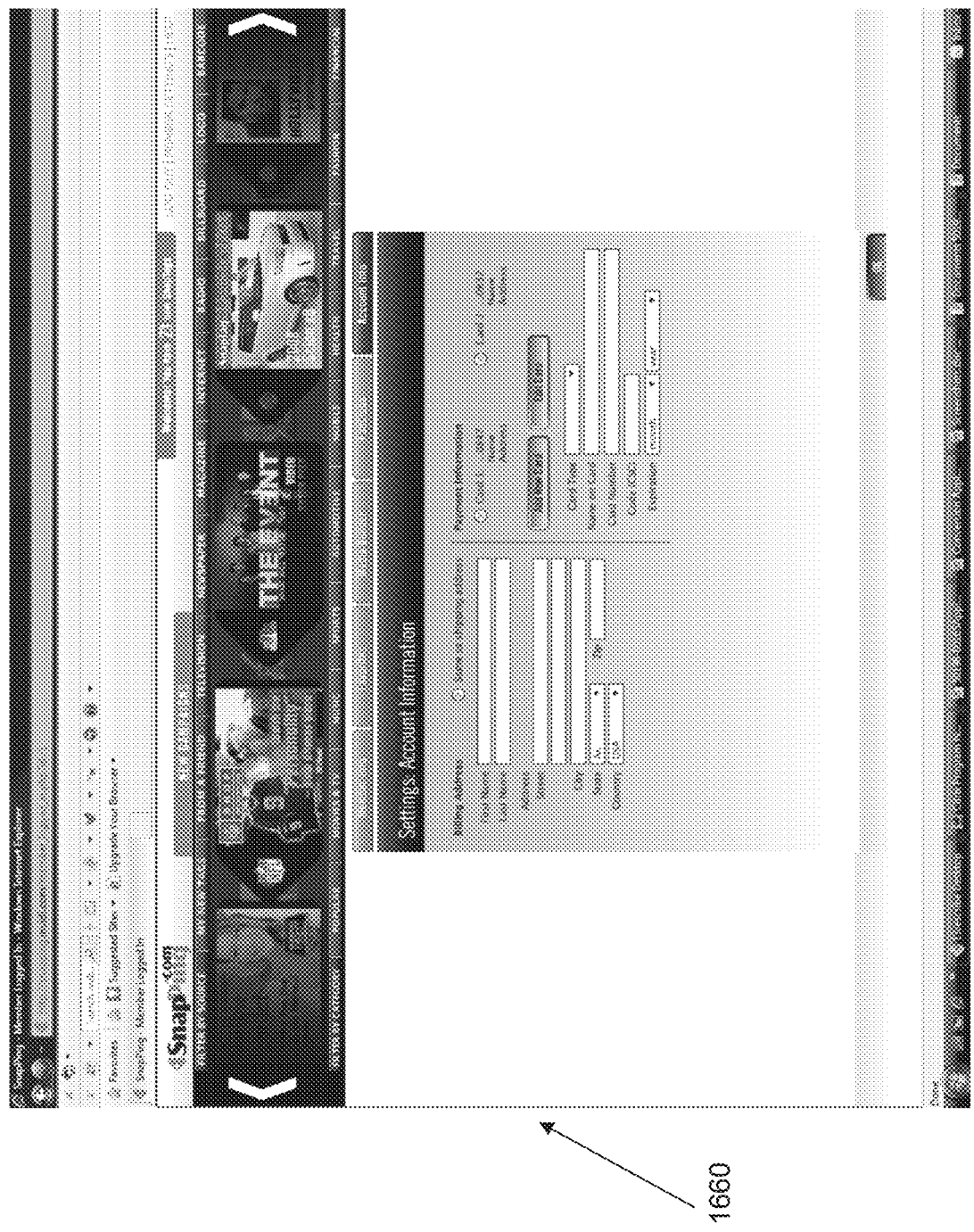
FIG. 32 provides a screenshot illustrating an account information interface of an exemplary centralized data network platform, identified by the URL www.SnapPing.com.

While SnapPing.com includes numerous useful tools for non-members, the RFI system may be used to establish member accounts that enable numerous additional features available through SnapPing.com. To establish an account, a user may provide member information such as a name, address, telephone number, email address, and so on, as shown in a screenshot 1658 of FIG. 31. The user may also provide privacy preference information that specifies how the user's membership information may be used, whether and how the information may be provided to third parties, the types of asset providers/producers from whom the user agrees to receive assets, and more. Upon receipt of the member information, the RFI system may process the information and establish an account for the user. During the setup process, the user may also provide billing and payment information as shown in a screenshot 1660 of FIG. 32. The tracking of billing and payment information facilities e-commerce directly through SnapPing.com. That is, users may purchase products and/or services referenced in assets provided to the user device via SnapPing.com in a manner similar to the way transactions may be completed through landing websites that are operated by the tag/asset producers.

Figure 33:
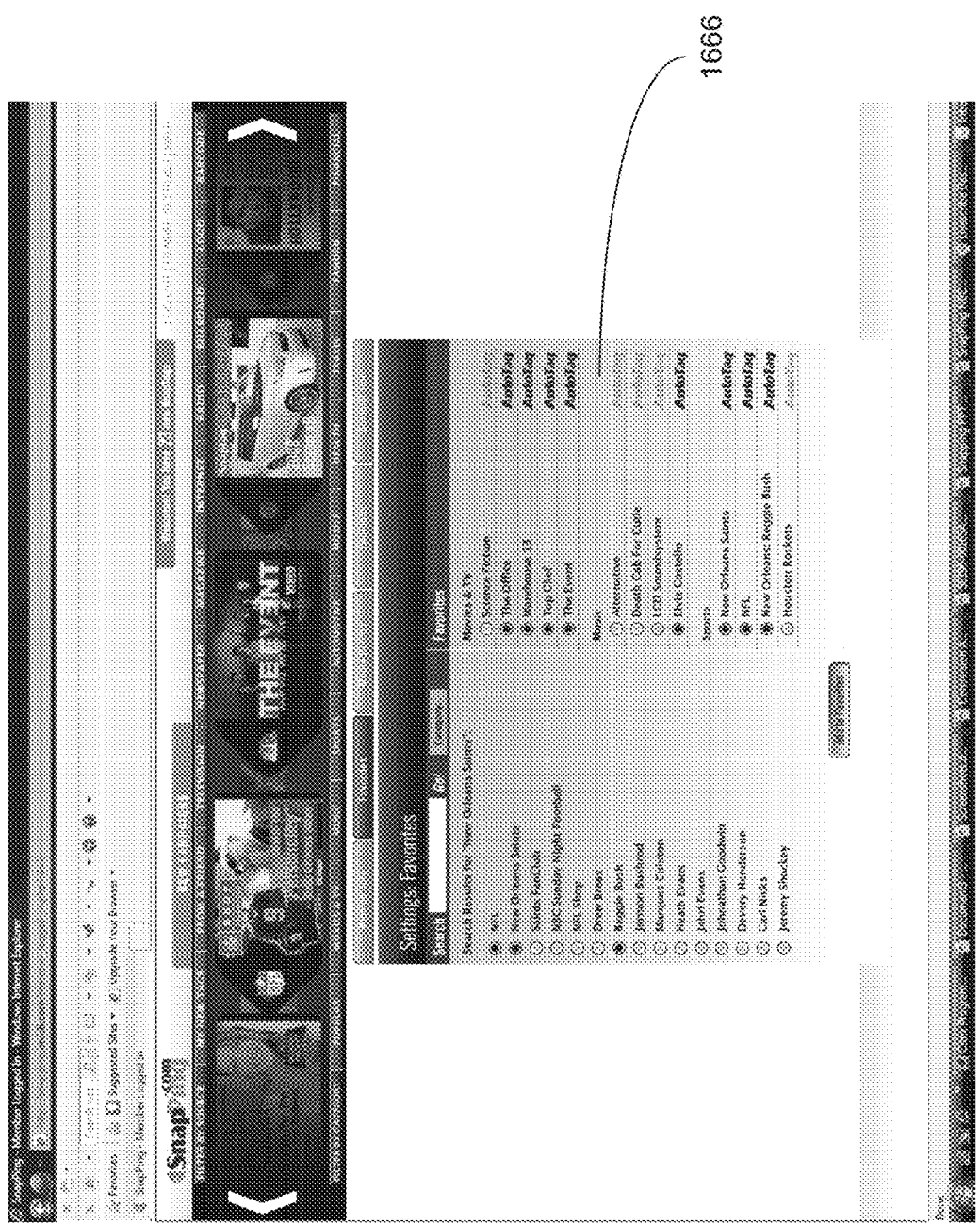
FIG. 33 provides a screenshot illustrating a favorites interface of an exemplary centralized data network platform, identified by the URL www.SnapPing.com.

To avoid the need to repeatedly request desired tags, the system includes an auto-tag feature. That is, in some circumstances, the RFI system may prompt the user to define a category of tags that it would like to receive without repeated individual RFI requests. For example, FIG. 33 illustrates one embodiment of a "favorites" interface 1666 that is accessible to members through SnapPing.com. Using the favorites interface 1666, a user may customize his or her account for auto-tagging. For example, FIG. 33 shows that the user may select from various topics associated with a search for the "New Orleans Saints," including "NFL," "New Orleans Saints," "NBC Sunday Night Football," "NFL Shop," "Drew Brees," "Reggie Bush," "Jermon Bushrod," "Marques Colston," "Heath Evans," Jahrl Evans," and so on. The favorites interface 1666 also allows a user to select from among numerous other customizable categories within, for example, "Movies & TV," "Music," and "Sports." In a related feature, the user may specify various filtering parameters that automatically filter tags for the user's consumption. For example, the user may choose to filter by date within selected categories (e.g., all tags relating to Madonna posted within the last month and moving forward).

Figure 34:
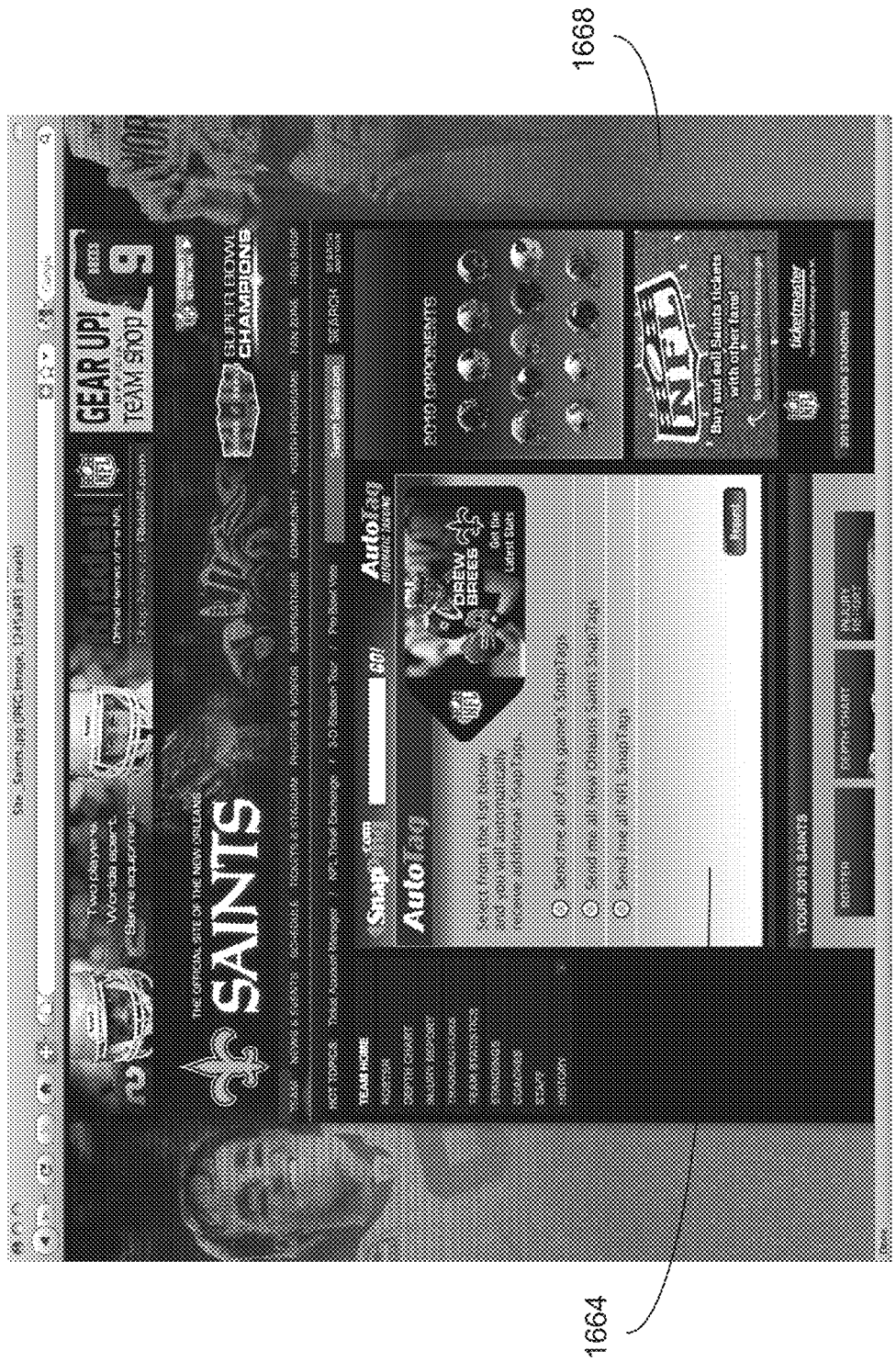
FIG. 34 provides a screenshot illustrating an auto-tag interface associated with a web-based asset provided to a user device.

In addition to allowing users to customize auto-tagging selections through SnapPing.com, the system may also incorporate an auto-tagging interface that augments delivery of independent assets to the user device. FIG. 34 illustrates an auto-tag interface 1664 associated with an asset 1668 relating to the New Orleans Saints® football team. The auto-tag interface 1664 presents the user with several questions regarding tags associated with the program. For example, the user may select all tags for the current game, all tags for the team, or all tags for the NFL. Upon selection of any one of these options, the user will receive tags automatically without having to submit continued requests.

The auto-tag option may be applied in a variety of contexts. In another example, a jumbo screen may flash an RFI icon associated with a batter that is up to bat in a baseball game or the RFI icon may be shown in a television display. Users desiring follow-on information about the athlete (e.g., height, weight, batting average) may submit an RFI request via any of the entry methods discussed above (i.e., take a picture, record voice or other audio, enter an RFI character string associated with the icon). Upon receiving the initial RFI request for information about the batter, the system may prompt the user regarding whether he or she would like to receive tags associated with each batter for the remainder of the game. If the user so elects, the user will receive tags for all remaining batters without the need to submit additional requests.

Figure 35:
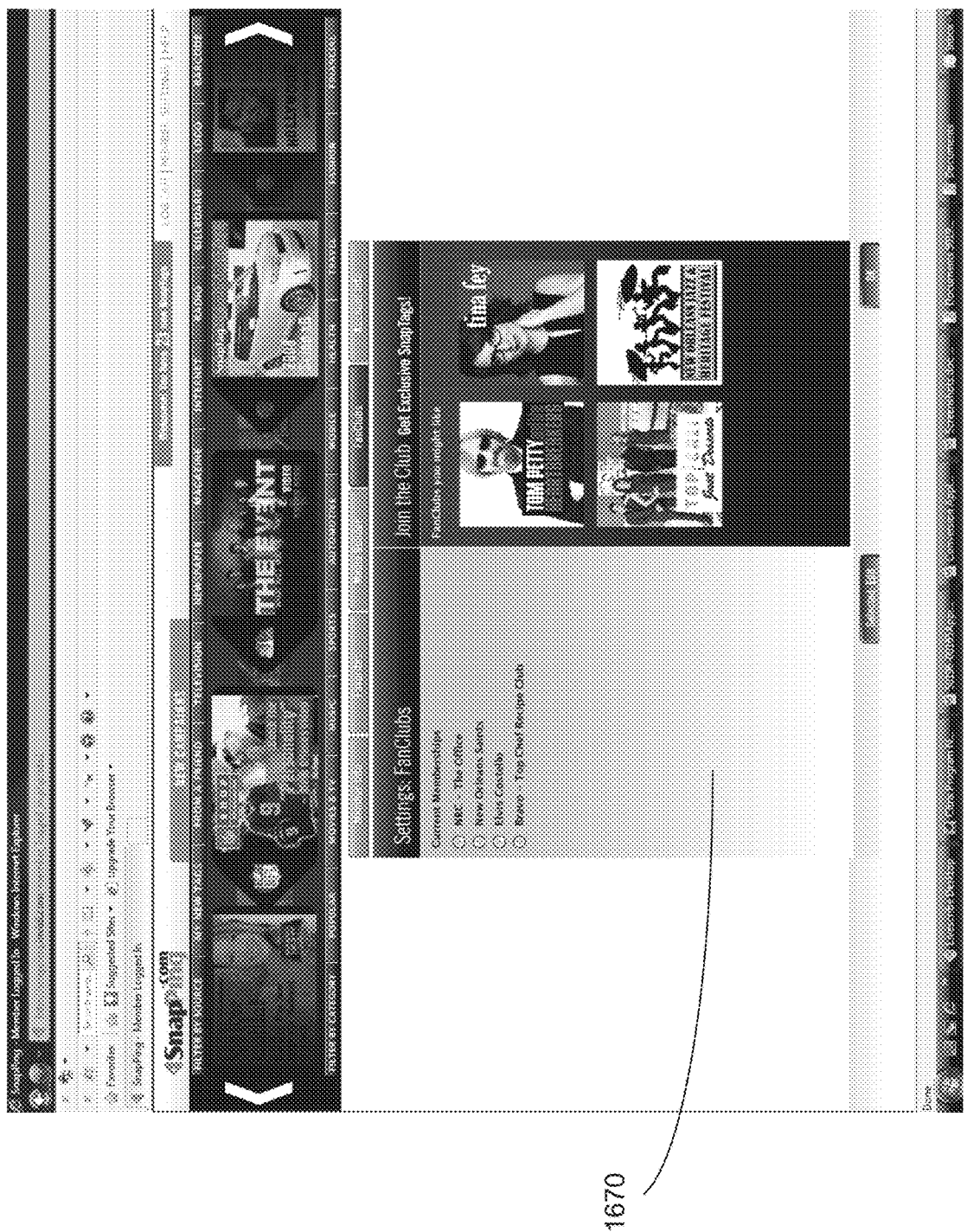
FIG. 35 provides a screenshot illustrating a fan club interface of an exemplary centralized data network platform, identified by the URL www.SnapPing.com.

Users with member accounts may also take advantage of exclusive assets that are not publically available. FIG. 35 illustrates one embodiment of a favorites-type interface 1670. Through the interface 1670, users may elect to join "FanClubs" through which they may receive associated assets that are not available without a membership account. For example, the favorites interface 1670 of FIG. 35 shows a number of exclusive "FanClubs" offering assets for music, comedy, television shows, and cultural events.

Figure 36:
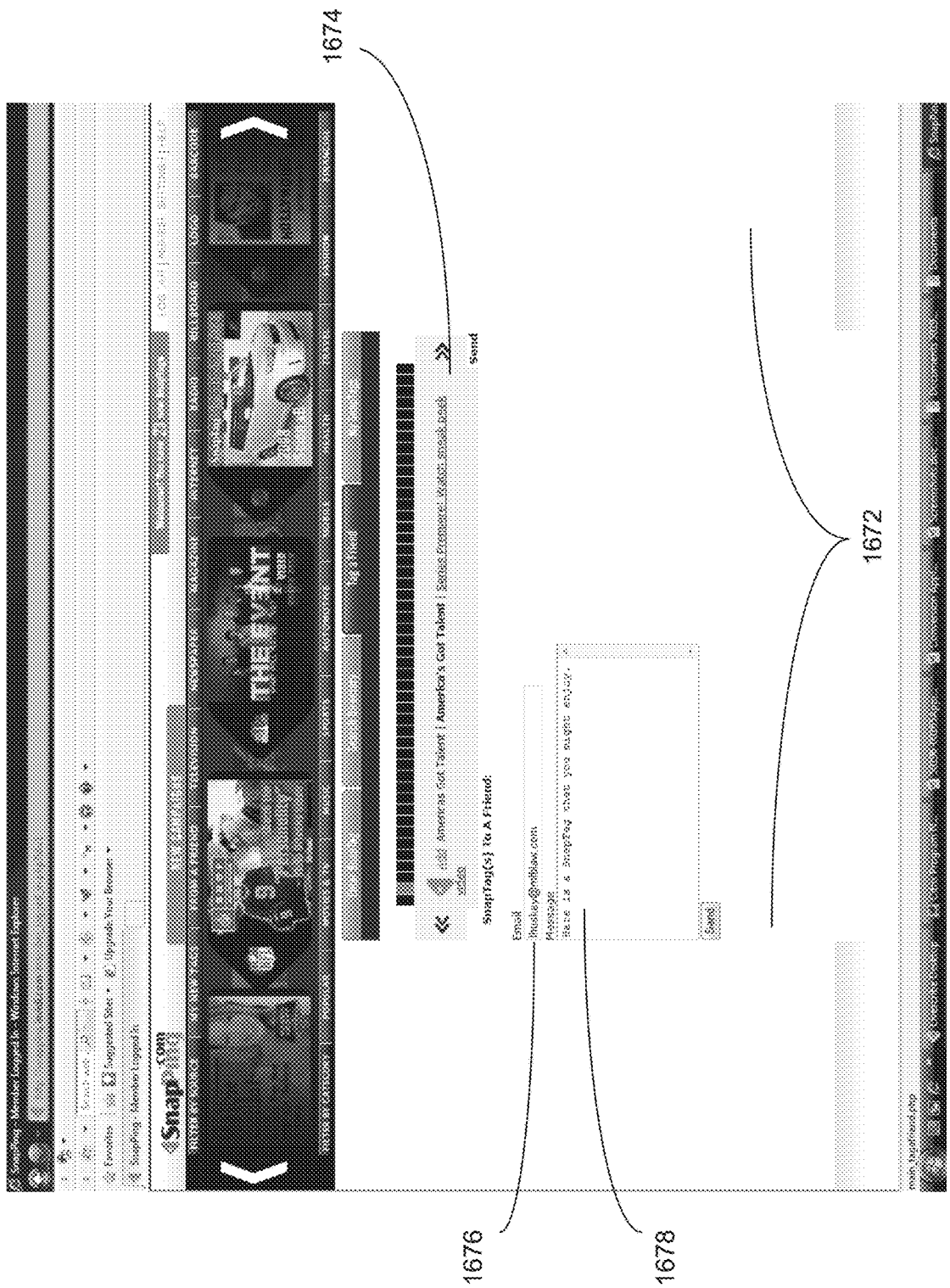
FIG. 36 provides a screenshot illustrating a tag-a-friend interface of an exemplary centralized data network platform, identified by the URL www.SnapPing.com.
Figure 37:
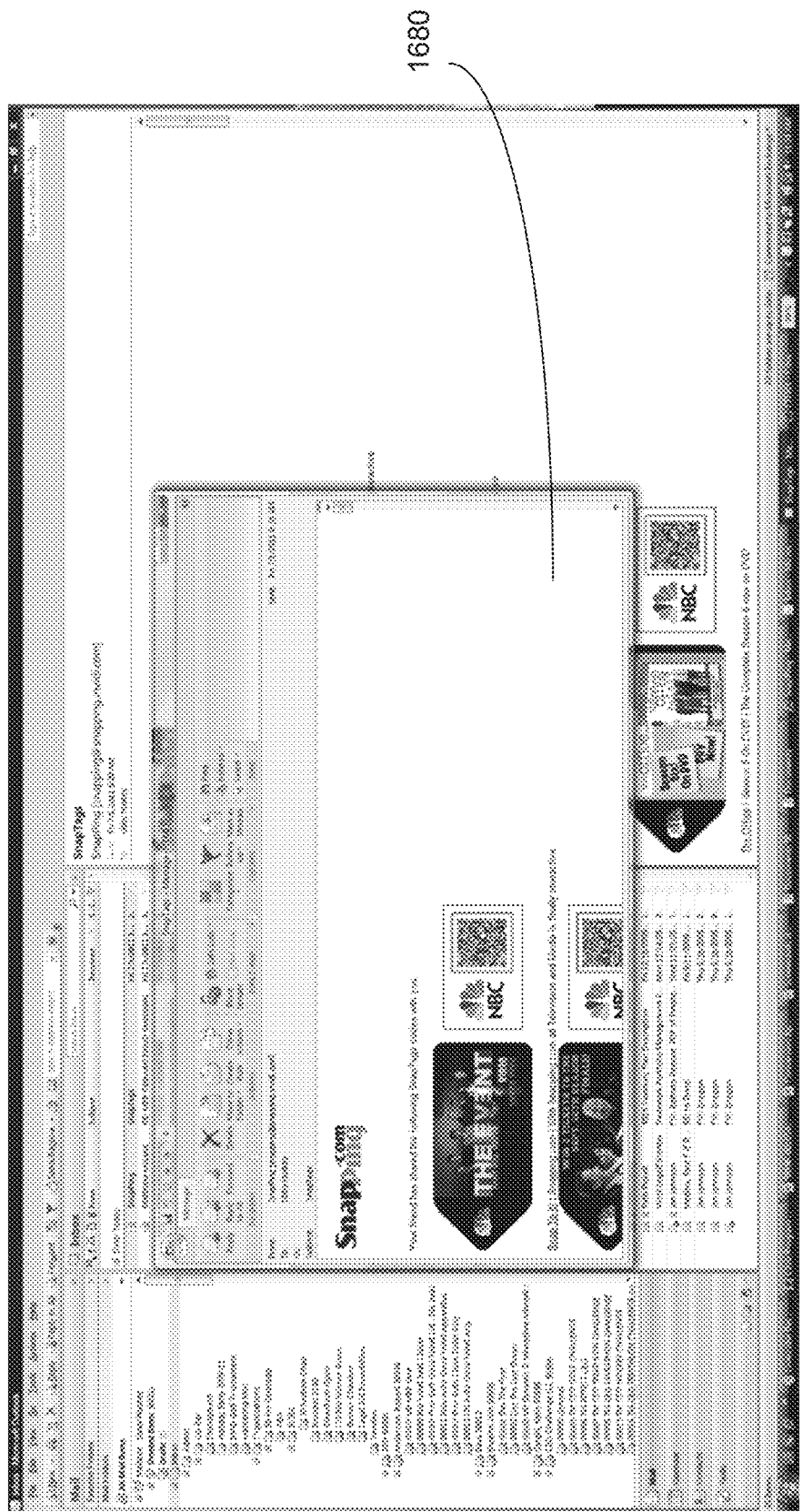
FIG. 37 provides a screenshot illustrating an email containing numerous forwarded tags associated with web-based assets for delivery to a user device.

Member users may also forward tags through a "tag a friend" tool 1672 shown in FIG. 36. Using the "tag a friend" tool 1672, a user may search and select from among a library of tags 1674 available for forwarding. After making one or more selections, the user may enter a recipient's email address 1676 and an optional message 1678 for the recipient. Once the user clicks "send," the RFI system forwards an email 1680 containing the selected tags to the recipient, as shown in FIG. 37. The recipient may then select one or more of the tags to receive the associated assets. It should be noted that while FIG. 37 shows the forwarded tags as being received by the recipient through email, forwarded tags could be sent to the recipient's user account or forwarded to the user via any appropriate means.

Figure 38:
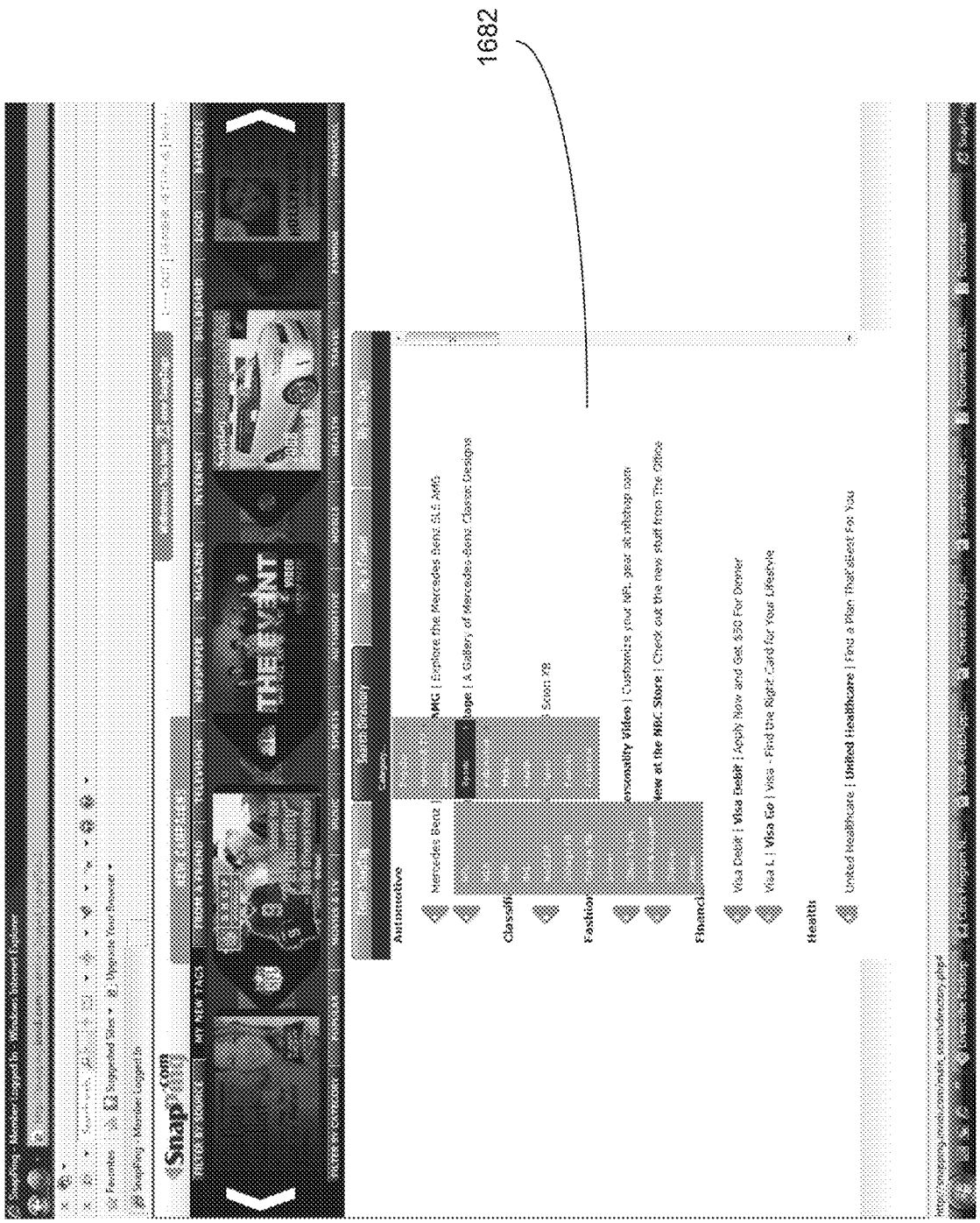
FIG. 38 provides a screenshot illustrating a general directory interface of an exemplary centralized data network platform, identified by the URL www.SnapPing.com.

SnapPing.com may also implement a directory interface 1682 for organizing available tags in a sortable and searchable manner. As shown in FIG. 38, a user may access the directory interface 1682 to locate tags sorted by numerous primary categories, including "popular," "movies & tv," "music," "sports," "automotive," "mobile," "health," "travel," "fashion," and "financial." Each of the primary categories may be further broken down into secondary categories. For example, a user interested in "sports" tags may use the directory interface 1682 to search through tags relating to the "NFL," the "MLB," the "NBA," the "NHL," the "NASCAR," "college FB," "college BB," and so on. The directory interface 1682 may be structured in any appropriate manner to provide users with convenient access to available tags and their associated assets.

Figure 39:
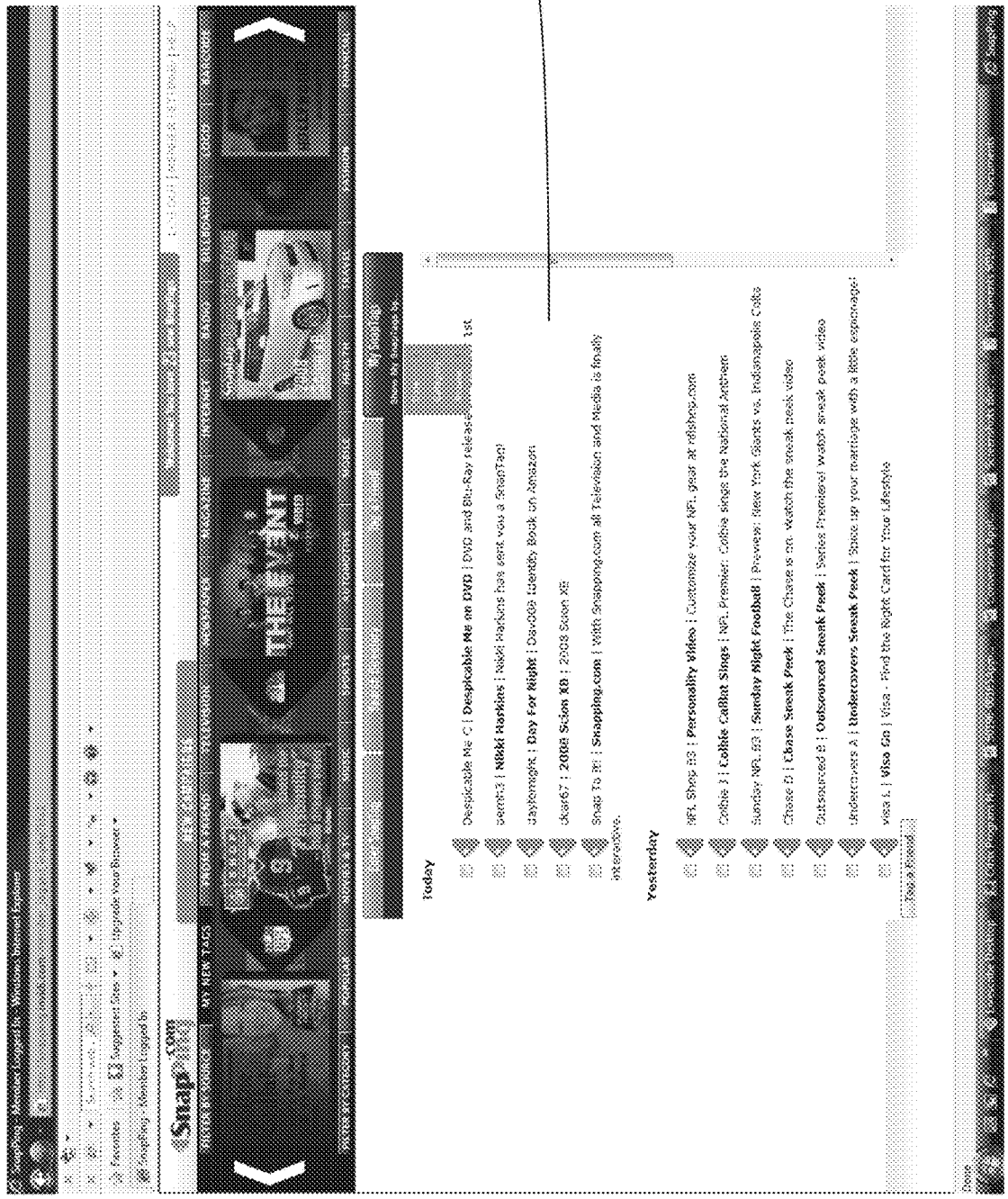
FIG. 39 provides a screenshot illustrating a personal directory interface of an exemplary centralized data network platform, identified by the URL www.SnapPing.com.

SnapPing.com may also include a personal directory interface 1684 for organizing member tags. As shown in FIG. 39, the personal directory interface 1684 may be associated with a "my snaptags" tab under which tags are organized according to "date," "category," and "source." The personal directory interface 1684 allows users to conveniently navigate the tags that they have requested so as to enable convenient access to the assets associated with the tags.

Figure 40:
FIG. 40 provides a screenshot illustrating a media builder interface of an exemplary centralized data network platform, identified by the URL www.SnapPing.com.

Because tags may be associated with any type of content, a variety of individuals and/or entities (other than advertisers) may be interested in using tags to provide follow-on assets for an unending array of content elements. To simplify the tag and asset creation process and make it available to a variety of tag creators, the RFI system may include a media-generation platform. For instance, the RFI system 3000 discussed in relation to FIG. 12 may include the media-generation platform 3028. FIG. 40 illustrates one embodiment of a media builder interface 1686 for use in implementing the media-generation platform 3028. That is, using the media builder interface 1686, a user may access the media-generation platform 3028 to construct web-based assets for delivery via any of the methods described above (i.e., delivery to a landing website, a social media platform, or a centralized data network platform such as SnapPing.com). Specifically, the media builder interface 1686 may serve as a launch point for a media builder application 1688, detailed in FIG. 43, which includes a number of appropriate user interfaces and corresponding logic elements to enable users to build web-based assets for storage within the RFI system or a separate third-party server.

Figure 41:
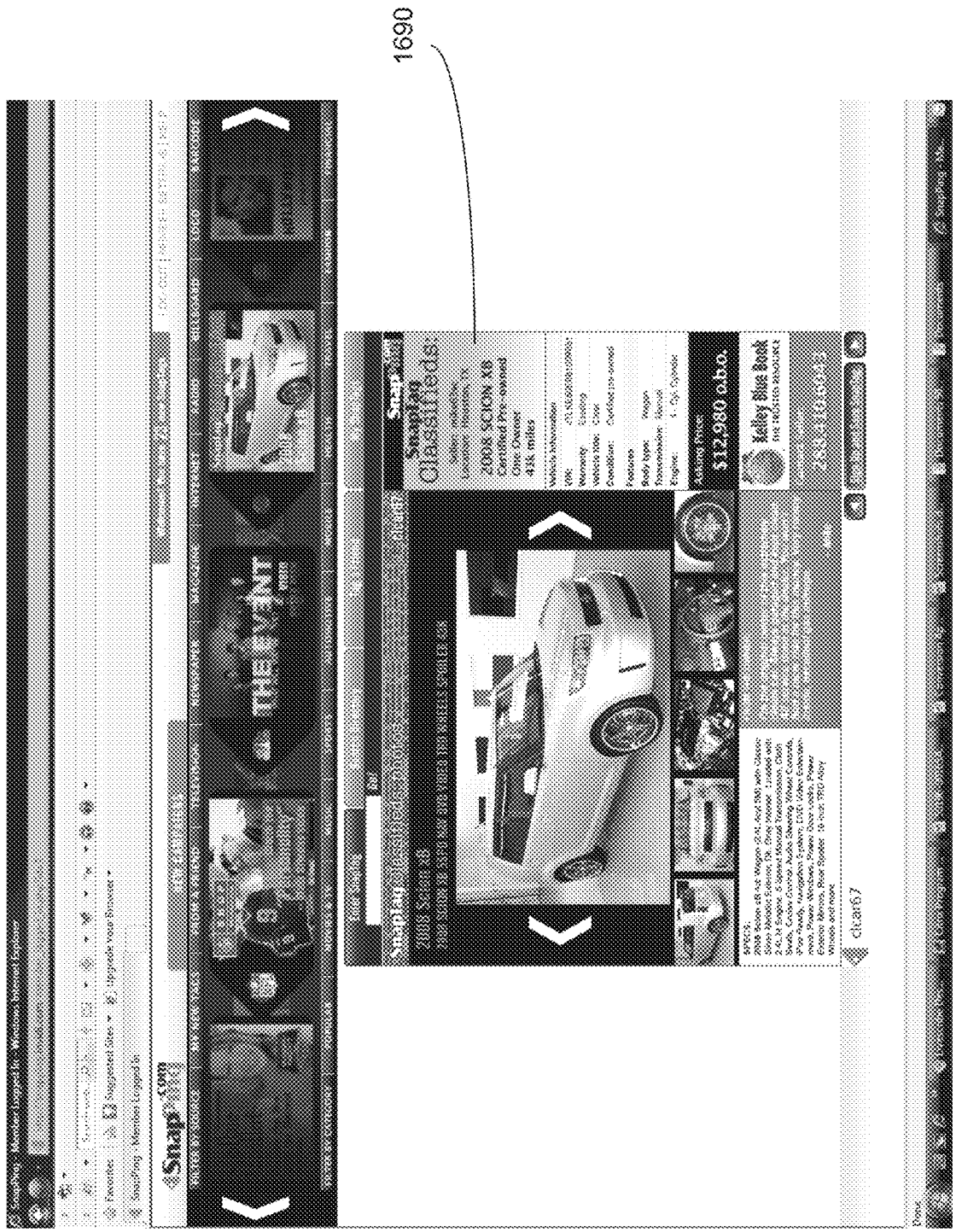
FIG. 41 provides a screenshot illustrating a classified advertisement (asset) constructed using a media builder application of a request for information system.
Figure 42:
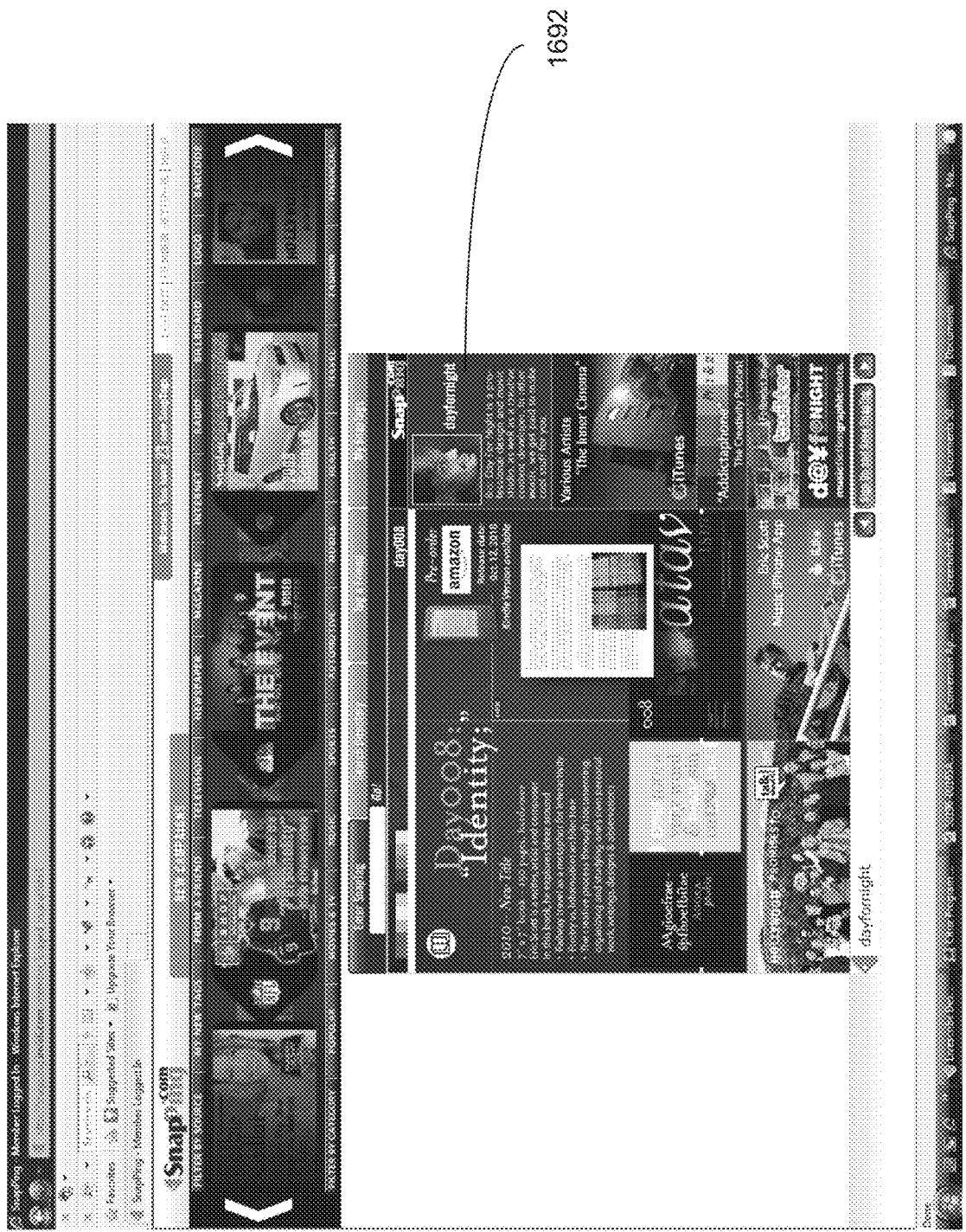
FIG. 42 provides a screen shot of a personal advertisement (asset) constructed using a media builder application of a request for information system.

Using the media builder application 1688, a user may construct a variety of web-based media assets such as, for example, a classified advertisement 1690 shown in FIG. 41 or a personal advertisement 1692 shown in FIG. 42. Beyond the advertisements 1690 and 1692, the media builder application 1688 may be used to construct any appropriate web-based asset of any type, style, purpose, and/or configuration. Producers of media assets may include any appropriate individuals, groups of individuals, or entities such as, for example, a teenager seeking to share summer fashion advice, a youth group, a little league team, a rock band, a commercial entity offering products and/or services, a non-profit foundation, a book club, and so on.

Figure 43:
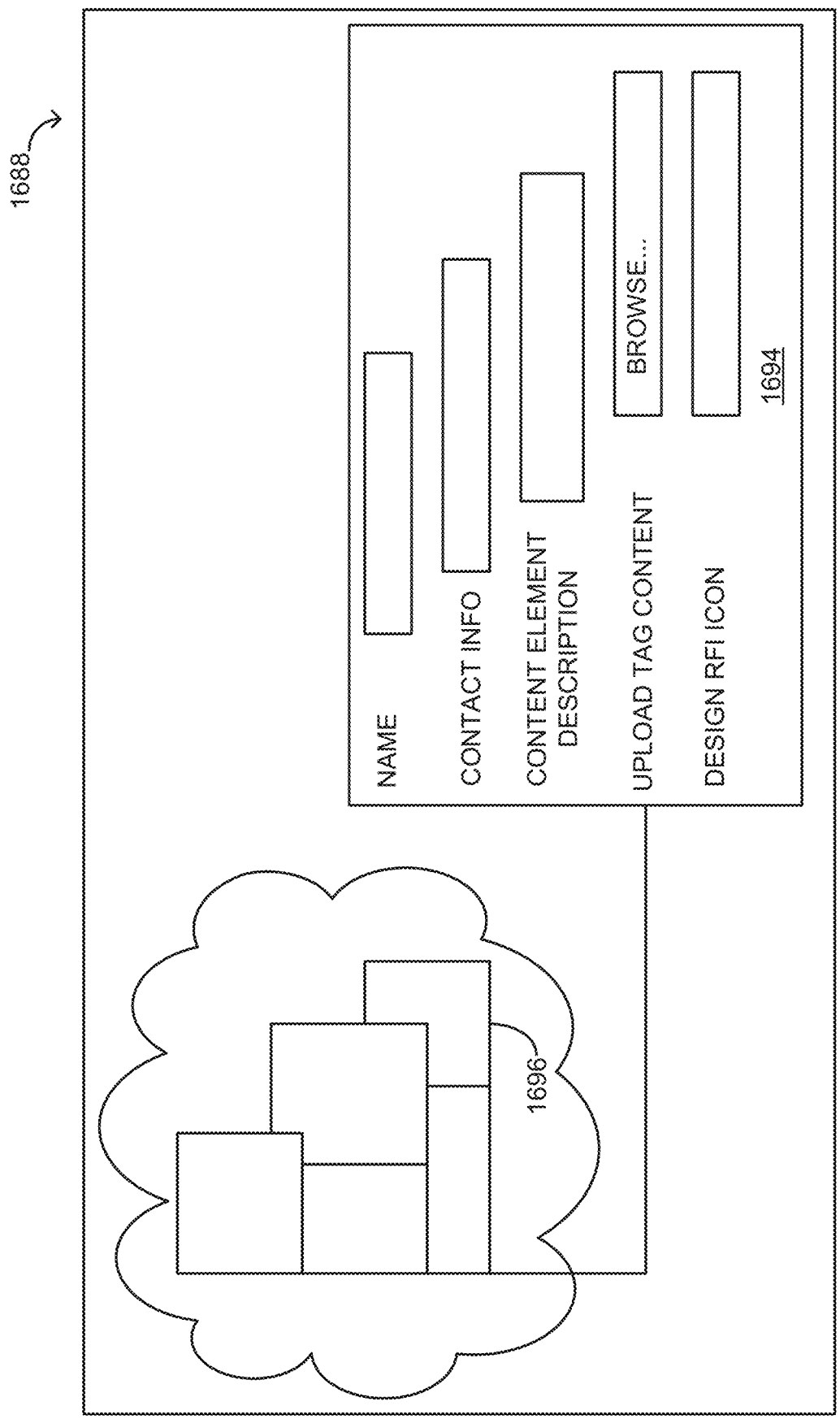
FIG. 43 illustrates a functional diagram of one embodiment of a media builder application of a request for information system.

FIG. 43 illustrates a functional block diagram of one embodiment of the media builder application 1688 for use by asset producers in constructing web-based assets for provision to users. Specifically, the media builder application 1688 may include an asset-creation interface 1694. Though the asset-creation interface 1694, producers of assets may upload follow-on content for association with a tag into memory structures 1696 that may be maintained within a cloud computing environment (e.g., within a third-party server, within the structure of an RFI system) to enable the massive processing demands of simultaneously storing and implementing hundreds of thousands of tags and associated assets. The asset-creation interface may have any appropriate format that allows a user to fully define a tag and its associated content or asset. For example, the interface may include inputs that allow a user to provide a name and contact info, describe the content to be associated with the tag, design an RFI icon to be associated with the tag, and upload follow-on content to be provided to users upon an RFI request for the tag.

Figure 44:
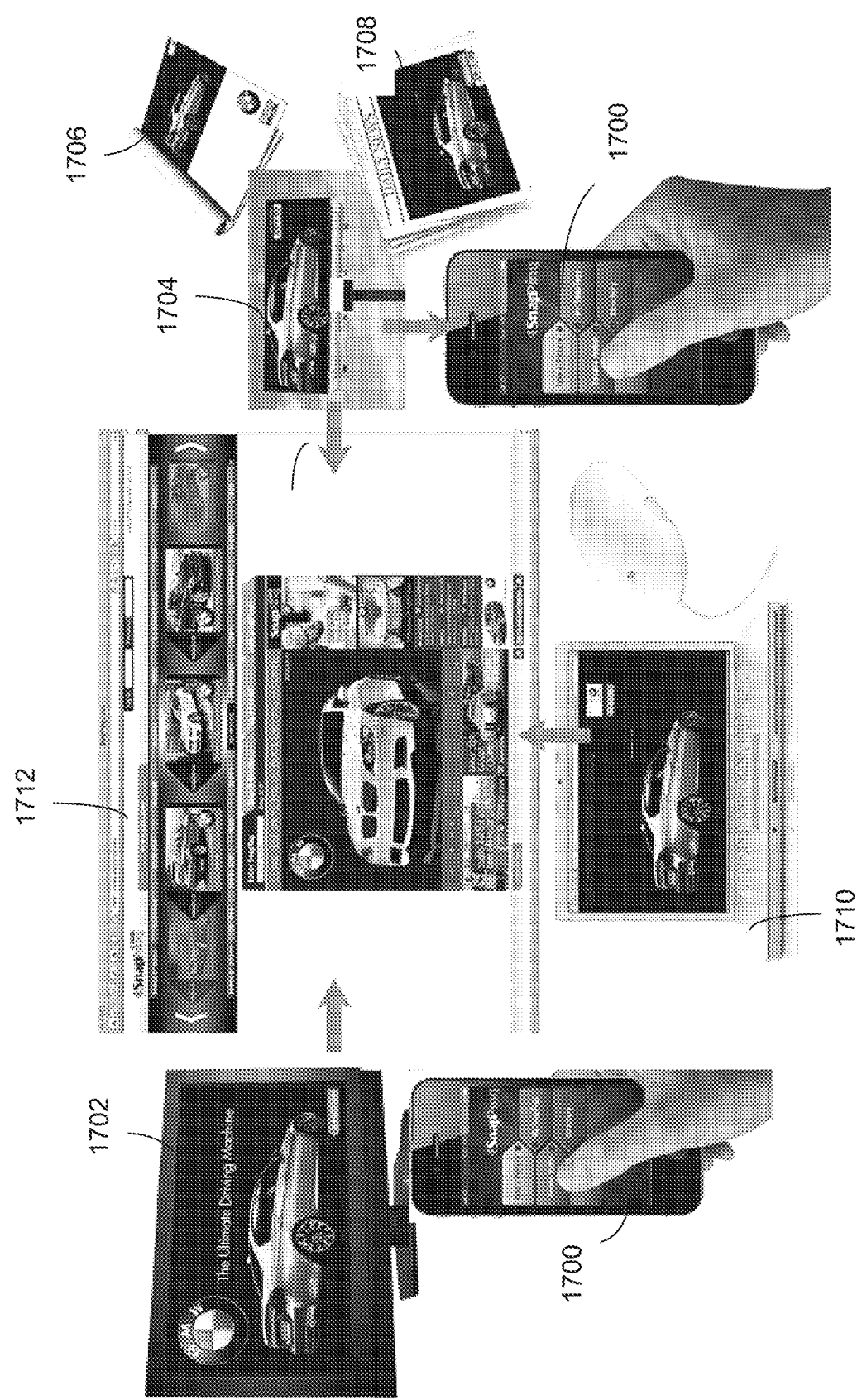
FIG. 44 provides a functional diagram of another embodiment of a request for information system.

FIG. 44 provides a functional overview of an exemplary RFI system as thus described. In the illustrated example, the user uses a smart phone 1700 to capture an image from a television 1702, a billboard 1704, a magazine 1706, or a newspaper 1708. Alternatively, the user may submit a request via a computer 1710 by clicking on an RFI icon contained within an Internet advertisement. In response, in the illustrated example, the user may be connected to an RFI platform 1712. The user may be prompted to login at the platform, and the login information may be used to access financial information, demographics, and other information, including personally identifiable information held securely at the platform. In this regard, the user may elect to opt-in to the RFI system in connection with registering at the platform 1712. The platform receives information from advertisers or other asset providers. In this regard, the platform can directly respond to RFI requests from the users. Alternatively, the RFI platform may respond to a request from a user by forwarding the request, together with other information, optionally including financial, demographic, and other personally identifiable information of the subscriber, to the asset provider. However, in many cases, the information forwarded from the RFI platform may provide demographic or other information pertaining to the user, but without personally identifiable information. The information provided by the RFI platform may include information inferred by a targeted advertising system. The asset provider may then respond directly to the user (e.g., via a landing website) or may respond to the user via the platform 1712. The user may be allowed to opt-in or opt out of the entire system or portions of the system. For example, the user may elect to receive information only from the platform 1712 and not directly from the asset providers. Alternatively, the user may configure the system to allow contents from or exclude contents from particular sources or types of sources.

The RFI system described above provides numerous revenue generating opportunities for its operator and/or its partners. First, follow-on content/assets provided in connection with tags may be wrapped or bundled with one or more advertisements. The advertisements may be selected by the operator in any desirable manner. For example, the advertisements may be related to the type of follow-on information provided within an asset. For instance, a restaurant menu asset may include advertisements for cooking classes or other restaurants. Alternatively, the bundle of advertisements may be targeted specifically for the user that has entered the RFI request. For instance, advertisements may be targeted based on knowledge of a user's demographic characteristics and/or preferences. The user may provide this information voluntarily through a registration process or the system operator may gather information using a classifier, discussed above, or by partnering with a third-party information provider such as Experian. In another option, the advertisements to be bundled with asset content may be selected based on an auction that implements any appropriate auctioning model to select the winning bidder. Revenues may be generated from RFI icon placement, e.g., a number of RFI icon placement opportunities may be defined in connection with a television program, webcast, public display, etc., and such RFI icon placement opportunities may be sold or auctioned. In this regard, certain RFI icon placement opportunities may command a premium. For example, RFI icons displayed during programming just before a commercial break may command a higher price. Such icons may be used, for example, to encourage viewing of a subsequent commercial. Any of these advertising selection and sales options may be combined as appropriate. However, with any option or combination of options, users may request and receive tags free of charge in exchange for their willingness to receive advertising messages along with the follow-on content. In alternative or additional model, users may pay a registration fee to receive tag services that are free of advertising.

Another source of revenue may stem from the creators of tags/assets who may be charged a fee for the creation, storage, and management or implementation of their tags/assets. Alternatively, tags and assets may be provided free of charge in order to rapidly increase public awareness and use of the tag service through a drastic increase in the number of tags available to users for request. Moreover, revenues may be shared between an RFI site, such as SnapPing.com, and affiliate sites based on increased traffic or sales. For example, users may enter a RFI character string at an RFI site that causes the user to be linked to a specified page of a social network site or another affiliated website. In such cases, traffic and/or resulting commercial activity may result in revenue sharing as between the associated site operators, businesses, or other concerned parties. The above-discussed ability to share and/or recommend tags to friends further increases user awareness of the tag service. Such sharing may occur through friends lists associated with the RFI site (e.g., maintained on the user's account) or associated with existing social network sites that are affiliated with the RFI site, as discussed above. For example, a user may enter an RFI request not for him or herself, but instead to have the tag forwarded to the user's friend or relative. Similarly, a user's tags may be made available for viewing, either publically or by a defined set of users, at the RFI site or an affiliated social networking site. Those public tags may be associated with "like it"-type voting buttons such that friends and family viewing the tags may indicate their interest in and/or approval of the tags. In similar fashion, users may share and/or recommend programs or other assets with friends or associates using the identification technologies disclosed herein. For example, if a user wishes to share a commercial or program with friends, the user may record an audio snippet of that commercial or program. Then, rather than sharing a tag associated with that commercial or program, the user may choose to share an RFI code identifying the content with friends. In such a case, the content may be obtained by the friends from YouTube, Hulu, and so on.

In summary, the above described RFI system enables universally interactive requests for information in that tag creators may associate tags with literally any type of content, and users may enter RFI requests through an array of convenient mechanisms. The fundamental components of the RFI system include the ability to associate follow-on content/assets with a tag containing instructions regarding the delivery or provision of the asset. The tag is, in turn, associated with an element of media content (e.g., a television program, a radio program, a newspaper article, a billboard) or an element of content that is unrelated to any type of media distribution. For instance, to name a few, tags may be associated with individuals, businesses, buildings, all types of commercial products and/or services, and so on. The element of content may include an RFI icon that is affixed to or otherwise associated with the corresponding element of content. Users may submit RFI requests, or RFI codes, in several ways. They may type or scan a unique tag identifier such as an alphabetic, numeric, or alpha-numeric character string, record audio that identifies the content of interest, record a voice identification of the content of interest, capture an image of the content of interest, or directly interact with an interactive content overlay that may be imbedded in streaming online or Internet-based television content. Users may also specify preferences for receiving tags automatically without additional requests.

In response to user requests or RFI code entries, the system matches the requests with their corresponding tags and provides the follow-on/asset content associated with the tags to the requesting users. The content may be provided in a variety of ways including, for example, web access to the content, an email containing the content, a mailing containing the content, and so on.

In essence, the RFI system provides a mechanism by which users may bypass the Internet search process, which has grown cumbersome with the massive growth of content available on the Internet. Rather than perform a search for content of interest, a user may simply enter an RFI code associated with an item of interest and immediately receive information relating to that item. For example, a tourist strolling down the street may see a flashy sports car that catches the eye. Rather than performing an Internet search for the car, which takes time and often produces a number of incorrect, generic, or tenuously-related websites, the user may enter the RFI code for the car (e.g., a character string, an image, a verbal description) and immediately receive follow-on information relating to the car without the need to perform a more general, and often time-consuming, search.

Figure 8:
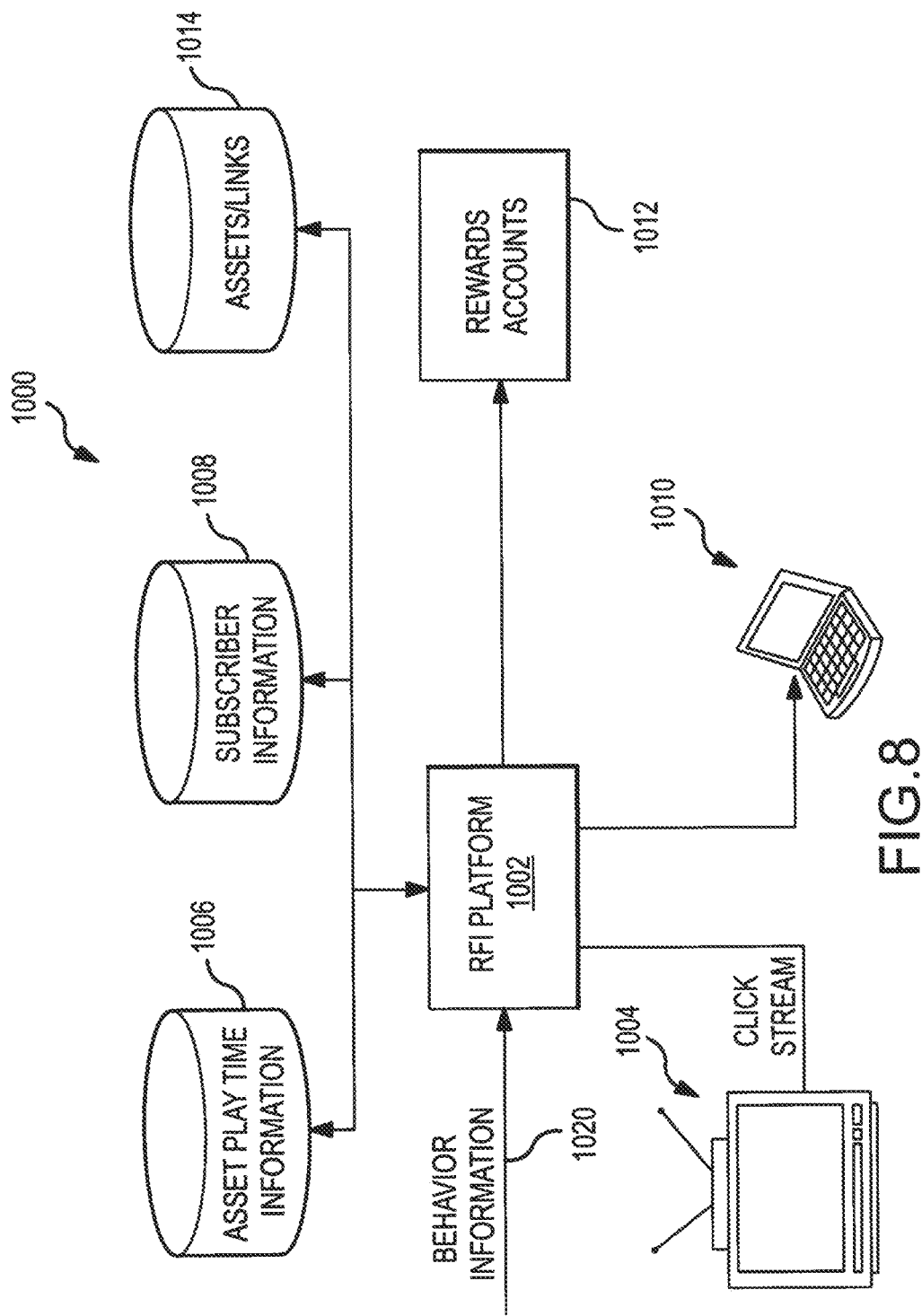
FIG. 8 illustrates a request for information system in accordance with the present invention.

FIG. 8 illustrates an alternative embodiment of a request for information (RFI) system 1000. The system allows users of one communications network (e.g., a cable television network or a data network such as the Internet) to provide information useful for targeting assets or follow-on information in another network (e.g., a data network or cable television network). Thus, for example, information regarding viewing habits or classification parameters developed in connection with a cable television targeted advertising system may be used to target banner ads or other assets or follow-on information delivered during an Internet session of an associated network user. Conversely, information developed from analyzing Internet usage may be utilized to target assets via the cable television network. In this regard, the targeted advertising system provides direct value to asset providers as well as the MVPDs that enable the targeted asset delivery system. For instance, information regarding viewing habits and/or classification parameters that the MVPDs develop in the process of enabling the targeted asset delivery system may be used to assist asset providers including both advertisers and programming providers in targeting assets or follow-on information within separate networks and/or modalities (e.g., access via a web-portal, telephone, direct mailing, e-mail). This provides the MVPDs with an additional revenue opportunity and encourages them to enable the targeted asset delivery system.

In particular, it has been recognized that some network users have different usage modes associated with different networks. For example, when watching a television program such as a televised sporting event or prerecorded programming, a user may prefer that interactive requirements and interruptions to programming be kept to a minimum. The same user may be interested in actively selecting information, and delving deeper into available content during a television advertisement or a data network session. An asset provider may wish to take advantage of both modes, for example, by providing a rich and alluring video asset via television followed by more detailed product information in an interactive context during a subsequent data network session using a data terminal (e.g., a computer, a PDA, a data enabled phone, etc.).

This strategy may be particularly effective and inoffensive where the user has expressly indicated an interest in receiving the follow-on information. The system 1000 of FIG. 8 shows one architecture for executing this functionality. The system 1000 includes an RFI platform 1002 in communication with a user equipment device 1004 of a cable television network and a data terminal 1010. It will be appreciated that, although a single platform 1002 is shown for purposes of illustration, the associated functionality may be distributed over multiple platforms. Moreover, though a single device 1004 and a single terminal 1010 are shown, the platform can service many devices and terminals within a network environment.

In addition, though the system 1000 is described below in relation to a common user of the single device 1002 and the single terminal 1010, it will be appreciated that a variety of usage patterns are possible. For example, the device 1004 may be used by multiple members of a household. Those household members may or may not also be users of the terminal 1010. In some cases, multiple household members who use the device 1004 (concurrently or separately) may have separate terminals 1010. Conversely, multiple users of a terminal 1010 may have separate devices 1004. Also, each device 1004 and terminal 1010 may be associated with a set of multiple users, which sets may be the same or different. It should also be appreciated that the device 1004 and terminal 1010 may be at the same location (e.g., a residence) or different locations (e.g., one at home and the other at an office or a mobile device).

In one implementation of the present invention, a user or users of the device 1004 receive a first asset on the device 1004 and receive a second, follow-on asset via the terminal 1010. For example, the first asset may be a product placement ad, a commercial presented during a commercial break, or an entire television program. The second asset may be product information delivered by e-mail or an e-mailed link to interactive content. Alternatively or additionally, the follow-on asset may be made available through a centralized web-portal, delivered to the device 1004 (e.g., to be stored for later delivery or on a dedicated asset channel), or delivered via the mail or by phone.

In the illustrated implementation, little or no user input may be required to initiate delivery of the second asset. For example, when the targeted advertising system reports that a particular user or users (e.g., as estimated by an audience classifier) have consumed an asset, the system may prompt delivery of the second asset.

Alternatively, a user watching programming including a product placement ad, watching other programming such as a weather report or history themed programming, or watching an ad during a commercial break may provide an input to request further information (an "RFI input") as part of an opt-in or subscriber RFI program. The RFI input may be entered, for example, by pressing a designated remote control key. This RFI input may be responsive to a prompt (e.g., a pop-up message or an RFI icon that has been embedded in the content and that indicates that information is available) or sua sponte. In one embodiment, the asset provider embeds an RFI icon within the asset during either the post-production activities for pre-recorded assets or the production activities for live broadcast assets. The RFI icon conveys that the asset is RFI enabled and prompts users to enter an RFI input to request follow-on information relating to the asset being viewed. The RFI icon may indicate the type of follow-on information that is available for the particular RFI enabled asset (e.g., display a music cleft for information relating to music, a dollar sign for coupons or financial incentives, and so on). Alternatively, the asset may include a generic RFI icon.

To subscribe to the program, users may voluntarily create an account on, for example, a rewards accounts platform 1012 made available through access to a centralized web-portal or simply a web-portal configured to maintain user accounts. In creating the account, the user may provide a variety of information including contact information (e.g., e-mail address, mailing address, telephone number), demographic information (e.g., gender, age, ethnicity, geographical location, annual income, marital status), and information relating to the user's consumer preferences, family and friends, and privacy permissions or consents.

To educate users regarding the RFI system, including the functionality of the RFI icon and how users may opt-in to the RFI program, the MVPD may run information commercials or announcements explaining the system and its operation. Alternatively, asset providers may incorporate announcements into their scheduled programming in which users are instructed to press the appropriate button on the remote when an RFI icon appears on the screen to receive related follow-on information and, if the user has not already done so, to log on to a specified website or web-portal to subscribe to the RFI program.

In this manner, the second asset or follow-on information may be delivered to the user based on a single input, thus requiring minimal interaction by the user and entailing little or no interruption of the current television programming/asset. However, if desired, additional interaction can be accommodated. For example, after the user has entered an initial RFI input, the user may be prompted to enter additional information, e.g., via a menu using arrow and enter keys. Such information may include: (1) identifying the user or users requesting the second asset or information; (2) identifying the modality or terminal(s) for delivery of the information; (3) identifying the information desired (e.g., where multiple items of information are associated with the time of the RFI input such as when a product placement ad occurs during travel programming; or (4) identifying a third party or parties (e.g., from a friends and family list of consenting/participating network users) to whom the information should be sent. Many other types of inputs may be supported.

Based on such inputs, information is transmitted from the device 1004 to the RFI platform 1002. This information may be raw click stream information or processed information (e.g., an RFI message) based on the RFI input. In either case, the RFI platform 1002 uses this information to determine the time of the input (which may be the current time if the click stream information is concurrently transmitted to the platform 1002) and the channel to which the user was tuned at the time of the input. The platform 1002 may also process this information to determine demographic or other user classification information, or to estimate the size and/or composition of an audience to optimize future time-slot ad buys. Alternatively, the message may include an asset identifier for the asset and/or a user identification and/or classification information about the user.

The RFI platform 1002 then uses this information to access an asset play time information database 1006. This database 1006, which may be constructed using information from asset providers (e.g., advertisers, programming networks), network providers (e.g., MVPDs), equipment (e.g., head ends) and other sources, identifies what assets played on what channels at what times. The database can thus be used to associate the RFI input with a first asset to which it pertains and, optionally, to a second (presumably related) asset or asset link to be delivered to the terminal 1010. This second asset or link can then be retrieved from an asset/links database 1014. It will be appreciated that the assets/links database 1014 can be accessed based on a second asset identifier, a first asset identifier or any other suitable information. Moreover, though multiple databases are depicted, any suitable data structure including a simple database or multiple databases, on a single or multiple machines, at a single or multiple locations, can be utilized. Moreover, rather than sending an e-mail or link to the user, this information may be used by a targeted asset system of a data network (e.g., the Internet) or of a particular site (e.g., a search engine) to target banner ads or other assets during a data network session of user. It will be appreciated that such interest or targeting information may be shared both ways as between the data network targeting system and the television network targeting system.

The subscriber information database 1008 includes various information relating to the network users. This information may include, for example, contact information (e-mail address, physical address, phone number, etc.), privacy information such as any consents or refusals to be contacted via specified modes, by specified providers, at specified times or with specified kinds of information and promotions, friends and family lists, demographic information, loyalty program information, and the like. For example, an e-mail address may be extracted from the subscriber information database in order to send the second asset to the terminal 1010. The information contained in database 1008 may be provided by the user, for example, during the process of setting up a user account or it may be gathered from third parties (e.g., credit card companies, credit reporting agencies) in accordance with the user's privacy permissions.

Figure 9:
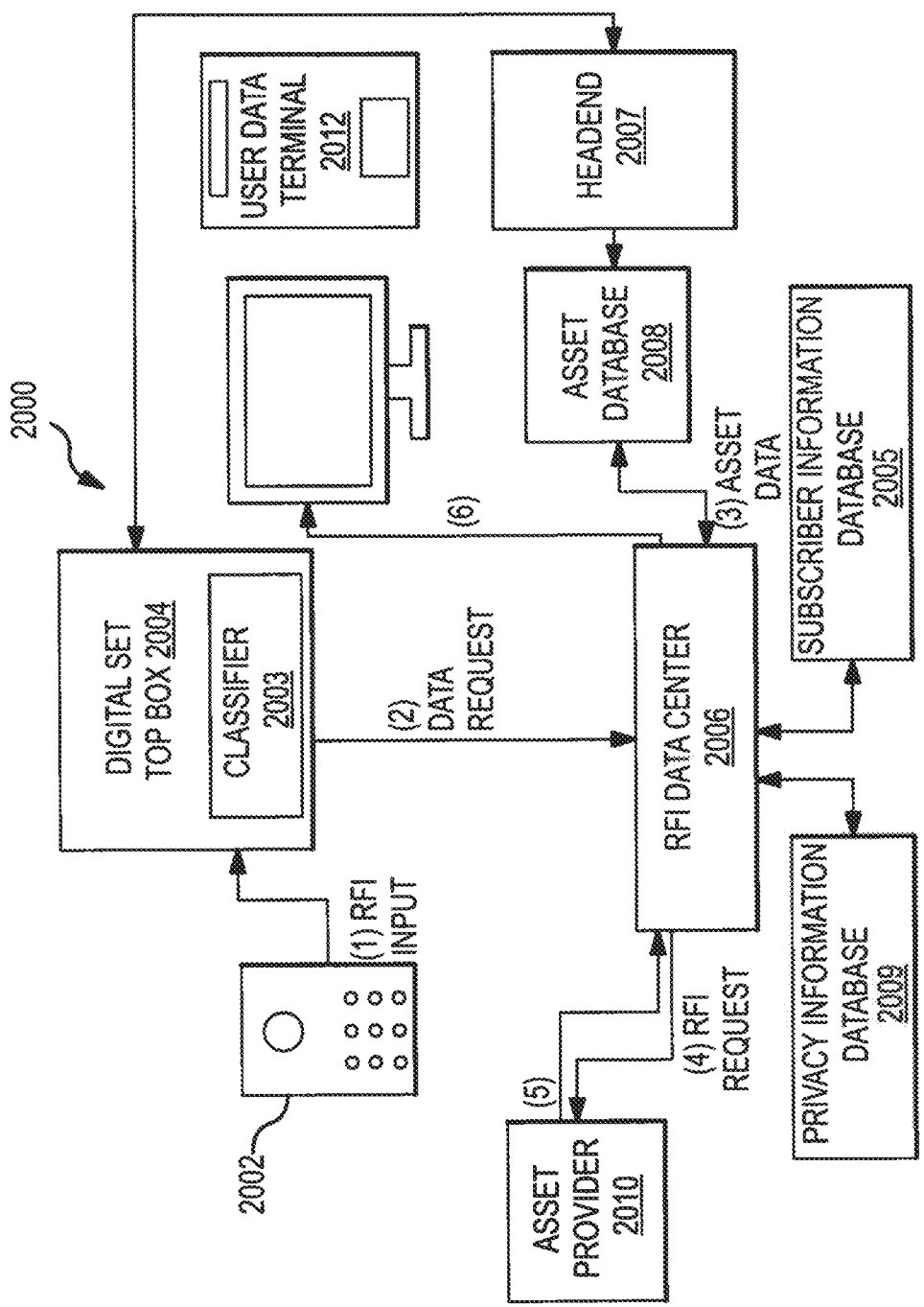
FIG. 9 illustrates a request for information system in an exemplary implementation of a digital cable television network.

FIG. 9 shows a flow diagram of an exemplary application of an RFI system 2000 in the context of a digital cable television network and Internet application. The illustrated process initiates when the viewer enters an RFI input to the digital set top box using the user remote 2002 (1). For example, the user remote 2002 may include a designated RFI input button or a particular code may be entered. As discussed above, the asset currently being displayed may include an RFI icon or prompt instructing the user to enter a particular button or code to receive more information. The remote 2002 may be a multi-purpose, commercially available remote control or it may be a specialized remote.

Based on this RFI input, a digital set top box 2004 transmits a data request to an RFI data center 2006 (2). This data request may include, for example, an identifier for the digital set top box, the date and time of the RFI input, the network to which the digital set top box was tuned at that time (which may be a programming network, an ad channel, or a channel identifier) and, optionally, an asset identifier and/or information concerning "who's watching now." As discussed above, the information concerning who's watching now may be determined by operation of a classifier 2003 of a targeted asset delivery system.

The RFI data center 2006 also receives asset data from an asset database 2008 (3), which may be controlled by a network provider (e.g., an MVPD). For example, the asset database 2008 may include tables providing information concerning what assets were broadcast from a headend 2008, what channels and at what times those assets were broadcast, and more particularly, what assets were selected for viewing at each digital set top box 2004. In a targeted asset delivery system, the asset database 2008 may include asset delivery information pertaining to each digital set top box 2004 in the broadcast network, rather than each programming network channel broadcast over the network, because the assets selected for each set top box 2004 may vary according to the classification parameters of the household or of a specific user within the household that the classifier 2003 has determined to be present. The information contained in the asset database 2008 can be used together with the request information from the digital set top box 2004 to associate the RFI input with a particular asset.

Once the RFI input has been associated with a particular asset, an RFI request is transmitted to the appropriate asset provider 2010 (4). Thus, for example, an automobile manufacturer such as General Motors ("GM") may purchase a particular asset spot during a given program. As described above, a targeted advertising system may operate in spot optimization mode to deliver specific GM ads to appropriate viewers during the time period of that spot. Accordingly, one demographic group may receive a sports car ad from GM whereas another demographic group may receive a minivan ad during that spot. These different GM ads may be broadcast on different ad channels in synchronization with the spot. The targeted ad actually delivered to a particular set top box 2004 is then reported to the RFI data center 2006, as discussed above. As a result, the RFI request identifies a specific ad that was of interest to the user and for which the user has requested additional information.

The RFI request sent to the asset provider may also be augmented with a profile associated with the household or, in a targeted asset delivery system that incorporates the classifier 2003, with a specific user "who's watching now." For example, the RFI data center 2006 may access stored subscriber information (e.g., demographic information, consumer preference information) from a subscriber information database 2007. The subscriber information may be provided by the user during the opt-in process or gathered from third-party sources (e.g., credit reporting agencies, asset provider mailing lists) and may be used to construct a user profile that contains information of interest to the asset provider. Continuing the GM example above, GM may contract to receive RFI requests that include income and recent purchasing behavior information relating to the user initiating each RFI input. Thus, the RFI request transmitted to the asset provider 2010 (4) may include information regarding the user's $250,000 annual income and the user's purchase of a Cadillac Escalade during the previous year.

In one embodiment, the MVPD may employ a privacy database 2009 to ensure user privacy. In this embodiment, the RFI request contains only general profile information relating to the user, not personally identifiable information that would allow the asset provider to contact, or otherwise identify, the user directly. The privacy database may incorporate MVPD privacy policies, government mandated privacy regimes, as well as user-defined privacy consents and permissions provided during the opt-in process. In another embodiment, personally identifiable information (e.g., name, mailing address, e-mail address, telephone number) may be provided directly to the asset provider with the RFI request where privacy policies allow. In these cases, the asset provider may contact the user directly.

Based on the RFI request, the asset provider 2010 can provide, for example, an asset package or follow-on information back to the RFI data center 2006 (5) that is tailored for the particular user. Thus, GM may have various asset packages associated with various vehicles. GM can then report back to the RFI data center 2006 an asset package corresponding to the specific asset identified by the viewer or tailored to the user profile for that user, in this case, an asset package containing follow-on information targeted to high-income earners that are not currently GM customers. The RFI data center 2006 may then provide the follow-on asset package to a user data terminal 2012 (6), for example, via access to a web-portal or via e-mail. In a subsequent data network session, the user may access the e-mail or web-portal to interactively obtain the information requested. If the user subsequently purchases an associated product, in this case, a GM vehicle, the purchase may be reported to the RFI data center 2006, as discussed in greater detail below.

While the example discussed above relates to an advertisement delivered during a break in broadcast network programming, it should be noted that the RFI system is applicable to any RFI enabled or other asset, which may include advertisements as well as pre-recorded or live programming such as television shows or movies, music, sports, news, and much more.

B. Encouraging and Verifying Asset Consumption

Current technologies make it possible for users of communication networks to skip assets. In the case of broadcast networks, such as cable television networks, users may use DVRs to manually fast-forward through assets contained in pre-recorded programs or they may employ commercial-skipping software to automatically record network programming without assets. Because many users prefer to view programming without commercial interruption, many users of broadcast television networks choose not to consume assets. This is undesirable because, as discussed above, programming providers in ad-supported networks are compensated, at least in part, by asset delivery revenues. These revenues subsidize the significant cost of providing programming and lower or eliminate associated user fees. Because the cost to air a given asset generally rises as the size of the audience increases, the practice of skipping assets has the potential to undermine the business model that makes ad-supported content dissemination viable. While this is a concern to asset providers, network operators, and programming providers, it is also a concern for users who have come to expect advertiser subsidization of the costs of making content available via communications networks.

Nonetheless, it is believed that many users may be willing to receive and consume assets (e.g., first and second/follow-on assets and information) if provided sufficient economic motivation. In this regard, the RFI system includes a mechanism for encouraging asset consumption in order to further improve the effectiveness the targeted asset delivery system so as to fully realize the benefits of ad-supported programming, discussed above. Such a mechanism involves offering monetary remuneration in exchange for the verified consumption of first and/or second assets. This monetary remuneration may take several forms, including, for example, direct payment, network service credits and/or upgrades, cash or merchandize prizes, product and/or service discounts from participating asset providers, and the like.

Generally, a consumer loyalty or rewards program may be based on verified asset consumption and/or requests for follow-on assets or information. For example, a rewards account may be established for all network users or a portion of participating network users. Then each user's consumption of assets may be verified, and the associated rewards account may be credited value based on the verified consumption of assets.

In the context of a first asset delivered via a cable television network, a Multiple System Operator (MSO) may establish an account for each network user. Then a user equipment device may verify the consumption of assets by monitoring user inputs at the user equipment device, and in response, the rewards account associated with the user equipment device may be credited value based on the verified consumption of assets shown at the user equipment device and/or based on additional user inputs to the user equipment device, made at or near the time of asset delivery, that indicate a network user's request for or consent to receive follow-on information via another network and/or modality. Credits to network users may include, for example, credits against the network user's bill, credits towards upgrades or extras (e.g., fee based services such as VOD programs), credits towards a threshold for receiving an award such as one-month of free services, or credits towards a third party or affiliate rewards program (e.g., frequent flyer miles, Upromise accounts, purchasing points and/or discounts with participating venders, etc.).

Additionally or alternatively, asset skipping events can be recorded and reported so that network users electing to skip assets may be appropriately billed (or have their existing bill adjusted) to compensate for the value that the asset provider is notionally diminished by the asset skip event. Such recording and reporting of asset skip events, calculation of an appropriate amount of compensation, and billing of network users for such asset skip events is described in co-assigned and copending U.S. patent application Ser. No. 12/024,714, entitled "Verifying and Encouraging Asset Consumption in a Communications Network" and having a filing date of Feb. 1, 2008, the entire contents of which are incorporated by reference herein.

The loyalty or rewards program also contemplates a lottery reward system in which a sweepstakes-type prize (e.g., money, product(s)) may be awarded to a network user or users that are randomly selected at or around the time that an asset is being consumed. For example, a randomly selected network user that has consumed an entire asset may receive a prompt at the close of the asset indicating that the user should respond with a certain input to the user equipment device. If the network user responds accordingly, the rewards account associated with the user equipment device may be credited value based on the user's input or the user may be given further instruction regarding claiming and receiving the prize via the contact information (e.g., e-mail, mailing address, telephone number) associated with the rewards account. Because network users must consume assets to be selected as a winner, network users are encouraged to consume assets out of a desire to be included in the group of eligible candidates.

The consumer loyalty or rewards program discussed above may also be used to encourage network users to provide valuable classification information and/or to consume second or follow-on assets. For example, network users may opt-in or consent to collection of information out of a desire to participate in the program or to improve asset targeting. In this regard, network users may provide contact information, demographic or lifestyle information, product interests, or other information in a registration process associated with the loyalty or rewards program. Further, and as discussed above, network users may request or agree to receive follow-on assets through a separate network (e.g., the Internet or e-mail) or via another modality (e.g., contact by phone or mail) in exchange for incentives offered through the loyalty or rewards program.

In addition, the information acquired in connection with such a consumer loyalty or rewards program may have value for other applications. For example, in verifying asset consumption by monitoring user inputs at the user equipment device, the system may accumulate information regarding which network users have consumed what assets, how many consumers have elected not to consume an asset and/or what level of interest was indicated by consumers (e.g., a click stream may indicate a high likelihood that a user was present, an intentional dwelling on the asset, a muting or reduced volume for the asset, etc.), and which users expressed interested in receiving follow-on information relating to a particular asset. All of this information, regardless of whether it is accumulated during the process of verifying asset consumption to carry out the rewards program or voluntarily provided by network users in order to participate in the rewards program, may be used to value asset delivery, to analyze the effectiveness of an ad campaign, or to better understand the target audience for an asset, and therefore, the target market for a product.

FIG. 8 illustrates the integration of the rewards program into the RFI system 1000. Specifically information recorded at user equipment devices 1004, 1010 may be provided to the RFI platform 1002. This information may include user inputs relating to asset consumption or skip events or to requests for follow-on information. Accordingly, this information may be processed and sent to a rewards accounts platform 1012 such that network users may be credited based on consumption of assets or billed appropriately based on asset skipping. In addition, value may be credited to a rewards account in connection with receiving a second asset or sending an asset to others on the network user's friends and family list. In this regard, information reflecting such activities is reported to platform 1012 for recording purposes.

C. Acquiring Consumer Behavior Information

The RFI platform 1002 may also receive consumer behavior information 1020. This consumer behavior information 1020 may include any kind of information of interest to content providers, including asset and programming providers or others to, for example, close the loop concerning analysis of asset or follow-on information effectiveness. For example, the behavior information 1020 may relate to purchasing decisions made by consumers after viewing a first asset and/or a second or follow-on asset. Such information may be acquired from a third party database such as, for example, a credit card company, credit agency, or a credit card transaction processing service. Consumer behavior information 1020 may also be reported to the RFI platform 1002 by asset providers and/or associated vendors or retailers that are able to track purchases through the use of loyalty numbers or member IDs that are associated with participating network users' loyalty or rewards program accounts. Further, network providers such as MVPDs could partner with third-party consumer marketing services or affiliate program providers that monitor member purchases made with participating asset providers and/or retailers. Alternatively, consumers may report transaction information directly to the RFI platform 1002.

D. Correlating Asset Consumption to Consumer Behavior Information

Once asset consumption has been verified and consumer behavior information has been collected, as discussed above, the RFI platform 1002 can correlate such consumer behavior information to asset consumption information so as to identify instances where, for example, a consumer has purchased a product after consuming a first asset and/or a second or follow-on asset related to that product. This will allow asset providers to close the loop regarding the effectiveness of assets and to develop improved metrics for analyzing the effectiveness of assets.

Additionally, the ability to statistically correlate asset consumption with consumer purchasing behavior allows for other revenue models in relation to asset delivery. For example, as part of the loyalty or rewards program, not only network users/consumers, but also programming networks, network operators or other parties may receive an additional element of remuneration in cases where a product is purchased after assets have been consumed. For example, the network user/consumer may receive a discount in relation to the purchase or in relation to a bill for network usage. In addition, one or more of the programming networks, network affiliates or network operators (e.g., MVPDs) may receive additional revenues associated with delivery of assets that result in purchasing decisions.

E. System Operation

Figure 10:
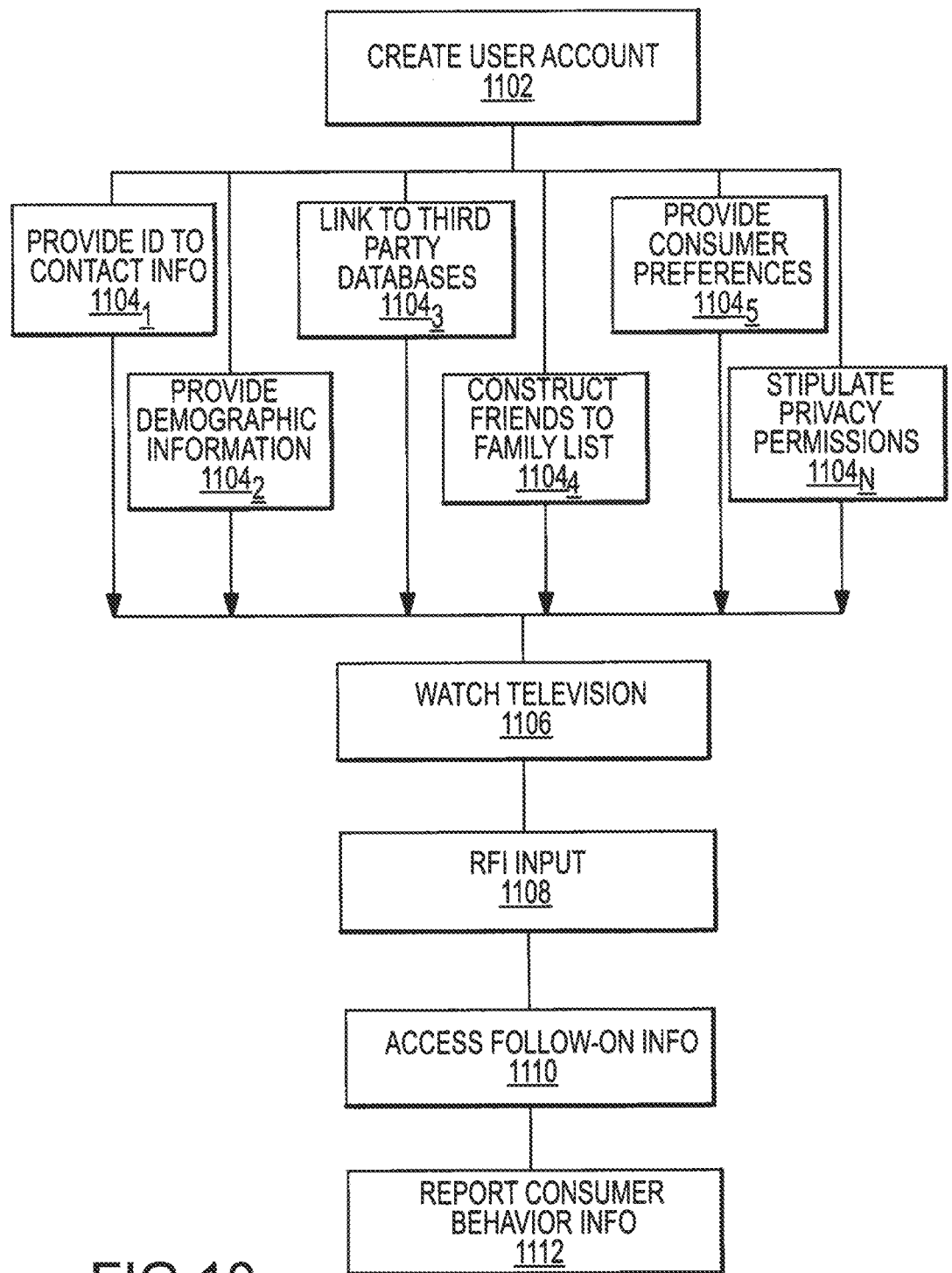
FIG. 10 provides a flow chart that illustrates the functionality of an exemplary request for information system from a user's perspective.
Figure 11:
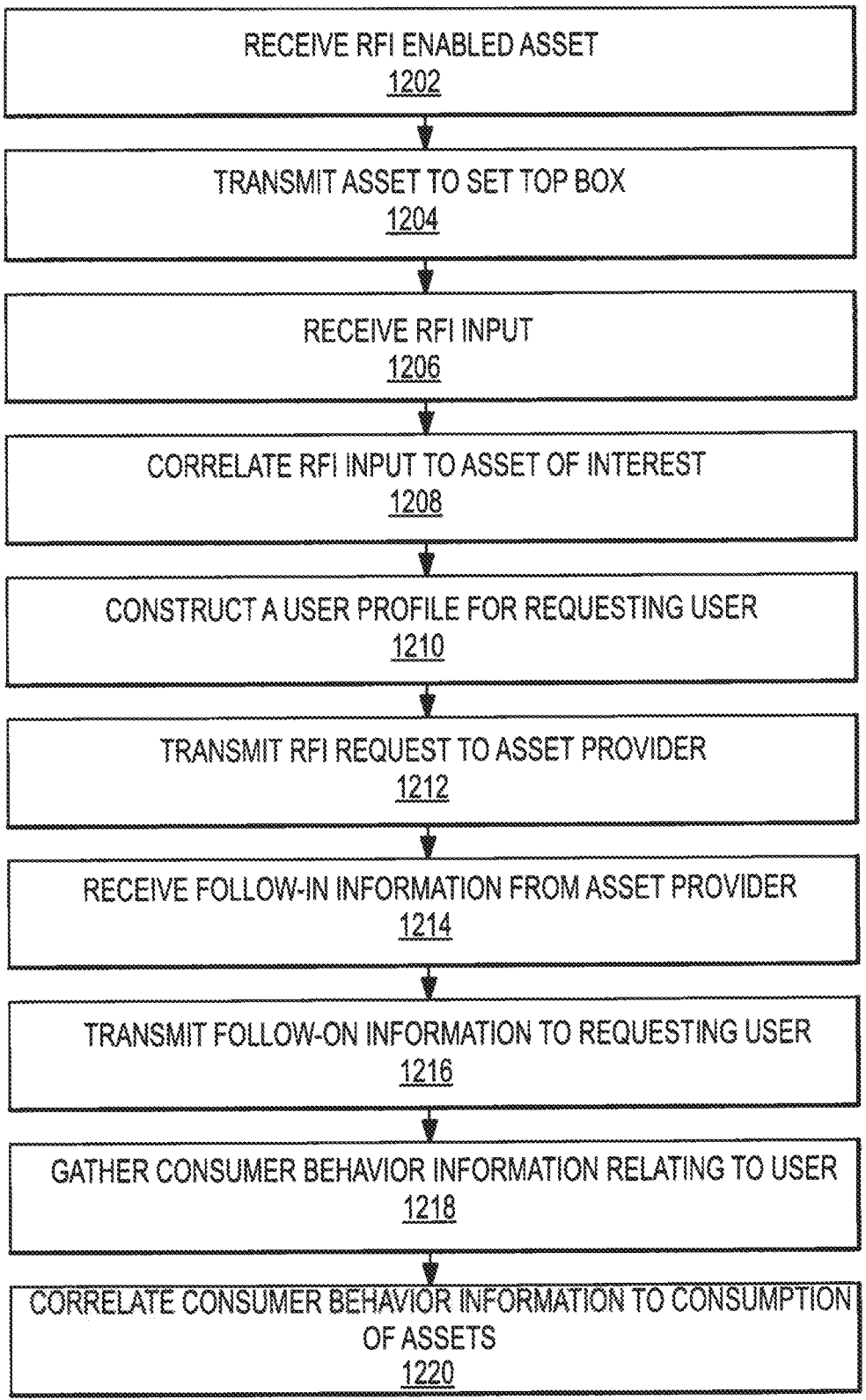
FIG. 11 provides a flow chart that illustrates the functionality of an exemplary request for information system from the perspective of a multiple systems operator.

FIGS. 10 and 11 provide flow charts that summarize the functionality of the RFI system from the perspective of a user and an MVPD, respectively. While this discussion relates to an RFI utility operating within a broadcast network environment, the described functionality applies equally to an independent RFI system, such as the RFI system 3000 discussed above (FIG. 12), which may operate in a manner that is independent of an MVPD and outside of a broadcast network environment.

Referring to FIG. 10, a user initially opts-in or subscribes (1102) to the RFI program by creating a user account (1102). During the process of creating the user account, the user provides user identification and contact information ($1104_1$). The user also selectively provides a variety of demographic information ($1104_2$) including, for example, the user's gender, age, ethnicity, marital status, and income level. The user may also choose to link the account to various third-party databases and/or affiliate programs ($1104_3$). For instance, the user may choose to link the account to his or her Visa card such that all Visa purchases are automatically reported to the user's account so that the user may be credited value in conjunction with a rewards or loyalty program, as discussed above. In another example, the user may link the account to participating online asset providers (e.g., Target, Dell, Apple) through which the user may receive discounts. The user may also construct a friends and family list ($1104_4$) that identifies individuals who might be interested in receiving RFI information from the user or from the RFI system. The user may also detail consumer preferences (11045) regarding a variety of goods and services. Finally, the user may stipulate privacy permissions ($1104_n$) regarding the user's personally identifiable information and the parameters surrounding the user's agreement to be contacted by the MVPD or third parties (e.g., which parties may contact the user, how the user may be contacted, what user information may be provided to third parties). It should be noted that this list is not exhaustive and the invention contemplates the provision of any appropriate information to better enable the RFI system.

After the user creates an account, the user watches television (1106) according to the user's normal patterns. When viewing an RFI enabled asset of interest, the user presses the appropriate RFI button on the remote control when the RFI icon (1108) appears on the screen (e.g., provides an RFI input) to indicate an interest in receiving follow-on information relating to the asset. When ready to review one or more sets of follow-on information that have been provided in response to the user's RFI inputs, the user logs on to his or her user account and accesses the follow-information via a web-portal (1110). Alternatively, and depending on the user's preferences, the user may receive the follow-on information via e-mail, mail, or telephone. To close the loop in relation to the user's consumption of RFI enabled assets and follow-on information, the user may choose to directly report the user's consumer behavior information (1112) in exchange for value credited to the user's account as part of a rewards or loyalty program.

FIG. 11 summarizes the functionality of the RFI system from an MVPD's perspective. The MVPD initially receives an RFI enabled asset to be broadcast over the broadcast television network (1202). The asset may include an embedded RFI icon to indicate to users that follow-on information is available in relation to the asset. As discussed above, the RFI icon may convey the type of follow-on information that is available (e.g., music, data, discounts) or it may be general such that the user may stipulate the type of information that is desired at the time the user accesses or retrieves the follow-on information. In addition, while the asset provider may insert or embed the RFI icon during production of the asset, the MVPD or any other appropriate party may also insert the RFI icon.

Once the MVPD receives an RFI enabled asset, it transmits the RFI enabled asset to a set top box that corresponds to a subscribing user (1204) via the broadcast television network. In turn, the MVPD receives an RFI input from the user (1206). The RFI input indicates that the user is interested in receiving follow-on information in relation to the RFI enabled asset. Next, the MVPD consults the RFI input as well as an asset database containing asset delivery information pertaining to the set top box to correlate the RFI input to the asset that was being viewed at the time of the RFI input (1208), or to identify the asset of interest. Optionally, the MVPD may consult a subscriber information database to build a user profile for the requesting user (1210). The user profile may correspond to the user's household or, in a targeted asset delivery system that incorporates a classifier, the user profile may correspond to the user or users actually present at the time of the RFI input. The user profile may be filtered according to various privacy regimes (e.g., government mandated, user specified, MVPD policy) set forth in a privacy information database. Because the user profile contains demographic and consumer preference information relating to the consumer, the profile provides a valuable statistical data point to assist the asset provider in discerning the type of user or users that consume the asset provider's assets and/or products.

In addition, a user's RFI input might be ambiguous. For instance, it may correspond to more than one asset or the input might have been made when there is no RFI icon shown on the screen. In this case, it may be desirable to use the web-portal or an e-mail request to gather further information from the user to assist the system in determining the related asset. In one possible implementation, the user may be presented with a frame of video that was captured at the approximate time that the user entered the RFI input.

Once the asset of interest has been identified, the MVPD transmits to the asset provider an RFI request specifying the asset of interest and, if applicable, the user's profile (1212). In response, the MVPD receives a package of assets or follow-on information from the asset provider for delivery to the user (1214). The MVPD transmits the package of assets or follow-on information to the user (1216) via any appropriate means of communication. For example, the follow-on information may be provided to the user via access to a centralized web-portal operated in conjunction with the user's account or the follow-on information may be transmitted to the user via e-mail (e.g., a web link provided in an e-mail), mail, or by telephone.

After transmitting the follow-on information, the MVPD may gather consumer behavior information relating to the user (1218). The consumer behavior information may be derived from a variety of sources, including, for example, direct reporting from the user, tracking of memberships and/or loyalty accounts the user has established with asset providers and linked to the RFI system (e.g., a Safeway club card, an REI membership, a Costco membership), and partnering with third parties that maintain databases of consumer information (credit card companies, credit reporting agencies, affiliate programs). Once consumer behavior information has been collected, the MVPD may statistically correlate information relating to the user's consumption of assets (both RFI enabled assets and follow-on information) with the user's consumer behavior information (1220) to gain information regarding asset effectiveness and impact on consumer behavior information.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A method for use in providing additional information related to items of media content, comprising:
   providing a network platform, comprising:
      stored media tags, each said tag relating to a defined item of media content of interest, and
      a search tool for matching codes relating to said defined items of media content to said stored media tags;
   receiving a code from a user relating to one of said defined items of media content;
   operating said network platform to match said code to a first tag of said media tags, said first tag being associated with first and second media assets having first and second target audiences associated with respective first and second targeting parameters;
   accessing a third-party database comprising third-party information regarding said user wherein said third-party information comprises at least one of credit card information and, credit agency information, said third-party information being based on consumer behavior of said user independent of interaction of said user with said network platform;
   matching said third party information to a matching one of said first and second media assets based on said first and second targeting parameters; and
   using said corresponding one of said media tags together with said third-party information to provide a response to said user in relation to said code from said user, said response providing access to said matching one of said first and second assets; and
   providing said response to said user, wherein a content of said response is based on said corresponding one of said media tags and said third-party information regarding said user.

2. A method as set forth in claim 1, wherein said defined items of media content comprise one or more items of broadcast television content, broadcast radio content, newspaper content, magazine content, billboard content, web content, and print collateral content.

3. A method as set forth in claim 1, wherein said codes relating to said defined items of media content comprise one or more of numeric identifiers, alphanumeric identifiers, alphabetic identifiers, barcodes, and quick response codes.

4. A method as set forth in claim 3, wherein said codes relating to said defined items of media content further comprise one or more of snippets of said defined items of media content and images of said defined items of media content.

5. A method as set forth in claim 1, wherein said receiving said code relating to said one of said defined items of media content comprises receiving one of a typed entry, a transmission of an image, a transmission of an audio recording, a transmission of a voice recording, and a transmission of a video recording.

6. A method as set forth in claim 1, wherein said stored media tags are associated with web-based assets relating to said defined items of media content of interest.

7. A method as set forth in claim 6, wherein said web-based assets comprise one or more of static webpage content, dynamic webpage content, web-based coupons, online surveys, online contests, and e-commerce enabled sales materials.

8. A method as set forth in claim 6, wherein said web-based assets comprise directly downloadable media content.

9. A method as set forth in claim 8, wherein said directly downloadable media content comprises software application files, music files, video files, or data files.

10. A method as set forth in claim 9, wherein said software application files comprise mobile applications.

11. A method as set forth in claim 1, wherein said providing said response comprises directing a user device to a landing web site provided by a producer of said corresponding one of said media tags.

12. A method as set forth in claim 11, wherein said landing website comprises a nested search widget configured to link pages within said landing website to said network platform.

13. A method as set forth in claim 11, wherein said landing website comprises an e-commerce engine configured to enable online purchases.

14. A method as set forth in claim 11, wherein said landing website comprises an interactive link configured to link pages within said landing website to pages within a social media web portal.

15. A method as set forth in claim 1, wherein said providing said response comprises directing said user device to a webpage provided within a centralized media asset portal.

16. A method as set forth in claim 1, wherein said providing said response comprises directing said user device to a webpage provided within a social media web portal.

17. A method as set forth in claim 1, further comprising:
establishing a membership account for a user;
receiving one or more inputs defining automated selections from among said stored media tags;
in response to said inputs, operating said network platform to identify selected ones of said stored media tags based on said automated selections; and
associating said selected ones of said stored media tags with said membership account of said user.

18. A method as set forth in claim 17, further comprising:
receiving one or more filtering criteria relating to said inputs defining said automated selections; and
operating said network platform to apply said filtering criteria to said inputs in identifying said selected ones of said stored media tags.

19. A method as set forth in claim 17, wherein said network platform further comprises a directory tool for organizing ones of said stored media tags associated with said membership account.

20. A method as set forth in claim 17, further comprising forwarding a weblink associated with one of said stored media tags from said membership account to another user.

21. A method as set forth in claim 1, wherein said defined item of media content comprises an asset delivered to said user via a broadcast network, wherein said method further comprises:
determining said asset comprising said defined item of media content is to be delivered at least to said user based on matching information regarding said user and said asset, wherein said information regarding said user comprises said third-party information from said third-party database.

22. A method as set forth in claim 1, further comprising:
receiving consumer behavior information regarding purchasing decisions made by said user from said third-party database after providing said response.

23. A method as set forth in claim 22, further comprising:
correlating said response and said consumer behavior information for said user to provide effectiveness information regarding said response.

24. A network platform for providing additional information related to media content of interest, comprising:
one or more memory structures for storing media tags, each said media tag relating to a defined item of media content of interest;
a search tool configured to:
receive a code from a user relating to one of said defined items of media content of interest; and
match said code relating to said defined item of media content of interest to a first tag of said stored media tags, said first tag being associated with first and second media assets having first and second target audiences associated with respective first and second targeting parameters;
a third-party database that is accessible to retrieve third-party information regarding said user, wherein said third-party information comprises at least one of credit card information and, credit agency information, said third-party information being based consumer behavior of said user independent of interaction of said user with said network platform;
a processor for matching said third party information to a matching one of said first and second media assets based on said first and second targeting parameters; and
using said one or more of said media tags together with said third-party information to provide a response to said user in relation to said code from said user, said response providing access to said matching one of said first and second assets; and
a routing structure, said routing structure configured to provide said response to said user, wherein said content of said response is based on said match between said code and one or more of said stored media tags and said third-party information regarding said user.

* * * * *